(12) United States Patent
Zieske et al.

(10) Patent No.: US 9,199,134 B2
(45) Date of Patent: Dec. 1, 2015

(54) METHOD OF MAKING COLOR GOLF BALL AND RESULTING COLOR GOLF BALL

(71) Applicant: Acushnet Company, Fairhaven, MA (US)

(72) Inventors: Nathan Zieske, Mattapoisett, MA (US); Manjari Kuntimaddi, Raynham, MA (US); Matthew F. Hogge, Plymouth, MA (US); Michael J. Sullivan, Old Lyme, CT (US); Mark L. Binette, Mattapoiset, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 216 days.

(21) Appl. No.: 13/959,026

(22) Filed: Aug. 5, 2013

(65) Prior Publication Data

US 2013/0323427 A1 Dec. 5, 2013

Related U.S. Application Data

(60) Continuation of application No. 13/958,884, filed on Aug. 5, 2013, which is a continuation-in-part of application No. 12/781,281, filed on May 17, 2010, now Pat. No. 8,523,709, and a continuation-in-part of (Continued)

(51) Int. Cl.
*A63B 45/02* (2006.01)
*A63B 45/00* (2006.01)
*A63B 37/00* (2006.01)
*C08K 5/098* (2006.01)
*B05D 5/06* (2006.01)

(52) U.S. Cl.
CPC ............. *A63B 45/00* (2013.01); *A63B 37/0022* (2013.01); *A63B 37/0039* (2013.01); *A63B 37/0051* (2013.01); *A63B 45/02* (2013.01); *C08K 5/098* (2013.01); *A63B 37/0059* (2013.01); *B05D 5/06* (2013.01)

(58) Field of Classification Search
CPC ............. A63B 37/0003; A63B 37/022; A63B 37/0024; A63B 37/0051; A63B 37/12; A63B 45/02; A63B 43/0008; A63B 37/0039; A63B 37/0052; C08G 18/10; C08G 18/3206; B05D 1/02; B05D 1/18

See application file for complete search history.

(56) References Cited

U.S. PATENT DOCUMENTS 3,454,280 A 7/1969 Broughton et al.
3,784,209 A 1/1974 Berman
(Continued)

*Primary Examiner* — Alvin Hunter
*Assistant Examiner* — John E Simms, Jr.
(74) *Attorney, Agent, or Firm* — Margaret C. Barker

(57) ABSTRACT

A method and golf ball incorporating a surface penetrating color composition comprising a colorant (e.g. dyes, tints, color effects, etc.) in a portion (surface or region) of a golf ball component or coating (substrate). The substrate is formed from a homogenous composition having a color $C_1$ which may comprise any color within the spectrum of visible light, or be clear colorless, and alternatively, may also be opaque, translucent, or clear colored, for example. An outer surface of the substrate is treated with or otherwise exposed to a surface penetrating color composition having a $C_2$ that is different than $C_1$ in some respect such as hue, chroma, saturation and/ or opacity. The surface penetrating color composition penetrates the golf ball substrate surface to a target depth and becomes embedded within the surface, thereby forming a surface penetrating color composition-treated component or coating having a treated region and an untreated region.

23 Claims, 10 Drawing Sheets

Related U.S. Application Data application No. 12/781,245, filed on May 24, 2010, now Pat. No. 8,337,950, and a continuation-in-part of application No. 13/153,535, filed on Jun. 6, 2011, now Pat. No. 8,956,251, and a continuation-in-part of application No. 13/153,525, filed on Jun. 6, 2011, now abandoned, said application No. 12/786,245 is a continuation-in-part of application No. 12/695,579, filed on Jan. 28, 2010, now Pat. No. 8,047,932, which is a continuation of application No. 12/695,379, filed on Jan. 28, 2010, now Pat. No. 8,454,454, which is a continuation-in-part of application No. 12/395,023, filed on Feb. 27, 2009, now Pat. No. 7,819,760, which is a continuation of application No. 12/394,942, filed on Feb. 27, 2009, now Pat. No. 8,398,911, which is a continuation-in-part of application No. 12/056,457, filed on Mar. 27, 2008, now Pat. No. 7,678,313, which is a continuation of application No. 12/048,665, filed on Mar. 14, 2008, now Pat. No. 7,678,312, which is a continuation-in-part of application No. 11/772,903, filed on Jul. 3, 2007, now Pat. No. 7,537,529, said application No. 13/153,525 is a division of application No. 12/695,579, filed on Jan. 28, 2010, now Pat. No. 8,047,932, and a division of application No. 12/695,579, filed on Jan. 28, 2010, now Pat. No. 8,047,932, said application No. 12/781,281 is a continuation-in-part of application No. 12/342,545, filed on Dec. 23, 2008, now Pat. No. 7,946,934, said application No. 12/786,245 is a continuation-in-part of application No. 12/342,545, filed on Dec. 23, 2008, now Pat. No. 7,946,934, said application No. 13/153,535 is a continuation-in-part of application No. 12/342,545, filed on Dec. 23, 2008, now Pat. No. 7,946,934, said application No. 13/153,525 is a continuation-in-part of application No. 12/342,545, filed on Dec. 23, 2008, now Pat. No. 7,946,934, which is a continuation-in-part of application No. 12/339,495, filed on Dec. 19, 2008, now Pat. No. 7,815,526, which is a continuation-in-part of application No. 12/196,522, filed on Aug. 22, 2008, now Pat. No. 7,582,025, which is a continuation of application No. 11/939,635, filed on Nov. 14, 2007, now Pat. No. 7,427,242.

(56) References Cited

U.S. PATENT DOCUMENTS

| | | |
|---|---|---|
| 3,819,768 A | 6/1974 | Molitor |
| 3,986,802 A | 10/1976 | Isom |
| 4,431,193 A | 2/1984 | Nesbitt |
| 4,561,657 A | 12/1985 | Tominaga et al. |
| 4,570,937 A | 2/1986 | Yamada |
| 4,650,193 A | 3/1987 | Molitor et al. |
| 4,919,434 A | 4/1990 | Saito |
| 4,927,015 A * | 5/1990 | Jones .................... 206/315.9 |
| 5,033,748 A | 7/1991 | Ebisuno |
| 5,306,760 A | 4/1994 | Sullivan |
| 5,314,187 A | 5/1994 | Proudfit |
| 5,334,673 A | 8/1994 | Wu |
| 5,484,870 A | 1/1996 | Wu |
| 5,516,110 A | 5/1996 | Yabuki et al. |
| 5,697,856 A | 12/1997 | Moriyama et al. |
| 5,733,206 A * | 3/1998 | Nesbitt et al. ............ 473/377 |
| 5,782,707 A | 7/1998 | Yamagishi et al. |
| 5,783,293 A | 7/1998 | Lammi |
| 5,803,834 A | 9/1998 | Yamagishi et al. |
| 5,957,784 A | 9/1999 | Asakura et al. |
| 5,967,906 A | 10/1999 | Horiuchi et al. |
| 5,976,443 A | 11/1999 | Nesbitt et al. |
| 6,131,462 A | 10/2000 | EerNisse et al. |
| 6,267,692 B1 | 7/2001 | Higuchi et al. |
| 6,319,154 B1 | 11/2001 | Yoshida et al. |
| 6,417,278 B1 | 7/2002 | Ladd et al. |
| 6,432,342 B1 | 8/2002 | Nesbitt et al. |
| 6,458,895 B1 | 10/2002 | Wrigley et al. |
| 6,494,793 B1 | 12/2002 | Ohama |
| 6,494,794 B1 | 12/2002 | Ohama |
| 6,506,851 B2 | 1/2003 | Wu |
| 6,533,683 B2 | 3/2003 | Watanabe |
| 6,537,158 B2 | 3/2003 | Watanabe |
| 6,632,147 B2 | 10/2003 | Cavallaro et al. |
| 6,635,716 B2 | 10/2003 | Voorheis et al. |
| 6,659,888 B2 | 12/2003 | Endo et al. |
| 6,679,791 B2 | 1/2004 | Watanabe |
| 6,689,860 B2 | 2/2004 | Iwami |
| 6,739,986 B2 | 5/2004 | Higuchi et al. |
| 6,805,644 B1 | 10/2004 | Moriyama et al. |
| 6,815,521 B2 | 11/2004 | Iwami |
| 6,835,794 B2 | 12/2004 | Wu et al. |
| 6,837,803 B2 | 1/2005 | Nanba et al. |
| 6,921,345 B2 | 7/2005 | Higuchi et al. |
| 6,932,720 B2 | 8/2005 | Hogge et al. |
| 7,004,854 B2 | 2/2006 | Hogge et al. |
| 7,153,224 B2 | 12/2006 | Higuchi et al. |
| 7,182,702 B2 | 2/2007 | Hogge et al. |
| 7,427,242 B1 | 9/2008 | Sullivan et al. |
| 7,582,025 B2 | 9/2009 | Sullivan et al. |
| 7,819,760 B2 | 10/2010 | Sullivan et al. |
| 2003/0106442 A1 * | 6/2003 | Gosetti .................... 101/35 |
| 2003/0209840 A1 | 11/2003 | Hogge et al. |
| 2003/0236135 A1 | 12/2003 | Hogge et al. |
| 2004/0176185 A1 * | 9/2004 | Morgan et al. ............ 473/371 |
| 2005/0176523 A1 | 8/2005 | Boehm et al. |
| 2008/0248898 A1 * | 10/2008 | Morgan et al. ............ 473/373 |
| 2009/0137343 A1 * | 5/2009 | Morgan et al. ............ 473/374 |
| 2010/0222156 A1 | 9/2010 | Sullivan et al. |
| 2010/0232003 A1 * | 9/2010 | Baldy et al. ............... 359/243 |
| 2012/0046125 A1 * | 2/2012 | Sullivan et al. ............ 473/372 |
| 2012/0183691 A1 * | 7/2012 | Kuntimaddi et al. ........ 427/259 |
| 2012/0270682 A1 | 10/2012 | Fitchett et al. |
| 2013/0017906 A1 | 1/2013 | Kim et al. |

* cited by examiner

METHOD OF MAKING COLOR GOLF BALL AND RESULTING COLOR GOLF BALL

CROSS REFERENCE TO RELATED APPLICATIONS

This application is a continuation of co-pending U.S. patent application Ser. No. 13/958,884, filed Aug. 5, 2013, which is a continuation-in-part of: co-pending U.S. patent application Ser. No. 12/781,281 ("'281 application"), filed on May 17, 2010; co-pending U.S. patent application Ser. No. 12/781,245 ("'245 application"), filed on May 17, 2010; co-pending U.S. patent application Ser. No. 13/153,535 ("'535 application"), filed on Jun. 6, 2011; and co-pending U.S. patent application Ser. No. 13/153,525 ("'525 application"), filed on Jun. 6, 2011. The '281 application is a continuation of the '245 application, which is a continuation-in-part of U.S. patent application Ser. No. 12/695,579 ("'579 application"), filed Jan. 28, 2010, now U.S. Pat. No. 8,047,932, which is a continuation of U.S. patent application Ser. No. 12/695,379, filed Jan. 28, 2010, now U.S. Pat. No. 8,454,454, which is a continuation-in-part of U.S. patent application Ser. No. 12/395,023, filed Feb. 27, 2009, now U.S. Pat. No. 7,819,760, which is a continuation of U.S. patent application Ser. No. 12/394,942, filed Feb. 27, 2009, now U.S. Pat. No. 8,398,911, which is a continuation-in-part of U.S. patent application Ser. No. 12/056,457, filed Mar. 21, 2008, now U.S. Pat. No. 7,678,313, which is a continuation of U.S. patent application Ser. No. 12/048,665, filed Mar. 14, 2008, now U.S. Pat. No. 7,678,312, which is a continuation-in-part of U.S. patent application Ser. No. 11/772,903, filed Jul. 3, 2007, now U.S. Pat. No. 7,537,529. The '535, and '525 applications are each divisions of the '579 application, which is related to other applications as identified above. The '281, '245, '535, and '525 applications are each also a continuation-in-part of U.S. patent application Ser. No. 12/342,545, filed Dec. 23, 2008, now U.S. Pat. No. 7,946,934, which is a continuation-in-part of U.S. patent application Ser. No. 12/339,495, filed Dec. 19, 2008, now U.S. Pat. No. 7,815,526, which is a continuation-in-part of U.S. patent application Ser. No. 12/196,522, filed Aug. 22, 2008, now U.S. Pat. No. 7,582,025, which is a continuation of U.S. patent application Ser. No. 11/939,635, filed Nov. 14, 2007, now U.S. Pat. No. 7,427,242. The disclosures of the parent cases are incorporated by reference herein in their entireties.

FIELD OF THE INVENTION

The invention relates generally to methods for incorporating colorants (e.g. dyes, tints and/or color effects) in golf balls, within the core (center and/or outer core layer), intermediate layer, inner cover layer, outer cover layer and/or a coating to provide a unique overall golf ball color appearance. The invention also relates to the resulting golf ball incorporating colorants.

BACKGROUND OF THE INVENTION

Specific golf ball properties and characteristics such as compression, spin and feel may be targeted by carefully choosing the golf ball's construction and/or materials. Golf balls may be of solid or wound construction, and generally include at least a core and a cover, although one piece golf balls are indeed also known. A core may comprise a single core, or a core center surrounded by at least one outer core layer. The core may be solid or liquid-filled.

Covers are formed of one or more layers, often referred to as inner and outer cover layers. While multi-layer cores and covers are sometimes called "dual core" and "dual cover" golf balls, respectively, additional layers are possible. Moreover, at least one intermediate layer may be positioned between the core and the cover. Intermediate layers can be of solid construction or formed of a tensioned elastomeric winding. Furthermore, coatings are applied or formed about golf ball components in order to enhance golf ball aesthetics and/or improve performance and durability.

Meanwhile, golf ball manufacturers incorporate colorants such as dyes, tints and/or color effects in golf balls in order to enhance overall golf ball appearance. In this regard, a golf ball possessing a unique, attractive and superior overall color appearance may boost a golfer's confidence and performance during play. Additionally, a distinctive golf ball can build brand recognition among consumers. Colorants in golf balls may meanwhile provide distinguishing characteristics which serve as indications of origin and facilitate identification and isolation of counterfeit golf balls upon surface inspection or cross-section.

However, golf ball manufacturing costs increase when colorants distribute poorly and/or unevenly throughout golf ball compositions during processing (e.g., injection molding, extrusion, etc.). Such poor distribution occurs, for example, when a colorant is not thermally stable at the required golf ball composition processing temperature. And poor colorant distribution/dispersion within the golf ball composition results in undesirable color variations such as streaking and/or localized areas of color fading, which not only raise production costs but also impair the golf ball's aesthetics.

Golf ball manufacturers have previously addressed this issue of poor colorant distribution within a golf ball composition by adding color "master batches" into the golf ball composition. Such color "master batches" contain dispersing agents and/or other aids that are designed to improve or promote the color's even distribution within the golf ball composition. However, master batches are expensive and also become "overkill" in instances where, for example, the chosen/desired golf ball component surface color could easily be achieved without coloring the entire depth or thickness of the component/coating.

Golf ball manufacturers have also tried painting golf ball components on or about the component's outer surface. In this approach, however, poor golf ball durability results when poor adhesive strength presents between the paint and the substrate—especially, for example, in a painted cover when struck by a golf club face. Such poor durability increases manufacturing costs and also negatively impacts reputation.

Accordingly, there is a need for both methods of coloring golf balls and colored golf balls wherein color may be incorporated within a portion or depth or region of a golf ball component and/or coating without using costly master batches and without adhesively mating the colorant onto and about a golf ball component outer surface. The present invention addresses and solves this need.

SUMMARY OF THE INVENTION

The present invention is therefore directed to a method of incorporating a surface penetrating color composition comprising a colorant (e.g. dyes, tints, color effects, liquid crystalline polymers, etc.) in a portion (surface or region) of a single golf ball component or coating (substrate). The single golf ball substrate to be treated or exposed to the surface penetrating color composition is formed from a homogenous composition having a color $C_1$. Color $C_1$ may comprise any color within the spectrum of visible light, namely from about 370 nm to about 800 nm, or be clear colorless, and alternatively, may also be opaque, translucent, or clear colored, for example. An outer surface of the substrate is treated with or otherwise exposed to a surface penetrating color composition having a color $C_2$ that is different than $C_1$ in some respect such as hue, chroma, saturation and/or opacity. The surface penetrating color composition penetrates the golf ball substrate surface to a target depth and becomes embedded within the surface, thereby forming a surface penetrating color composition-treated component or coating having a treated region and an untreated region. In the method of the invention, the surface penetrating color composition deposits within a portion or region of the substrate golf ball component/coating.

Herein, the term "surface penetrating color composition" shall refer to a composition comprising a colorant (dyes, tints, color effects, liquid crystalline polymers, etc.) and penetrating a substrate golf ball component/coating surface to a target depth and/or being deposited/embedded within a treated portion or region of the substrate. For example, in one embodiment, the surface penetrating color composition is embeddable in a thermoset material. In another embodiment, the surface penetrating color composition is embeddable in a thermoplastic material. In yet another embodiment, the surface penetrating color composition is embeddable in an ionomeric material. In still another embodiment, the surface penetrating color composition is embeddable in a polyurethane-based material. In a different embodiment, the surface penetrating color composition is embeddable in a polyurea-base material.

As also used herein, the term "substrate" shall refer to any golf ball component or coating into which the surface penetrating color composition is embeddable, including for example a core (in a single core golf ball), a center (in a multi-layer core golf ball), an outer core layer, an intermediate layer, an inner cover layer and/or an outer cover layer.

In one embodiment, the invention is directed to a method of making a golf ball comprising the steps of: providing a core comprising a homogenous composition throughout having a color $C_1$, the core further having an outer surface and a geometric center; treating the outer surface with a surface penetrating color composition having a color $C_2$ that is different than $C_1$ and embedding the surface penetrating color composition in the outer surface, thereby forming a treated core having a treated outer surface comprising color $C_2$ and an untreated core region extending radially from the geometric center toward the treated outer surface and having the color $C_1$; and forming a cover about the core.

Herein, the term "homogenous composition" shall mean that the ingredients of the composition are uniformly dispersed and/or distributed throughout the substrate.

In another embodiment, the method of making a golf ball of the invention comprises the steps of: providing a core comprising a homogenous composition throughout having a color $C_1$, the core further having an outer surface and a geometric center and a radius $R_c$; treating the outer surface with a surface penetrating color composition having a color $C_2$ and forming a treated outer core region and an untreated core region; the treated outer core region extending from the core outer surface toward the geometric center a penetration depth $D_{DTr}$ and having the color $C_2$; the untreated core region extending radially from the geometric center toward the treated outer core region and having a depth $(D_{UTr})=(R_c)-(D_{D/Tr})$, wherein the untreated region does not comprise the surface penetrating color composition and has the color $C_1$; and forming a cover about the core.

In yet another embodiment, the method of making a golf ball of the invention comprises the steps of: providing a core; forming a cover about the core, the cover comprising a homogenous composition throughout having a color $C_1 cv$, wherein the cover has an inner surface adjacent the core, a cover outer surface surrounding the inner surface and a thickness $T_{CV}$; treating the cover outer surface with a surface penetrating color composition having a color $C_2 cv$ that is different than $C_1 cv$ and forming a treated cover comprising a treated outer cover region and an untreated cover region; the treated outer cover region extending from the cover outer surface inward toward the cover inner surface a penetration depth $D_{CVosTr}$ and being embedded with the surface penetrating color composition and having the color $C_2 cv$; the untreated cover region extending from the cover inner surface toward the treated outer cover region and having a depth $(D_{CVisUTr})=(Tcv)-(D_{CVosTr})$ and not comprising the surface penetrating color composition and having the color $C_1 cv$.

In still another embodiment, the method of making a golf ball of the invention comprises the steps of: providing a core; forming a cover layer about the core, the cover layer comprising a homogenous composition throughout having a color $C_1 cv$, said cover layer having a cover inner surface, a cover outer surface and a thickness Tcv; treating the cover outer surface with a surface penetrating color composition having a color $C_2 cv$ that is different than $C_1 cv$; and embedding the surface penetrating color composition into the cover outer surface a depth D inward from the cover outer surface and toward the cover inner surface, wherein D<Tcv; thereby forming a treated cover layer having a treated outer surface and an untreated inner surface; wherein the treated outer surface has an overall color appearance $C_{AO}$ having a color $C_3 cv$ that is different than $C_1 cv$ and $C_2 cv$.

In an alternative embodiment, the method of making a golf ball of the invention comprises the steps of: providing a core; forming a cover layer about the core, the cover layer comprising a homogenous composition and having a color $C_1 cv$, said cover layer having a cover inner surface, a cover outer surface and a thickness Tcv; treating the cover outer surface with a surface penetrating color composition having a color $C_2 cv$ that is different than $C_1 cv$; and embedding the surface penetrating color composition into the cover outer surface a depth D inward from the cover outer surface and toward the cover inner surface, wherein D≤Tcv; thereby forming a treated cover layer having a treated outer surface and an untreated inner surface; wherein the treated outer surface has an overall color appearance $C_{AO}$ having the color $C_2 cv$.

In a different embodiment, the method of making a golf ball of the invention comprises the steps of: providing a core; forming a cover layer about the core, the cover layer comprising a homogenous composition throughout having a color $C_1 cv$, said cover layer having a cover inner surface, a cover outer surface and a thickness Tcv; treating the cover outer surface with a surface penetrating color composition having a color $C_2 cv$ that is different than $C_1 cv$; and embedding the surface penetrating color composition into the cover outer surface a depth D inward from the cover outer surface and toward the cover inner surface, wherein D<Tcv; thereby forming a treated cover layer having a treated outer surface and an untreated inner surface; wherein the treated outer surface has an overall color appearance $C_{AO}$ comprising the color $C_2 cv$.

In one embodiment, the method of making a golf ball of the invention comprises the steps of: providing a core; forming a cover layer about the core, said cover layer having an inner surface that is adjacent the core and an outer surface surrounding the inner surface; forming a coating having a thickness Tc about the outer surface, the coating comprising a homogenous composition throughout having a color $C_{1CT}$; exposing an outer surface of the coating to a surface penetrating color composition having a color $C_{2CT}$ that is different than $C_{1CT}$; and forming a treated coating region by embedding the surface penetrating color composition into the outer surface of the coating a depth D inward toward the cover outer surface, wherein D<Tc, thereby forming a treated coating region having a color $C_{3CT}$ that is different than $C_{1CT}$ and $C_{2CT}$.

In another embodiment, the method of making a golf ball of the invention comprises the steps of: providing a core; forming a cover layer about the core, said cover layer having an inner surface that is adjacent the core and an outer surface surrounding the inner surface; providing a coating having a thickness Tc about the outer surface, the coating comprising a homogenous composition throughout having a color $C_{1CT}$; exposing an outer surface of the coating to a surface penetrating color composition having a color $C_{2CT}$ that is different than $C_{1CT}$; and forming a treated coating region by embedding the surface penetrating color composition into the outer surface of the coating a depth D inward toward the cover outer surface, wherein D<Tc such that the treated coating region has the color $C_{2CT}$; and wherein an untreated region of the coating has the color $C_{1CT}$ and a thickness $T_{CUT}$, wherein $T_{CUT}$=Tc−D.

In another embodiment, the method of making a golf ball of the invention comprises the steps of: providing a core having a geometric center, a core outer surface and a color Co; providing a coating having a thickness Tc about the core outer surface, the coating comprising a homogenous composition throughout having a color $C_{1CT}$; exposing an outer surface of the coating to a surface penetrating color composition having a color $C_{2CT}$ that is different than $C_{1CT}$; and forming a treated coating region by embedding the surface penetrating color composition into the outer surface of the coating a depth D inward toward the cover outer surface, wherein D<Tc such that the treated coating region has the color $C_{2CT}$; and wherein an untreated region of the coating has the color $C_{1CT}$ and a thickness $T_{CUT}$, wherein $T_{CUT}$=Tc−D, and the golf ball has an overall color appearance of:

(1) $C_{2CT}$ where $C_{2CT}$ is opaque;
(2) $C_{2CT}$ where $C_{2CT}$ is translucent or clear colored and Co and $C_{1CT}$ are clear colorless; and
(3) $C_{3CT}$, that is different than Co, $C_{1CT}$ and $C_{2CT}$, where $C_{2CT}$ is translucent colored or clear colored and one of Co and $C_{1CT}$ is different than $C_{1CT}$.

However, where only Co is different than $C_{1CT}$, then both $C_{1CT}$ and $C_{2CT}$ must be translucent or clear colored in order for $C_{3CT}$ to be different than each of Co, $C_{1CT}$ and $C_{2CT}$.

Of course, embodiments are envisioned wherein the treated coating is formed about and adjacent any of a core center, and/or an outer core layer, and/or an intermediate layer, and/or an inner cover layer, and/or an outer cover layer, and/or even a different coating.

A novel golf ball formed by the method of the invention possesses a unique overall color appearance that may be modified by changing how the surface penetrating color composition embeds in the surface or region. In one embodiment, the surface penetrating color composition embeds in the surface or region gradually. In another embodiment, the surface penetrating color composition embeds in the surface or region uniformly. In yet another embodiment, the surface penetrating color composition embeds in the surface or region non-uniformly.

In one embodiment, a golf ball of the invention comprises a core and a cover, said core comprising a geometric center and an outer surface, the core being formed from a homogenous composition having a first color; wherein the outer surface is treated with and comprises a surface penetrating color composition having a second color different than the first color and wherein the geometric center is not treated with and does not comprise the surface penetrating color composition and has the first color.

In another embodiment, a golf ball of the invention comprises a core and a cover, said core comprising a geometric center and an outer surface and being formed from a homogenous composition having a color $C_1$, wherein the outer surface is treated with and comprises a surface penetrating color composition having a color $C_2$ that is different than $C_1$, wherein $C_2$ is embedded in the treated outer surface, and wherein the geometric center is not treated with and does not comprise the surface penetrating color composition and has the color $C_1$.

In yet another embodiment, a golf ball of the invention comprises a core and a cover, said core having an outer surface and a geometric center and being formed from a homogenous composition having a first color, wherein the outer surface comprises a surface penetrating color composition having a second color that is different than the first color, and wherein the geometric center does not comprise the surface penetrating color composition and has the first color.

In still another embodiment, a golf ball of the invention comprises a core and a cover, said core having an outer surface and a geometric center and being formed from a homogenous composition having a first color, wherein the outer surface is embedded with a surface penetrating color composition having a second color that is different than the first color; and wherein the geometric center is not embedded with the surface penetrating color composition and has the first color.

A golf ball of the invention may also comprise a core having an outer surface and a geometric center and a radius $R_c$, the core further comprising a homogenous composition throughout having a color $C_1$; the core having a treated outer core region and an untreated core region; wherein the treated outer core region extends from the core outer surface toward the geometric center a penetration depth $D_{DTr}$; and wherein the untreated core region extends radially from the geometric center toward the treated outer core region and has a depth $(D_{UTr})$=$(R_c)$−$(D_{DTr})$; the treated outer core region being treated with and comprising a surface penetrating color composition having a color $C_2$; and the untreated core region not being treated with and not comprising the surface penetrating color composition and having the color $C_1$.

In a different embodiment, a golf ball of the invention comprises a core and a cover layer disposed about the core, said cover layer having a cover inner surface adjacent the core and a cover outer surface surrounding the inner surface and being formed from a homogenous composition having a first color; wherein the cover outer surface is treated with and comprises a surface penetrating color composition having a second color that is different than the first color, and wherein and the cover inner surface is not treated with and does not comprise the surface penetrating color composition and has the first color.

In an alternative embodiment, a golf ball of the invention comprises a core and a cover disposed about the core. The cover is formed from a homogenous composition having color $C_1cv$. The cover further comprises an untreated cover inner surface adjacent the core and a treated cover outer surface surrounding the untreated cover inner surface. The treated cover outer surface is treated with and comprises a surface penetrating color composition having color $C_2cv$ that is different than $C_1cv$, wherein the surface penetrating color composition is embedded in the treated cover outer surface, and wherein the untreated inner surface is not treated with and does not comprise the surface penetrating color composition.

A golf ball of the invention may also comprise a core and a cover disposed about the core, said cover comprising a cover inner surface surrounding the core and a cover outer surface surrounding the inner surface, the cover being formed from a homogenous composition having a first color, wherein the cover outer surface comprises a surface penetrating color composition having a second color that is different than the first color and the cover inner surface does not comprise the surface penetrating color composition and has the first color.

Furthermore, a golf ball of the invention may comprise a core and a cover disposed about the core, said cover comprising a cover inner surface surrounding the core and a cover outer surface surrounding the inner surface, the cover being formed from a homogenous composition throughout having a first color, wherein the cover outer surface is embedded with a surface penetrating color composition having a second color that is different than the first color and the cover inner surface is not embedded with the surface penetrating color composition and has the first color.

In one embodiment, a golf ball of the invention comprises a core and at least one layer disposed about the core. The core comprises geometric center and an outer surface and is formed from a homogenous composition throughout having a first color. The core further has an untreated color region extending radially from the geometric center toward the outer surface a predetermined distance $D_{NTcr}$, and a treated color region that is disposed about the untreated color region and extends inward from the outer surface a predetermined depth $D_{Tcr}$. The treated color region is treated with and comprises a surface penetrating color composition having a second color that is different than the first color, and the untreated color region comprises the first color.

In another embodiment, a golf ball of the invention comprises a core and a cover disposed about the core. The cover has a thickness Tcv and comprises a homogenous composition having a color $C_1cv$ and has an inner surface adjacent the core and a cover outer surface surrounding the inner surface. The cover has a treated cover region that extends inward from the cover outer surface toward the cover inner surface a penetration depth $D_{CVosTr}$. The cover further has an untreated cover region disposed between the core and the treated cover region, the untreated cover region having a depth $(D_{CVisUTr})$ =(Tcv)–$(D_{CVosTr})$. The treated cover region is treated with and comprises a surface penetrating color composition having a color $C_2cv$ that is different than $C_1cv$, whereas the untreated cover region has the color $C_1cv$.

In yet another embodiment, a golf ball of the invention comprises a core; a cover disposed about the core, and a coating surrounding the cover. The coating has a thickness $T_C$ and comprises a homogenous composition throughout having a color $C_{1CT}$. The coating further has a treated coating region extending inward from a coating outer surface and toward the cover a penetration depth $D_{CtosTr}$. Meanwhile, the coating has an untreated coating region disposed between the treated coating region and the cover and having a depth $(D_{CtUTr})$= $(T_C)$–$(D_{CtosTr})$. The treated coating region is treated with and comprises a surface penetrating color composition having a color $C_{2CT}$ that is different than $C_{1CT}$.

In one embodiment, color $C_{1CT}$ is clear colorless. Alternatively, $C_1$ any one of opaque, clear colored or translucent.

A golf ball substrate may be treated with the color composition by coating, rolling, dipping, soaking, spraying, dusting, or otherwise exposing the substrate to the color composition.

A method of the invention may be particularly useful in producing a unique overall golf ball color appearance contributed to at least in part by a golf ball component having an outer surface or region that is embedded with the color composition to a target depth of the component.

In this regard, a golf ball of the invention having the unique structure as described herein (a golf ball comprising a color composition embedded within a substrate) produces a unique and heretofore not achievable "overall golf ball color appearance", denoted by "$C_{AO}$". Herein, $C_{AO}$ refers to an overall golf ball appearance of the golf ball as perceived by the human eye viewing the entire golf ball surface. For example, a golf ball of the invention may comprise a core having a color $C_1$ and a coating layer surrounding the core. The coating layer is the surface penetrating color composition-treated substrate comprising an untreated region adjacent the core and having a color $C_2$ and a treated surface or region surrounding the untreated region that is treated with a surface penetrating color composition having a color $C_3$. Where $C_2$ and $C_3$ are clear colored and/or translucent, the golf ball has an overall golf ball color appearance $C_{AO}$ to which $C_1$, $C_2$ and $C_3$ contribute, wherein $C_{AO}$ is different than each of $C_1$, $C_2$ and $C_3$. Where $C_2$ is opaque and $C_3$ is either clear colored or translucent, only $C_2$ and $C_3$ contribute to $C_{AO}$ and $C_{AO}$ is different than each of $C_2$ and $C_3$. Where $C_3$ is opaque, only $C_3$ contributes to $C_{AO}$ such that $C_{AO}$ has color $C_3$.

The saturation, chroma and hue of the surface penetrating color composition may influence—at least in part—whether the $C_{AO}$ is vibrant, deep, intense, rich, warm, dull, flat, pale, cool, or muted, for example, using a color measuring system such as CIE LAB, CIE CAM, etc. In some embodiments, a color gradient may be produced from the treated outer surface inward as the color penetrating composition embeds within the substrate and migrates and/or diffuses across the thickness of the treated golf ball substrate.

For example, where the substrate to be treated is green and the color penetrating composition is blue translucent, the blue translucent color penetrating composition may penetrate the treated surface and migrate across a depth or thickness of the treated region and transitioning from predominantly blue to predominantly blue-green to predominantly green across the thickness or depth. This graduated and transitional color progression within the treated area or region of the substrate creates a unique overall color appearance for the viewer unlike that produced using a single master batch or relying on adhesion between colorant/paint and the attached substrate surface. The color gradient may comprise changing/graduating chroma and/or saturation of the surface penetrating composition as it embeds into and migrates across the thickness of the treated substrate.

However, embodiments are also envisioned in which the embedded surface penetrating composition creates a uniform hue, saturation and/or chroma across the entire depth of the treated surface or region. For example, a colorless cover layer having a thickness $T_{CV}$ may be treated with a blue surface penetrating color composition to form a golf ball having a cover comprising a blue treated region having a depth D and an untreated colorless region having a thickness D<Tcv wherein the treated region is blue and the untreated region is colorless.

In some embodiments, the thickness or depth of the treated surface or region is substantially uniform. Embodiments are also envisioned wherein the thickness or depth of the treated surface or region is non-uniform. This is true whether the treated surface or region is in a core outer surface, a layer, or a coating.

The method and golf ball of the invention may be especially useful in reducing manufacturing costs associated with producing golf balls such as disclosed in commonly owned U.S. application Ser. Nos. 13/429,485 and 13/429,485, each of which is hereby incorporated by reference in its entirety. For example, the inventive method may be used to treat one of first and second color contributing components having substantially similar hues to produce a golf ball wherein the first color contributing component has a hue that is different than the hue of the second color contributing component. Treating a single color contributing component with the surface penetrating color composition creates a treated surface or treated region within the color contributing component, thereby eliminating the need for a second colorant master batch having a different hue in addition to the primary master batch forming the first and second color contributing components. In alternative embodiments, one of first and second color contributing components having the same chroma and/or saturation may likewise be treated with the color composition according to the method of the invention to produce first and second color contributing components having different chroma and/or saturation from a single color baster batch.

The method and golf ball of the invention is likewise useful in processes such as is disclosed in commonly owned U.S. application Ser. No. 13/429,768 ("'768 application") and Ser. No. 13/597,302 ("'302 application"), each of which is hereby incorporated by reference in its entirety. In particular, an unmasked land area adjacent dimples or an unmasked portion of a golf ball component may be treated according to the method of the invention with a color composition which embeds within the unmasked land area or component surface, thereby improving durability in the resulting golf ball—in contrast with paint being applied onto the substrate surface and adhering to the substrate rather than penetrating it. For example, the method of the invention may embed colored text, a logo, a fanciful design or an indication of origin into the substrate surface of a substrate that is otherwise masked.

A treated golf ball component may optionally also incorporate color effects to further enhance the overall golf ball appearance. Non-limiting examples include metal-oxide coated mica based pigments, metal-oxide coated aluminum oxide platelets and metal-oxide coated silica platelets involving interference, reflection and absorption phenomena. Other examples of optional color effects which may be incorporated in the embeddable color composition include those disclosed in application Ser. No. 13/597,302, incorporated herein in its entirety, wherein the color effect comprises at least one of: (1) calcium aluminum borosilicate coated with a metal oxide; (2) silicon dioxide platelets coated with metal oxide; and (3) an iron oxide pigment substrate coated with a metal oxide. The surface penetrating color composition may even create a CAO which is transient on the treated surface itself.

In one embodiment, the target thickness or depth of a color composition treated surface or region is substantially uniform. That is, the thickness or depth of the treated surface or region extending inward from the treated outer surface is substantially constant at each point across the outer surface of the treated component. Non-limiting examples of the ratio of thickness or depth of treated surface or region to thickness or depth of untreated surface or region in a golf ball layer (outer core layer, intermediate layer, cover layer and/or coating layer), wherein the thickness of the treated surface or region is substantially uniform are as follows: from about 1:1000 to about 1:2000; from about 1:1100 to about 1:1950; from about 1:1200 to about 1:1920; from about 1:1300 to about 1:1875; from about 1:1400 to about 1:1770; from about 1:1530 to about 1:1650; from about 1:1640 to about 1:1750; or from about 1:450 to about 1:1100 or from about 1:550 to about 1:800 or from about 1:350 to about 1:620 or from about 1:225 to about 1:370 or from about 1:150 to about 1:240 or from about 1:75 to about 1:175 or from about 1:45 to about 1:80 or from about 1:27 to about 1:92 or from about 1:8 to about 1:38 or from about 1:1 to about 1:42.

In other embodiments, the ratio of thickness or depth of treated surface or region to thickness or depth of untreated surface or region in a golf ball layer (outer core layer, intermediate layer, cover layer and/or coating layer), wherein the thickness or depth of the treated surface or region is substantially uniform are as follows: about 1:2000 or about 1:1900 or about 1:1800 or about 1:1700 or about 1:1600 or about 1:1500 or about 1:1300 or about 1:1200 or about 1:900 or about 1:800 or about 1:700 or about 1:600 or about 1:500 or about 1:400 or about 1:300 or about 1:200 or about 1:100 or about 1:90 or about 1:80 or about 1:70 or about 1:60 or about 1:50 or about 1:40 or about 1:30 or about 1:20 or about 1:18 or about 1:15 or about 1:12 or about 1:10 or about 2:5 or about 3:10 or about 1:3 or about 1:2 or about 3:7 or about 4:5 or about 6:7 or about 7:8 or about 1:9 or about 1:8 or about 1:7 or about 1:6 or about 1:5 or about 1:4 or about 2:7 or about 2:9 or about 3:4 or about 1:1 or about 5:6 or about 5:7 or about 5:8 or about 5:9 or about 7:8 or about 7:9 or about 8:9 or about 9:10 or about 7:10.

In yet other embodiments, additional non-limiting examples of the ratio of thickness or depth of treated surface or region to thickness or depth of untreated surface or region in a golf ball layer (outer core layer, intermediate layer, cover layer and/or coating layer), wherein the thickness or depth of the treated surface or region is substantially uniform are as follows: 10:9 or 10:1 or 5:1 or 10:3 or 5:2 or 2:1 or 5:3 or 10:7 or 5:4 or 10:9 or 9:1 or 9:2 or 3:1 or 9:4 or 9:5 or 3:2 or 8:1 or 4:1 or 8:3 or 8:5 or 4:3 or 8:7 or 7:1 or 7:2 or 7:3 or 7:4 or 7:5 or 7:6 or 6:1 or 6:5 or 5:1.

In an embodiment wherein a single core or center or uniball comprises a treated surface or region and the thickness or depth of the treated surface or region is substantially uniform, non-limiting examples of the ratio of the thickness or depth of the treated surface or region to the radius of the untreated region extending from the geometric center to the treated region, are as follows: from about 1:1000 to about 1:2000; from about 1:1100 to about 1:1950; from about 1:1200 to about 1:1920; from about 1:1300 to about 1:1875; from about 1:1400 to about 1:1770; from about 1:1530 to about 1:1650; from about 1:1640 to about 1:1750; or from about 1:450 to about 1:1100 or from about 1:550 to about 1:800 or from about 1:350 to about 1:620 or from about 1:225 to about 1:370 or from about 1:150 to about 1:240 or from about 1:75 to about 1:175 or from about 1:45 to about 1:80 or from about 1:27 to about 1:92 or from about 1:8 to about 1:38 or from about 1:1 to about 1:42.

In other embodiments, the ratio of the thickness or depth of the treated surface or region to the radius of the untreated region extending from the geometric center to the treated region, are about 1:2000 or about 1:1900 or about 1:1800 or about 1:1700 or about 1:1600 or about 1:1500 or about 1:1300 or about 1:1200 or about 1:900 or about 1:800 or about 1:700 or about 1:600 or about 1:500 or about 1:400 or about 1:300 or about 1:200 or about 1:100 or about 1:90 or about 1:80 or about 1:70 or about 1:60 or about 1:50 or about 1:40 or about 1:30 or about 1:20 or about 1:18 or about 1:15 or about 1:12 or about 1:10 or about 2:5 or about 3:10 or about 1:3 or about 1:2 or about 3:7 or about 4:5 or about 6:7 or about 7:8 or about 1:9 or about 1:8 or about 1:7 or about 1:6 or about 1:5 or about 1:4 or about 2:7 or about 2:9 or about 3:4 or about 1:1 or about 5:6 or about 5:7 or about 5:8 or about 5:9 or about 7:8 or about 7:9 or about 8:9 or about 9:10 or about 7:10.

Examples of the ratio of a treated region to an untreated region in a golf ball component are as follows. In one embodiment, the ratio may be expressed as $D_{DTr}:D_{UTr}$. In another embodiment, the ratio may be expressed as $D_{CVosTr}:D_{CVisUTr}$. In yet another embodiment, the ratio may be expressed as $D:T_{CUT}$. In still another embodiment, the ration may be expressed as $D_{CtosTr}:D_{CtUTr}$.

Alternatively, the target thickness or depth of a color composition treated surface or region may be non-uniform—that is, the depth or thickness of the treated region inward from the treated outer surface in not substantially constant at each point along a treated outer surface.

In one embodiment, the surface-penetrating color composition comprises a fatty acid and/or fatty acid salt colorant composition, as discussed more fully below. In another embodiment, the surface-penetrating color composition consists essentially of the fatty acid and/or fatty acid salt color comprising composition. In yet another embodiment, the surface-penetrating color composition consists of the fatty acid and/or fatty acid salt color comprising composition.

DETAILED DESCRIPTION OF THE INVENTION

Figure 1:
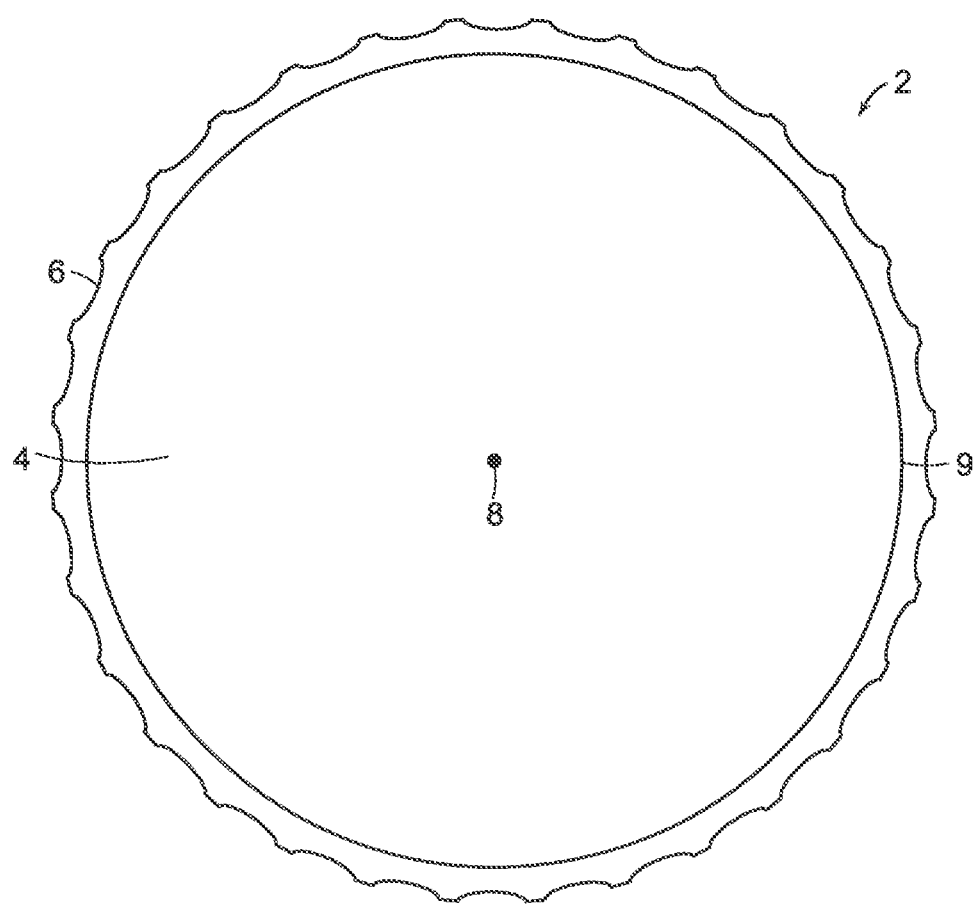
FIG. 1 is a schematic cross section illustrating one embodiment of the golf ball of the present invention.

In the method and golf ball of the invention, the surface-penetrating color composition may comprise a fatty acid and/or fatty acid salt colorant composition.

A color gradient is achieved between a treated portion and an untreated portion of a given golf ball component (i.e., core or center, core layer(s), intermediate layer(s), cover layer(s), and/or coating). The treated portion, e.g., an outer surface or region of the golf ball component is treated with and comprises the fatty acid and/or fatty acid salt colorant composition. Meanwhile, the untreated portion or region within the component is not treated with and does not comprise the fatty acid and/or fatty acid salt colorant composition. The fatty acid and/or fatty acid salt colorant composition embeds within the treated surface and becomes part of the component, thereby creating the color gradient between the treated and untreated regions within the golf ball component. For example, a color gradient may be formed between an untreated core geometric center and a treated core outer surface.

The colorant-containing fatty acid and/or fatty acid salt colorant compositions maintain plasticizer permanence within golf ball component surfaces through several mechanisms. Fatty acid salts inherently have low volatility and permanence due to their ability to solidify and/or crystallize within the polymer network minimizing or eliminating migration. The fatty acids are highly compatible with the polymer network aiding in plasticizer permanence. Accordingly, the fatty acid and/or fatty acid salt composition embeds itself between polymer chains, spacing the chains apart and thereby increasing free volume. Additionally, since the core and cover formulations contain significant amounts of reactive metal oxides and/or metal salts, the fatty acids will react or coordinate with the various cation sources in the polymer matrix improving the thermal stability and permanence of the plasticizer. Furthermore, a free radical initiator can be used in conjunction with the fatty acids and/or fatty acid salts, especially when the fatty acids and/or fatty acid salts contain some unsaturation, to covalently bond the plasticizer to the polymer network further improving the plasticizer permanence.

Fatty acid and/or fatty acid salt compositions are incorporated in golf balls of the invention as follows. One embodiment of a golf ball of the invention is directed to a golf ball comprising a core and a cover disposed about the core. The core and cover may each comprise one or more layers. At least one of the cover layers comprises a cover outer surface and a cover inner surface, and the cover outer surface comprises a fatty acid and/or fatty acid salt composition. The cover outer surface comprises a hardness $\alpha$ and the cover inner surface comprises a hardness $\beta$ wherein the hardness $\alpha$ is different than the hardness $\beta$. In one embodiment, the hardness $\alpha$ is less than the hardness $\beta$ to define a negative hardness gradient within the cover layer. In another embodiment, the hardness $\alpha$ is greater than the hardness $\beta$ to define a positive hardness gradient within the cover layer.

In the golf ball of the invention, the core may comprise a geometric center, a core outer surface and a core region, the core region extending radially from the geometric center to the core outer surface. The core may further comprise at least one core layer disposed about the core outer surface and adjacent the cover layer. The core layer may comprise a core layer inner surface that is adjacent the core outer surface and a core layer outer surface that is disposed about the core layer inner surface. The core layer may also comprise a core layer region that is disposed between the core layer inner surface and the core layer outer surface.

The core may comprise a hardness $\phi$ in any or all of the geometric center, core outer surface, core region, core layer inner surface, core layer outer surface and/or core layer region. In one embodiment, the hardness $\phi$ is less than the hardness $\alpha$. Alternatively, the hardness $\phi$ may be greater than the hardness $\alpha$. In yet another embodiment, the hardness $\phi$ is substantially similar to the hardness $\alpha$.

In one embodiment, at least one core surface and at least one cover surface have been treated with and/or comprise the fatty acid and/or fatty acid salt composition.

The golf ball may further comprise at least one intermediate layer disposed about the core and adjacent to at least one cover layer. The intermediate layer may comprise an intermediate layer inner surface that is adjacent the core outer surface. Additionally, the intermediate layer may comprise an intermediate layer outer surface that is adjacent the cover layer inner surface. The intermediate layer may also comprise an intermediate layer region that is disposed between the intermediate layer inner surface and the intermediate layer outer surface.

The intermediate layer may comprise a hardness $\psi$ in any or all of the intermediate layer inner surface, intermediate layer outer surface and intermediate layer region. In one embodiment, the hardness $\phi$ is greater than the hardness $\alpha$. In another embodiment, the hardness $\phi$ is less than the hardness $\alpha$. In yet another embodiment, the hardness $\phi$ is substantially similar to the hardness $\alpha$. Meanwhile, the hardness $\phi$ may be greater than, less than, or substantially similar to the hardness $\psi$. The intermediate layer may comprise a thickness of from about 0.010 inches to about 0.150 inches.

Since the fatty acid and/or fatty acid salt composition acts as a surface-softening material, a negative hardness gradient may result between the cover layer portion/region comprising the fatty acid and/or fatty acid salt composition and the untreated cover layer portion/region. That is, the hardness of the cover layer portion/region comprising the fatty acid and/or fatty acid salt composition is less than the hardness of the untreated cover layer portion/region. Meanwhile, a hardness gradient (positive or negative) may also exist between the fatty acid and/or fatty acid salt composition comprising cover layer and at least one of the core and intermediate layer surfaces and/or regions.

However, an embodiment is also envisioned in which the fatty acid and/or fatty acid salt composition further comprises at least one golf ball hardening/stiffening material. Non-limiting examples of suitable golf ball hardening/stiffening materials include zinc methacrylate, zinc dimethacrylate, a thermoplastic resin, peroxide, heat, infrared (IR) radiation, ultraviolet (UV) radiation, electron beam radiation, and/or gamma radiation. In this embodiment, the cover layer comprises an otherwise uniform and homogeneous formulation except that the cover outer surface further has been treated with and/or comprises a fatty acid and/or fatty acid salt composition which includes the hardening/stiffening material in an amount of from about 1 wt % to about 50 wt %. The weight % of the hardening/stiffening material in the fatty acid and/or fatty acid salt composition may be modified to achieve a cover layer outer surface hardness $\alpha$ that is greater than, less than, or even substantially similar to the cover layer inner surface hardness $\beta$, depending on the golf ball characteristic being targeted. In this embodiment, in a cover outer surface comprising such a combined composition of both fatty acid and/or fatty acid salt and hardening/stiffening material, the fatty acid and/or fatty acid salt compliments the stiffening agent by embedding itself between polymer chains, spacing the chains apart and thereby increasing free volume to increase penetrability of the surface by the fatty acid and/or fatty acid salt.

A cover outer surface comprising the fatty acid fatty acid and/or fatty acid salt composition may be combined with additional surface treatments and/or compositions to achieve desired hardness gradients between the cover outer surface(s) and at least one of a cover layer different surface, a cover layer region, a core surface and a core region to attain specific desired golf ball performance and spin profiles. Such additional surface treatments and/or compositions include but are not limited to isocyanate solution treatment, silane and amino silane crosslinking, and treatment with reactive or non-reactive placticizers. The additional surface treatments and/or compositions may be dissolved in a liquid or molten fatty acid and/or fatty acid salt composition or co-dissolved with the fatty acid and/or fatty acid salt composition in a suitable solvent. Suitable solvents may include methanol, ethanol, isopropanol, tetrahydrofuran, water, N-methyl-2-pyrrolidone, dimethyl formamide, methylene chloride, chloroform, acetone, dimethyl sulfoxide, toluene, xylene, hexanes, or glycols. The additional surface treatments may be used prior to, concurrent with, or subsequent to the fatty acid and/or fatty acid salt composition treatment.

Additionally, chemical modifications such as saponification or esterification may also be applied. In a different embodiment, a first cover layer outer surface comprises solely these additional surface treatments/compositions/modifications while a second cover layer outer surface comprises the fatty acid fatty acid and/or fatty acid salt composition.

Moreover, in one embodiment, the at least one cover layer may comprise n sub cover layers wherein n≥1 and wherein each sub cover layer comprises a thickness (1/n) (T) wherein T comprises a cover layer thickness of from about 0.010 inches to about 0.150 inches. In this embodiment, 100% or less of a sub cover layer thickness may be treated with and/or comprise the fatty acid and/or fatty acid salt composition. In another embodiment, less than about 75% of a sub cover layer thickness may be treated with and/or comprise the fatty acid and/or fatty acid salt composition. In yet another embodiment, less than about 50% of a sub cover layer thickness may be treated with and/or comprise the fatty acid and/or fatty acid salt composition. In still another embodiment, about 25% or less of a sub cover layer thickness may be treated with and/or comprise the fatty acid and/or fatty acid salt composition.

In another embodiment, the at least one cover layer comprises a treated cover region and an untreated cover region, the treated cover region extending inward from the cover outer surface a depth of about 5% or greater of a distance between the cover outer surface and the cover inner surface, and the untreated cover region being disposed about the cover inner surface and adjacent the treated cover region. In yet another embodiment, the treated region extends inward from the cover outer surface a depth of about 2% or greater of a distance between the cover outer surface and the cover inner surface. In still another embodiment, the treated region extends inward from the cover outer surface a depth of about 1% or greater of a distance between the cover outer surface and the cover inner surface.

The treated cover region may alternatively extend inward from the cover outer surface a depth D of from about 0.001 inches to about 0.149 inches and the untreated cover region may comprise a thickness of from about 0.149 inches to about 0.001 inches.

In yet another embodiment, the treated cover region extends inward from the cover outer surface a predetermined depth $D_{CTr}$ and the untreated cover region is disposed between the cover inner surface and the treated cover region a predetermined depth $D_{CUTr}$, said treated cover region being treated with and/or a comprising a fatty acid and/or fatty acid salt composition wherein the treated cover region comprises a hardness $\alpha$ and the untreated cover region comprises a hardness $\beta$ that is different than the hardness $\alpha$.

The hardness $\alpha$ may be less than the hardness $\beta$ to define a negative hardness gradient. Alternatively, the hardness $\alpha$ may be greater than the hardness $\beta$ to define a positive hardness gradient.

$D_{CTr}$ may comprise about 5% or greater of the distance between the cover outer surface and the cover inner surface. Alternatively, $D_{CTr}$ may comprise about 2% or greater of the distance between the cover outer surface and the cover inner surface. $D_{CTr}$ may even comprise about 1% or greater of the distance between the cover outer surface and the cover inner surface. In another embodiment, $D_{CTr}$ may comprise about 10% or greater of the distance between the cover outer surface and the cover inner surface. In still another embodiment, $D_{CTr}$ may comprise about 15% or greater of the distance between the cover outer surface and the cover inner surface. Alternatively, $D_{CTr}$ may be from about 0.001 inches to about 0.149 inches and $D_{CUTr}$ may be from about 0.149 inches to about 0.001 inches.

In another embodiment, the untreated cover region comprises n regions of hardness wherein $n \geq 1$ and wherein at least one of the n regions of hardness has a hardness $H_1$ that is different than the hardness $\alpha$, and wherein each of said n regions of hardness further comprises a depth $D_{CUTn}$ such that $D_{CTr} \leq (1/n)(D_{CUT1}+D_{CUT2}+ \ldots +D_{CUTn})$.

In yet another embodiment, the treated cover region $D_{CTr}$ comprises a hardness $\alpha$ and the untreated cover region comprises n regions of hardness within depth $D_{CUTr}$ wherein $n \geq 1$ and wherein at least one of the n regions of hardness has a hardness $H_2$ that is different than the hardness $\alpha$, each of said n regions further having a depth $D_{CUTn}$ such that $D_{CTr} \leq (n)(D_{CUT1}+D_{CUT2}+ \ldots +D_{CUTn})$.

In still another embodiment, the untreated cover region comprises n regions of hardness within depth $D_{CUTr}$ wherein $n \geq 1$ and wherein at least one of said n regions of hardness has a hardness $H_3$ that is different than the hardness $\alpha$, each of said n regions of hardness further having a depth $D_{CUTn}$ such that $D_{CTr} \leq (1/n^2)(D_{CUT1}+D_{CUT2}+ \ldots +D_{CUTn})$.

The invention is also directed to a method of making a golf ball comprising the steps of: providing a core comprising at least one layer; forming a cover comprising at least one cover layer about the core, the at least one cover layer having a thickness D and comprising a cover inner surface and a cover outer surface; treating the cover outer surface with a fatty acid and/or fatty acid salt composition and forming a treated cover region which extends inward from the cover outer surface a depth $D_{CTr}$, an untreated cover region being disposed between the cover inner surface and the treated cover region having a depth $(D_{CUTr})=(D)-(D_{CTr})$ wherein the treated cover region has a hardness $\alpha$ and the untreated cover region has a hardness $\beta$ different than the hardness $\alpha$. The treated cover region comprises the fatty acid and/or fatty acid salt composition.

In one embodiment, thickness D may be from about 0.010" to about 0.150". In another embodiment, thickness D may be from about 0.010" to about 0.120". In yet another embodiment, thickness D may be from about 0.020" to about 0.070". In still another embodiment, thickness D may be from about 0.015" to about 0.050". In different embodiment, thickness D may be from about 0.030" to about 0.060".

The hardness $\beta$ may be greater than the hardness $\alpha$ to define a negative hardness gradient within each cover layer. Alternatively, the hardness $\beta$ may be less than the hardness $\alpha$ to define a positive hardness gradient within each cover layer.

Optionally, the step of treating the cover outer surface with a fatty acid and/or fatty acid salt composition and forming a treated cover region may precede the step of forming the cover about the core, such as when treating half shells prior to compression molding, for example. Additionally, in one embodiment, it is the cover inner surface rather than the cover outer surface that is treated with the fatty acid and/or fatty acid salt composition to forming a treated cover region. In yet another embodiment, both the cover inner and outer surfaces are treated with the fatty acid and/or fatty acid salt composition.

Alternatively, the method of making a golf ball may comprise the steps of: providing a core comprising at least one layer; forming a cover about the core comprising at least one cover layer comprising a cover inner surface and a cover outer surface; treating the cover inner surface with a fatty acid and/or fatty acid salt composition and forming a treated inner cover region extending from the cover inner surface toward the cover outer surface a penetration depth $D_{CTr}$, an untreated cover region being disposed between the cover outer surface and the treated inner cover region and having a depth $(D_{CUTr})=(D)-(D_{CTr})$; wherein the treated inner cover region has a hardness $\alpha$ and the untreated outer cover region has a hardness $\beta$ different than the hardness $\alpha$. The treated inner cover region comprises the fatty acid and/or fatty acid salt composition.

In a different embodiment of the method of the invention, both the cover inner surface and the cover outer surface are each treated with the fatty acid and/or fatty acid salt composition.

The method of making the golf ball may also comprise the steps of: providing a core comprising at least one layer; forming a cover about the core comprising at least one cover layer comprising a cover inner surface having a hardness $\beta$ and a cover outer surface having a hardness $\alpha$; treating the cover outer surface with a fatty acid and/or fatty acid salt and forming a treated cover outer surface comprising the fatty acid and/or fatty acid salt composition wherein the treated cover outer surface has a hardness $\alpha'$ different from hardness $\alpha$ and wherein hardness $\beta$ is different than at least one of hardness $\alpha$ and hardness $\alpha'$.

The golf ball may also comprise a core and a cover wherein the core comprises an outer surface and a geometric center, the outer surface being treated with and comprising a fatty acid and/or fatty acid salt composition. The outer surface has a first hardness and the geometric center has a second hardness wherein the first hardness is less than the second hardness to define a negative hardness gradient.

In one embodiment, the core comprises a thermoset rubber composition. The thermoset rubber composition may comprise a polybutadiene material and/or have a surface hardness of about 50 Shore C or greater. In another embodiment, the polybutadiene composition is at least partially crosslinked.

The at least one fatty acid and/or fatty acid salt composition may comprise oleic acid, palmitic acid, stearic acid, behenic acid, pelargonic acid, linoleic acid, linolenic acid, arachidonic acid, caproic acid, caprylic acid, capric acid, lauric acid, erucic acid, myristic acid, benzoic acid, phenylacetic acid, or naphthalenoic acid.

The at least one fatty acid and/or fatty acid salt composition may comprise a cation selected from the group comprising barium, lithium, sodium, zinc, bismuth, chromium, cobolt, copper, potassium, strontium, titanium, tungsten, magnesium, cesium, iron, nickel, silver, aluminum, tin and calcium.

The at least one fatty acid and/or fatty acid salt composition may further comprise at least one of an antioxidant, a sulfur-bearing compound, zinc methacrylate, zinc dimethacrylate, a softening acrylate monomer or oligomer, a thermoplastic resin, or an hydroquinone.

The thermoplastic resin may comprise at least one of polyethylene vinyl acetate, polyethylene butyl acrylate, polyethylene methyl acrylate, polyethylene acrylic acid, polyethylene methacrylic acid or an ionomer.

An intermediate core layer may be disposed about the core and adjacent the cover layer.

In another embodiment, the golf ball comprises a core and a cover. The core comprises an outer surface and a geometric center. The outer surface comprises a fatty acid and/or fatty acid salt composition and has a first hardness and the geometric center has a second hardness greater than the first hardness to define a negative hardness gradient.

In a further embodiment, the golf ball comprises a core and at least one cover layer disposed about the core. The core comprises a geometric center and an outer surface. The core further comprises an untreated region extending radially from the geometric center a predetermined distance $D_{UTr}$. A treated region is disposed about the untreated region and extends inward from the outer surface a predetermined depth $D_{Tr}$. The untreated region and the treated region are adjacent each other and concentric with the geometric center. The treated region has been exposed to and comprises a fatty acid and/or fatty acid salt composition. The treated region comprises a first hardness and the untreated region comprises a second hardness different than the first hardness.

In one embodiment, the first hardness is less than the second hardness. In additional embodiments, the first hardness may be greater than or the same as the second hardness. These additional embodiments may occur where, for example, the hardness of the treated region was greater than the hardness of the untreated region prior to being treated with the fatty acid and/or fatty acid salt composition. Or, it may occur where the fatty acid/fatty acid salt treated and comprising region further comprises materials/compositions including but not limited to zinc methacrylate, zinc dimethacrylate, a thermoplastic resin, an hydroquinone, and/or peroxide which tend to harden the fatty acid and/or fatty acid salt treated and comprising surface or region. Meanwhile, however, an improved golf ball is provided over golf balls which have not been treated with nor comprise a fatty acid and/or fatty acid salt composition as in the present invention.

The golf ball core may further comprise an intermediate untreated region disposed about the untreated region and adjacent the treated region, said intermediate untreated region comprising a third hardness wherein the first hardness is greater than the second hardness and less than the third hardness.

Alternatively, the golf ball core may further comprise an intermediate untreated region disposed about the untreated region and adjacent the treated region, said intermediate untreated region comprising a third hardness wherein the first hardness is less than the second hardness and the third hardness.

The golf ball core may comprise an intermediate untreated region disposed about the untreated region and adjacent the treated region, said intermediate untreated region comprising a third hardness wherein the first hardness is greater than the second hardness and the third hardness.

The golf ball core may comprise an intermediate untreated region disposed about the untreated region and adjacent the treated region, said intermediate untreated region comprising a third hardness wherein the first hardness is greater than the second hardness and substantially similar to the third hardness.

In still another embodiment, the golf ball comprises a core and at least one cover layer disposed about the core. The core comprises a geometric center and an outer surface. The core further comprises an untreated region extending radially from the geometric center a distance $D_{UTr}$. A treated region is disposed about the untreated region and extends inward from the outer surface a depth $D_{Tr}$. The treated region has been exposed to and comprises a fatty acid and/or fatty acid salt composition. The treated region comprises a first hardness and the untreated region comprises a second hardness wherein the first hardness is different than the second hardness.

In yet another embodiment, the golf ball comprises a core and at least one cover layer disposed about the core. The core comprises a geometric center and an outer surface. The core further comprises an untreated region which extends radially from the geometric center a distance $D_{UTr}$. Additionally, a treated region is disposed about the untreated region and extends inward from the outer surface a depth $D_{Tr}$. The treated region has been exposed to and comprises a fatty acid and/or fatty acid salt composition. Furthermore, the core comprises an intermediate untreated region disposed about the untreated region and adjacent the treated region. The intermediate untreated region has a third hardness, wherein the first hardness is different than the second hardness and the third hardness.

The core may comprise a single layer core comprising the untreated region, the intermediate untreated region and the treated region.

The core may comprise a multilayer core comprising a first core layer extending radially from the geometric center and a second core layer disposed about the first core layer, wherein the first core layer comprises the untreated region and the second core layer comprises the treated region. The treated region may alternatively occupy not only the second core layer but also extend into a region within the first core layer adjacent the second core layer.

Further, the core may comprise a first core layer extending radially from the geometric center and a second core layer disposed about the first core layer, wherein the first core layer comprises the untreated region and an intermediate untreated region, and the second core layer comprises the treated region.

The core may also comprise a first core layer extending radially from the geometric center, a second core layer disposed about the first core layer and a third core layer disposed about the second core layer, wherein the first core layer comprises the untreated region, wherein the second core layer comprises the intermediate untreated region, and wherein the third core layer comprises the treated region.

The present invention is also directed to a golf ball comprising a core and a cover wherein the core comprises a geometric center and a treated outer surface, the treated outer surface having a first hardness and the geometric center having a second hardness, the treated outer surface being treated with a surface-softening material comprising at least one fatty acid and/or fatty acid salt composition such that the second hardness is greater than the first hardness to define a negative hardness gradient.

In another embodiment, the golf ball comprising a core and a cover, the core comprising a geometric center and an outer surface, the outer surface comprising fatty acid and/or fatty acid salt composition, the geometric center having a hardness ($H_g$) and the outer surface having an extrapolated hardness ($H_E$) and an actual hardness ($H_{OS}$) wherein $H_E$ is derived from a five point extrapolation within three quarters of an outer core diameter and $H_{OS}$ as measured on the curved surface of the core, and the cover has a hardness ($H_C$), wherein $H_C > H_E > H_g > H_{OS}$.

Also, the present invention may be directed to a golf ball comprising a core and a cover, the core comprising a geometric center and an outer surface, the outer surface comprising fatty acid and/or fatty acid salt composition, the geometric center having a hardness ($H_g$) and the outer surface having an extrapolated hardness ($H_E$) and an actual hardness ($H_{OS}$) wherein $H_E$ is derived from a five point extrapolation within three quarters of an outer core diameter and $H_{OS}$ as measured on the curved surface of the core, and the cover has a hardness ($H_C$), wherein $H_C < H_E > H_g > H_{OS}$.

The golf ball may advantageously comprise a thermoset rubber composition core and a cover, said core comprising an outer surface and a geometric center, the outer surface having a treated region comprising a fatty acid and/or fatty acid salt composition extending inward from the outer surface from about 0.001 inches to about 0.200 inches, the treated region further having a first hardness and the geometric center having a second hardness, wherein the first hardness is less than the second hardness to define a negative hardness gradient.

Additionally, the golf ball may comprise a core and a cover, said core comprising a fatty acid and/or fatty acid salt composition outer surface and a geometric center, the fatty acid and/or fatty acid salt composition outer surface having a first hardness and the geometric center having a second hardness wherein the first hardness is less than the second hardness to define a negative hardness gradient.

Moreover, the golf ball may comprise a core and a cover, the core comprising an outer surface and a geometric center, the outer surface being treated with a fatty acid and/or fatty acid salt composition, the outer surface having a hardness that is less than a hardness of the geometric center to define a negative hardness gradient.

In any embodiment, each core region and core layer may radially extend from the geometric center and be concentric with the geometric center. Similarly, the core outer surface may be concentric with the geometric center.

As discussed more fully below, the fatty acid and/or fatty acid salt composition acts as a plasticizer to soften the treated core surface and become intimately mixed therewith.

The present invention is directed to a method of making a golf ball comprising the steps of providing an untreated golf ball core comprising a thermoset rubber composition, the untreated golf ball core comprising an untreated outer surface having a hardness; treating the untreated outer surface of the untreated golf ball core with a surface-softening material comprising at least one fatty acid or fatty acid salt composition to form a golf ball core comprising a treated outer surface having a hardness less than the hardness of the untreated outer surface; and forming at least one cover layer about the core to form the golf ball.

Further, the present invention is directed to a method of making a golf ball comprising the steps of providing an untreated golf ball core comprising a thermoset rubber composition, said untreated golf ball core comprising a geometric center and an untreated outer surface, each having a hardness; treating the untreated golf ball core with a surface-softening material comprising at least one fatty acid or fatty acid salt composition to form a golf ball core comprising a treated outer surface having a hardness less than the hardness of the untreated outer surface, the treated outer surface further having a surface hardness less than the hardness of the geometric center of the untreated golf ball core to define a negative hardness gradient; and forming a cover layer about the core to form the golf ball.

In an alternative embodiment, the invention is directed to a method of making a golf ball comprising the steps of providing a preform comprising an uncured polybutadiene composition; coating the preform with a first surface-softening material comprising at least one of a fatty acid compound or a fatty acid salt compound; curing the coated preform at a predetermined temperature to form a crosslinked golf ball core having an outer surface having a first hardness and a geometric center having a second hardness greater than the first to define a negative hardness gradient; and forming a cover layer about the core to form the golf ball.

Additionally, the present invention is directed to a method of making a golf ball comprising the steps of: extruding a polybutadiene composition to form a cylindrical extrudate; cutting the extrudate to form an uncured polybutadiene preform; uniformly coating the preform with a surface-softening material comprising at least one fatty acid or fatty acid salt composition; curing the coated preform to form a crosslinked core having an outer surface having a first hardness and a geometric center having a second hardness greater than the first to define a negative hardness gradient; centerless-grinding the cured core to form a uniformly-spherical core having increased surface roughness; forming an inner cover layer about the uniformly-spherical core; and forming an outer cover layer about the inner cover layer to form the golf ball. Alternatively, the golf ball comprises several layers which are treated with a surface-softening material comprising at least one fatty acid or fatty acid salt composition or blends/combinations thereof.

The present invention is also directed to a golf ball comprising a core and a cover, wherein the core has an outer surface that is treated with a surface-softening material comprising at least one fatty acid or fatty acid salt composition such that the outer surface has a hardness ratio (R) of the hardness after treatment ($H_2$) to the hardness before treatment ($H_1$) of less than about 0.95.

The invention is further directed to a golf ball comprising a core and a cover, wherein the core has a geometric center having a hardness ($H_g$) and the core has an outer surface that is treated with a surface-softening material comprising at least one fatty acid or fatty acid salt composition such that the outer surface has an extrapolated hardness ($H_E$) and an actual hardness ($H_{OS}$) wherein $H_E$ is derived from a five point extrapolation within three quarters of an outer core diameter and $H_{OS}$ is measured on the curved surface of the core, and the cover has a hardness ($H_C$), wherein $H_C > H_E > H_g > H_{OS}$.

In still another embodiment, a golf ball comprises a core and a cover, wherein the core has a geometric center having a hardness ($H_g$) and the core has an outer surface that is treated with at least one fatty acid or fatty acid salt such that the outer surface has an extrapolated hardness ($H_E$) and an actual hardness ($H_{OS}$) wherein $H_E$ is derived from a five point extrapolation within three quarters of an outer core diameter and $H_{OS}$ is measured on the curved surface of the core, and the cover has a hardness ($H_C$), wherein $H_E > H_g > H_{OS} > H_C$.

The present invention provides a golf ball comprising a core and a cover wherein the core comprises an outer surface and a geometric center, the outer surface being treated with and comprising a fatty acid and/or fatty acid salt composition. The outer surface has a first hardness and the geometric center has a second hardness wherein the first hardness is less than the second hardness to define a negative hardness gradient.

In one embodiment, the core comprises a thermoset rubber composition. The thermoset rubber composition may comprise a polybutadiene material and/or have a surface hardness of about 50 Shore C or greater. In another embodiment, the polybutadiene composition is at least partially crosslinked.

The at least one fatty acid and/or fatty acid salt composition may comprise oleic acid, palmitic acid, stearic acid, behenic acid, pelargonic acid, linoleic acid, linolenic acid, arachidonic acid, caproic acid, caprylic acid, capric acid, lauric acid, erucic acid, myristic acid, benzoic acid, phenylacetic acid, or naphthalenoic acid.

The at least one fatty acid and/or fatty acid salt composition may comprise a cation selected from the group comprising barium, lithium, sodium, zinc, bismuth, chromium, cobolt, copper, potassium, strontium, titanium, tungsten, magnesium, cesium, iron, nickel, silver, aluminum, tin and calcium.

The at least one fatty acid and/or fatty acid salt composition may further comprise at least one of an antioxidant, a sulfur-bearing compound, zinc methacrylate, zinc dimethacrylate, a softening acrylate monomer or oligomer, a thermoplastic resin, or an hydroquinone.

The thermoplastic resin may comprise at least one of polyethylene vinyl acetate, polyethylene butyl acrylate, polyethylene methyl acrylate, polyethylene acrylic acid, polyethylene methacrylic acid or an ionomer.

An intermediate core layer may be disposed about the core and adjacent the cover layer.

In another embodiment, the golf ball comprises a core and a cover. The core comprises an outer surface and a geometric center. The outer surface comprises a fatty acid and/or fatty acid salt composition and has a first hardness and the geometric center has a second hardness greater than the first hardness to define a negative hardness gradient.

In a further embodiment, the golf ball comprises a core and at least one cover layer disposed about the core. The core comprises a geometric center and an outer surface. The core further comprises an untreated region extending radially from the geometric center a predetermined distance $D_{UTr}$. A treated region is disposed about the untreated region and extends inward from the outer surface a predetermined depth $D_{Tr}$. The untreated region and the treated region are adjacent each other and concentric with the geometric center. The treated region has been exposed to and comprises a fatty acid and/or fatty acid salt composition. The treated region comprises a first hardness and the untreated region comprises a second hardness different than the first hardness.

In one embodiment, the first hardness is less than the second hardness. In additional embodiments, the first hardness may be greater than or the same as the second hardness. These additional embodiments may occur where, for example, the hardness of the treated region was greater than the hardness of the untreated region prior to being treated with the fatty acid and/or fatty acid salt composition. Or, it may occur where the fatty acid/fatty acid salt treated and comprising region further comprises materials/compositions including but not limited to zinc methacrylate, zinc dimethacrylate, a thermoplastic resin, an hydroquinone, and/or peroxide which tend to harden the fatty acid and/or fatty acid salt treated and comprising surface or region. Meanwhile, however, an improved golf ball is provided over golf balls which have not been treated with nor comprise a fatty acid and/or fatty acid salt composition as in the present invention.

The golf ball core may further comprise an intermediate untreated region disposed about the untreated region and adjacent the treated region, said intermediate untreated region comprising a third hardness wherein the first hardness is greater than the second hardness and less than the third hardness.

Alternatively, the golf ball core may further comprise an intermediate untreated region disposed about the untreated region and adjacent the treated region, said intermediate untreated region comprising a third hardness wherein the first hardness is less than the second hardness and the third hardness.

The golf ball core may comprise an intermediate untreated region disposed about the untreated region and adjacent the treated region, said intermediate untreated region comprising a third hardness wherein the first hardness is greater than the second hardness and the third hardness.

The golf ball core may comprise an intermediate untreated region disposed about the untreated region and adjacent the treated region, said intermediate untreated region comprising a third hardness wherein the first hardness is greater than the second hardness and substantially similar to the third hardness.

In still another embodiment, the golf ball comprises a core and at least one cover layer disposed about the core. The core comprises a geometric center and an outer surface. The core further comprises an untreated region extending radially from the geometric center a distance $D_{UTr}$. A treated region is disposed about the untreated region and extends inward from the outer surface a depth $D_{Tr}$. The treated region has been exposed to and comprises a fatty acid and/or fatty acid salt composition. The treated region comprises a first hardness and the untreated region comprises a second hardness wherein the first hardness is different than the second hardness.

In yet another embodiment, the golf ball comprises a core and at least one cover layer disposed about the core. The core comprises a geometric center and an outer surface. The core further comprises an untreated region which extends radially from the geometric center a distance $D_{UTr}$. Additionally, treated region is disposed about the untreated region and extends inward from the outer surface a depth $D_{Tr}$. The treated region has been exposed to and comprises a fatty acid and/or fatty acid salt composition. Furthermore, the core comprises an intermediate untreated region disposed about the untreated region and adjacent the treated region. The intermediate untreated region has a third hardness, wherein the first hardness is different than the second hardness and the third hardness.

The core may comprise a single layer core comprising the untreated region, the intermediate untreated region and the treated region.

The core may comprise a multilayer core comprising a first core layer extending radially from the geometric center and a second core layer disposed about the first core layer, wherein the first core layer comprises the untreated region and the second core layer comprises the treated region. The treated region may alternatively occupy not only the second core layer but also extend into a region within the first core layer adjacent the second core layer.

Further, the core may comprise a first core layer extending radially from the geometric center and a second core layer disposed about the first core layer, wherein the first core layer comprises the untreated region and an intermediate untreated region, and the second core layer comprises the treated region.

The core may also comprise a first core layer extending radially from the geometric center, a second core layer disposed about the first core layer and a third core layer disposed about the second core layer, wherein the first core layer comprises the untreated region, wherein the second core layer comprises the intermediate untreated region, and wherein the third core layer comprises the treated region.

The present invention is also directed to a golf ball comprising a core and a cover wherein the core comprises a geometric center and a treated outer surface, the treated outer surface having a first hardness and the geometric center having a second hardness, the treated outer surface being treated with a surface-softening material comprising at least one fatty acid and/or fatty acid salt composition such that the second hardness is greater than the first hardness to define a negative hardness gradient.

In another embodiment, the golf ball comprising a core and a cover, the core comprising a geometric center and an outer surface, the outer surface comprising fatty acid and/or fatty acid salt composition, the geometric center having a hardness ($H_g$) and the outer surface having an extrapolated hardness ($H_E$) and an actual hardness ($H_{OS}$) wherein $H_E$ is derived from a five point extrapolation within three quarters of an outer core diameter and $H_{OS}$ as measured on the curved surface of the core, and the cover has a hardness ($H_C$), wherein $H_C > H_E > H_g > H_{OS}$.

Also, the present invention may be directed to a golf ball comprising a core and a cover, the core comprising a geometric center and an outer surface, the outer surface comprising fatty acid and/or fatty acid salt composition, the geometric center having a hardness ($H_g$) and the outer surface having an extrapolated hardness ($H_E$) and an actual hardness ($H_{OS}$) wherein $H_E$ is derived from a five point extrapolation within three quarters of an outer core diameter and $H_{OS}$ as measured on the curved surface of the core, and the cover has a hardness ($H_C$), wherein $H_C < H_E > H_g > H_{OS}$.

The golf ball may advantageously comprise a thermoset rubber composition core and a cover, said core comprising an outer surface and a geometric center, the outer surface having a treated region comprising a fatty acid and/or fatty acid salt composition extending inward from the outer surface from about 0.001 inches to about 0.200 inches, the treated region further having a first hardness and the geometric center having a second hardness, wherein the first hardness is less than the second hardness to define a negative hardness gradient.

Additionally, the golf ball may comprise a core and a cover, said core comprising a fatty acid and/or fatty acid salt composition outer surface and a geometric center, the fatty acid and/or fatty acid salt composition outer surface having a first hardness and the geometric center having a second hardness wherein the first hardness is less than the second hardness to define a negative hardness gradient.

Moreover, the golf ball may comprise a core and a cover, the core comprising an outer surface and a geometric center, the outer surface being treated with a fatty acid and/or fatty acid salt composition, the outer surface having a hardness that is less than a hardness of the geometric center to define a negative hardness gradient.

In any embodiment, each core region and core layer may radially extend from the geometric center and be concentric with the geometric center. Similarly, the core outer surface may be concentric with the geometric center.

As discussed more fully below, the fatty acid and/or fatty acid salt composition acts as a plasticizer to soften the treated core surface and become intimately mixed therewith.

The present invention is directed to a method of making a golf ball comprising the steps of providing an untreated golf ball core comprising a thermoset rubber composition, the untreated golf ball core comprising an untreated outer surface having a hardness; treating the untreated outer surface of the untreated golf ball core with a surface-softening material comprising at least one fatty acid or fatty acid salt composition to form a golf ball core comprising a treated outer surface having a hardness less than the hardness of the untreated outer surface; and forming at least one cover layer about the core to form the golf ball.

Further, the present invention is directed to a method of making a golf ball comprising the steps of providing an untreated golf ball core comprising a thermoset rubber composition, said untreated golf ball core comprising a geometric center and an untreated outer surface, each having a hardness; treating the untreated golf ball core with a surface-softening material comprising at least one fatty acid or fatty acid salt composition to form a golf ball core comprising a treated outer surface having a hardness less than the hardness of the untreated outer surface, the treated outer surface further having a surface hardness less than the hardness of the geometric center of the untreated golf ball core to define a negative hardness gradient; and forming a cover layer about the core to form the golf ball.

In an alternative embodiment, the invention is directed to a method of making a golf ball comprising the steps of providing a preform comprising an uncured polybutadiene composition; coating the preform with a first surface-softening material comprising at least one of a fatty acid compound or a fatty acid salt compound; curing the coated preform at a predetermined temperature to form a crosslinked golf ball core having an outer surface having a first hardness and a geometric center having a second hardness greater than the first to define a negative hardness gradient; and forming a cover layer about the core to form the golf ball.

Additionally, the present invention is directed to a method of making a golf ball comprising the steps of: extruding a polybutadiene composition to form a cylindrical extrudate; cutting the extrudate to form an uncured polybutadiene preform; uniformly coating the preform with a surface-softening material comprising at least one fatty acid or fatty acid salt composition; curing the coated preform to form a crosslinked core having an outer surface having a first hardness and a geometric center having a second hardness greater than the first to define a negative hardness gradient; centerless-grinding the cured core to form a uniformly-spherical core having increased surface roughness; forming an inner cover layer about the uniformly-spherical core; and forming an outer cover layer about the inner cover layer to form the golf ball. Alternatively, the golf ball comprises several layers which are treated with a surface-softening material comprising at least one fatty acid or fatty acid salt composition or blends/combinations thereof.

The present invention is also directed to a golf ball comprising a core and a cover, wherein the core has an outer surface that is treated with a surface-softening material comprising at least one fatty acid or fatty acid salt composition such that the outer surface has a hardness ratio (R) of the hardness after treatment ($H_2$) to the hardness before treatment ($H_1$) of less than about 0.95.

The invention is further directed to a golf ball comprising a core and a cover, wherein the core has a geometric center having a hardness ($H_g$) and the core has an outer surface that is treated with a surface-softening material comprising at least one fatty acid or fatty acid salt composition such that the outer surface has an extrapolated hardness ($H_E$) and an actual hardness ($H_{OS}$) wherein $H_E$ is derived from a five point extrapolation within three quarters of an outer core diameter and $H_{OS}$ is measured on the curved surface of the core, and the cover has a hardness ($H_C$), wherein $H_C > H_E > H_g > H_{OS}$.

In still another embodiment, a golf ball comprises a core and a cover, wherein the core has a geometric center having a hardness ($H_g$) and the core has an outer surface that is treated with at least one fatty acid or fatty acid salt such that the outer surface has an extrapolated hardness ($H_E$) and an actual hardness ($H_{OS}$) wherein $H_E$ is derived from a five point extrapolation within three quarters of an outer core diameter and $H_{OS}$ is measured on the curved surface of the core, and the cover has a hardness ($H_C$), wherein $H_E > H_g > H_{OS} > H_C$.

An advantage of the present invention is that a core is formed having a hardness gradient between the core treated outer surface comprising the fatty acid and/or fatty acid salt composition and the untreated regions within the core. The fatty acid and/or fatty acid salt composition becomes part of the resulting core surface following treatment of the core outer surface with the fatty acid and/or fatty acid salt composition. The fatty acid and/or fatty acid salt composition acts as a plasticizer to penetrate and soften the core surface and thereby create a gradient between the core outer surface and other core regions within the core. For example, a gradient is formed between the geometric center and the treated outer surface. The long hydrocarbon chains of the fatty acids and/or fatty acid salts increase the free volume between the polymer chains to soften the crosslinked network resulting in a lower hardness measurement.

The fatty acid and/or fatty acid salt compositions maintain plasticizer permanence within the core surface through several mechanisms. Fatty acid salts inherently have low volatility and permanence due to their ability to solidify and/or crystallize within the polymer network minimizing or eliminating migration. Although the fatty acid salts solidify and/or crystallize, they continue to reduce the hardness of the original crosslinked network. The fatty acids are highly compatible with the polymer network aiding in plasticizer permanence. Accordingly, the fatty acid and/or fatty acid salt composition embeds itself between polymer chains, spacing the chains apart and thereby increasing free volume. Additionally, since the core and cover formulations contain significant amounts of reactive metal oxides and/or metal salts, the fatty acids will react or coordinate with the various cation sources in the polymer matrix improving the thermal stability and permanence of the plasticizer. Furthermore, a free radical initiator can be used in conjunction with the fatty acids and/or fatty acid salts, especially when the fatty acids and/or fatty acid salts contain some unsaturation, to covalently bond the plasticizer to the polymer network further improving the plasticizer permanence.

The present invention is directed to methods for treating golf ball cores to reduce core surface hardness, and to golf balls having reduced surface hardness. In a first embodiment, an untreated thermoset rubber golf ball core comprising an untreated outer surface having an untreated surface hardness, is treated with a surface-softening material comprising at least one fatty acid or fatty acid salt composition. The resulting treated golf ball core comprises a treated outer surface having a hardness which is less than the hardness of the untreated outer surface. Then, at least one cover layer is formed about the treated core to form the golf ball.

The thermoset rubber composition may comprise, for example, polybutadiene compositions as discussed herein. The terms thermoset rubber, cured rubber, and crosslinked rubber are used interchangeably herein, and all refer to a diene rubber composition which has undergone at least some degree of polymerization.

The step of treating typically includes but is not limited to coating, rolling, dipping, soaking, spraying, dusting, or exposing the untreated golf ball core to at least one fatty acid or fatty acid salt composition or blends/combinations thereof.

The at least one fatty acid or fatty acid salt composition may include, for example, oleic acid, palmitic acid, stearic acid, behenic acid, pelargonic acid, linoleic acid, linolenic acid, arachidonic acid, caproic acid, caprylic acid, capric acid, lauric acid, erucic acid, myristic acid, benzoic acid, phenylacetic acid, or naphthalenoic acid. The at least one fatty acid or fatty acid salt composition may further include antioxidants, sulfur-bearing compounds, zinc methacrylate, zinc dimethacrylate, softening acrylate monomers or oligomers, soft powdered thermoplastic resins, phenol-comprising antioxidants, or hydroquinones.

The untreated golf ball core may also include other compositions for modifying the properties of the core surface, such as thermoplastic elastomers and other polymers, also discussed herein.

In addition, the step of treating the untreated core with the fatty acid or fatty acid salt composition or blends/combinations of the present invention may be followed by a subsequent step of neutralizing the treated core/preform surface, either partially or fully, with a cation or other suitable source. Suitable cation sources include but are not limited to barium, lithium, sodium, zinc, bismuth, chromium, cobolt, copper, potassium, strontium, titanium, tungsten, magnesium, cesium, iron, nickel, silver, aluminum, tin and calcium.

In a further embodiment, an untreated crosslinked golf ball core comprising a thermoset rubber composition has a geometric center and an untreated outer surface, each having a hardness. The untreated crosslinked golf ball core is treated with a surface-softening material comprising at least one fatty acid or fatty acid salt composition. A golf ball core is then formed comprising a treated outer surface having a hardness less than the hardness of the untreated outer surface. The treated outer surface may further have a surface hardness less than the hardness of the geometric center of the untreated golf ball core to define a negative hardness gradient. Then, a cover layer is formed about the core to form the golf ball.

In an alternative embodiment, a preform comprising an uncured polybutadiene composition is coated with a first surface-softening material comprising at least one of a fatty acid compound or a fatty acid salt compound. Following treatment with the fatty acid and/or fatty acid salt compositions, the uncured treated golf ball core material may be compression molded at a predetermined temperature for a predetermined time, e.g. 330-360° F. for 11 minutes to form a molded core. A crosslinked golf ball core is thus formed having an outer surface having a first hardness and a geometric center having a second hardness greater than the first to define a negative hardness gradient. Then, optionally, the molded core may also be subjected to Gleber or centerless grinding. A cover layer is then formed about the core to form the golf ball.

In another embodiment, a polybutadiene composition is extruded to form a cylindrical extrudate and the extrudate is cut to form an uncured polybutadiene perform. The perform is then cold formed into a sphere, and uniformly coated with a surface-softening material comprising at least one fatty acid and/or fatty acid salt composition. In a preferred embodiment, the perform is subjected to centerless grinding prior to the treating step. The core may also be preheated to a predetermined temperature followed by treatment with the fatty acid and/or fatty acid salt composition. The coated preform is then cured to form a crosslinked core having an outer surface having a first hardness and a geometric center having a second hardness greater than the first to define a negative hardness gradient. In an alternative embodiment, the cured core is subsequently subjected to center-less grinding to form a uniformly-spherical core having increased surface roughness, an inner cover layer is formed about the uniformly-spherical core, and an outer cover layer is formed about the inner cover layer to form the golf ball. The core may also alternatively be heated at a predetermined temperature for a predetermined time following treatment with the fatty acid/fatty acid salt composition.

In one embodiment, the thermoset rubber composition core is partially cured before the step of treating the core with the surface-softening materials of the present invention. Following treatment, the treated core is subjected to conditions, for example, heat, in order to affect additional curing or crosslinking. Additionally, the golf ball core may comprise several layers which are treated with a surface-softening material comprising at least one fatty acid or fatty acid salt composition or blends/combinations thereof.

In one embodiment, a golf ball comprises a core and a cover, wherein the core has an outer surface that is treated with at least one fatty acid such that the outer surface has a hardness ratio (R) of the hardness after treatment ($H_2$) to the hardness before treatment ($H_1$) of less than about 0.95.

In yet another embodiment, a golf ball comprises a core and a cover, wherein the core has a geometric center having a hardness ($H_g$) and the core has an outer surface that is treated with at least one fatty acid or fatty acid salt such that the outer surface has an extrapolated hardness ($H_E$) and an actual hardness ($H_{OS}$) wherein $H_E$ is derived from a five point extrapolation within three quarters of an outer core diameter and $H_{OS}$ is measured on the curved surface of the core, and the cover has a hardness ($H_C$), wherein $H_C > H_E > H_g > H_{OS}$.

In still another embodiment, a golf ball comprises a core and a cover, wherein the core has a geometric center having a hardness ($H_g$) and the core has an outer surface that is treated with at least one fatty acid or fatty acid salt such that the outer surface has an extrapolated hardness ($H_E$) and an actual hardness ($H_{OS}$) wherein $H_E$ is derived from a five point extrapolation within three quarters of an outer core diameter and $H_{OS}$ is measured on the curved surface of the core, and the cover has a hardness ($H_C$), wherein $H_E > H_g > H_{OS} > H_C$.

The balls of the present invention may include a single-layer (one-piece) golf ball, two-piece golf ball (core and cover) and multi-layer or multi-piece golf balls, such as one having a core of one or more layers and a cover of one or more layers surrounding the core, but are preferably formed from a core comprised of a solid center (otherwise known as an inner core) and an outer core layer, an inner cover layer and an outer cover layer. Of course, any of the core and/or the cover layers may include more than one layer. In a preferred embodiment, the core is formed of an inner core and an outer core layer where both the inner core and the outer core layer have a "soft-to-hard" hardness gradient (a "negative" hardness gradient) radially inward from each component's outer surface towards its innermost portion (i.e., the center of the inner core or the inner surface of the outer core layer), although alternative embodiments involving varying direction and combination of hardness gradient amongst core components are also envisioned (e.g., a "negative" gradient in the center coupled with a "positive" gradient in the outer core layer, or vice versa).

The center of the core may also be a liquid-filled or hollow sphere surrounded by one or more intermediate and/or cover layers, or it may include a solid or liquid center around which tensioned elastomeric material is wound. Any layers disposed around these alternative centers may exhibit the inventive core surface-softening. The cover layer may be a single layer or, for example, formed of a plurality of layers, such as an inner cover layer and an outer cover layer.

As briefly discussed above, the inventive cores may have a hardness gradient defined by hardness measurements made at the surface of the inner core (or outer core layer) and radially inward toward the center of the inner core, typically at 2-mm increments. As used herein, the terms "negative" and "positive" refer to the result of subtracting the hardness value at the innermost portion of the component being measured (e.g., the center of a solid core or an inner core in a dual core construction; the inner surface of a core layer; etc.) from the hardness value at the outer surface of the component being measured (e.g., the outer surface of a solid core; the outer surface of an inner core in a dual core; the outer surface of an outer core layer in a dual core, etc.). For example, if the outer surface of a solid core has a lower hardness value than the center (i.e., the surface is softer than the center), the hardness gradient will be deemed a "negative" gradient (a smaller number–a larger number=a negative number). It is preferred that the inventive cores have a zero or a negative hardness gradient. In one embodiment, the hardness of the treated outer surface is at least 5 Shore C less than the hardness of the untreated golf ball core surface. In another embodiment, the hardness of the treated outer surface is at least 10 Shore C less than the hardness of the untreated golf ball core surface. In a preferred "negative" gradient embodiment, the core outer surface hardness is lower than the core geometric center hardness by about 0 to 30 Shore C, more preferably by about 5 to 25 Shore C lower, and at most the core outer surface hardness is about 8 to 20 Shore C lower than the core geometric center hardness.

The invention is more particularly directed to the creation of a soft "skin" on the outermost surface of the core, such as the outer surface of a single core or the outer surface of the outer core layer in a dual core construction. The "skin" is typically defined as the volume of the core that is within about 0.001 inches to about 0.200 inches of the surface, preferably about 0.003 inches to about 0.100 inches, and more preferably about 0.005 inches to about 0.060 inches. Alternatively, the volume may be within 0.008 inches to about 0.030 inches of the surface. In one embodiment, a single or multi-layer core is treated as a preform (prior to molding) by coating the surface of the preform with a surface-softening material.

The surface-softening material may be in a solid form, typically a powder, prill, gaseous or small pellet, but alternatively may be in solution form, such as a liquid, dispersion, or slurry in a solvent. Suitable solvents or carriers include, but are not limited to, water, hydrocarbon solvents, polar solvents, and plasticizers. If a liquid is used, it is preferably one that dissolves the fatty acid. Most preferably, the surface-softening material is a liquid at or near room temperature and requires no solvent.

Preferably, the layer to be treated with the surface-softening material is a core or core layer, but also in an alternative embodiment the layer is a cover or cover layer (inner or outer cover layer) comprising a diene rubber composition, preferably polybutadiene rubber.

In a preferred embodiment, the golf ball core surface or preform is coated by rolling, dipping, soaking, spraying, dusting, or otherwise exposing the core surface to at least one surface-softening material comprising at least one fatty acid or fatty acid salt composition or blends/combinations thereof.

Suitable fatty acids include but are not limited to oleic acid, palmitic acid, stearic acid, behenic acid, pelargonic acid, linoleic acid, linolenic acid, arachidonic acid, caproic acid, caprylic acid, capric acid, lauric acid, erucic acid, myristic acid, benzoic acid, phenylacetic acid, naphthalenoic acid, dimerized derivatives thereof, salts, cation, blends and combinations thereof. Certain fatty acids such as oleic acid, linoleic acid, linolenic acid, arachidonic acid are particularly suitable because they are in liquid form at room temperature and the core can therefore be easily immersed/dipped in the neat material. Such fatty acids include, for example, oleic acid, linoleic acid, linolenic acid and arachidonic acid.

Suitable fatty acid cations include, for example, barium, lithium, sodium, zinc, bismuth, chromium, cobolt, copper, potassium, strontium, titanium, tungsten, magnesium, cesium, iron, nickel, silver, aluminum, tin and calcium.

Additional suitable surface-softening and/or cure-altering materials may be either combined directly with the fatty acid or fatty acid salt composition and blends/combinations and/or used to pretreat the preform prior to coating the perform with the fatty acid fatty acid salt compositions. Examples include, but are not limited to, antioxidants, sulfur-bearing compounds such as pentachlorothiophenol or metal salts thereof, ZDMA, softening acrylate monomers or oligomers, and soft powdered thermoplastic resins such as ethyl vinyl acetate, ethylene butyl acrylate, ethylene methyl acrylate, and very-low-modulus ionomers. Preferred additional surface softening materials include, for example, phenol-comprising antioxidants, hydroquinones, and "soft and fast" agents, such as organosulfur compounds, inorganic sulfur compounds, and thiophenols, particularly pentachlorothiophenol (PCTP) and metal salts of PCTP, such as ZnPCTP, MgPCTP, DTDS, and those disclosed in U.S. Pat. Nos. 6,458,895; 6,417,278; and 6,635,716; and U.S. Patent Application Publication Serial No. 2006/021586, the disclosures of which are incorporated herein by reference. Alternatively, thermoplastic or thermosetting powders, such as low molecular weight polyethylene, ethyl vinyl acetate, ethylene copolymers and terpolymers (i.e., NUCREL®), ethylene butyl acrylate, ethylene methyl acrylate, polyurethanes, polyureas, polyurethane-copolymers (i.e., silicone-urethanes), PEBAX®, HYTREL®, polyesters, polyamides, epoxies, silicones, and Micromorph® materials, such as those disclosed in U.S. patent application Publication Ser. Nos. 11/690,530 and 11/690,391, incorporated herein by reference.

In one particularly preferred embodiment, a polybutadiene rubber preform is coated with an antioxidant-comprising powder and then molded at 350-360° F. for 11 minutes to form a single core. The resultant core has an outer diameter of about 1.580 inches and a geometric center-point hardness of about 60 to 80 Shore C, preferably about 65 to 78 Shore C, and most preferably about 70 to 75 Shore C. At a point about 15 mm to about 20 mm from the center point of the core, the soft "skin" has a hardness of about 60 to 80 Shore C, preferably about 65 to 75 Shore C, and most preferably about 68 to 74 Shore C, resulting in an overall gradient (as measured from center to surface) of zero, and most preferably negative (i.e., about −30 to 0, more preferably about −15 to 0, most preferably about −10 to 0). The core of this example typically has an Atti compression of about 70 and a COR of about 0.800, when measured at an incoming velocity of 125 ft/s. Preferred core compressions are 110 of less, preferably 100 or less, more preferably 90 or less, and most preferably 80 or less.

A second particularly preferred embodiment is a two-piece core formed from an inner core and an outer core layer. The inner core may or may not be "treated" as described herein, but preferably the outer core layer is treated to create the soft outer "skin." In one embodiment, a soft inner core is surrounded by a relatively hard outer core layer. The inner core preferably has a an outer diameter of about 1.0 inch, a center point hardness of about 55 to 60 Shore C, and an outer surface hardness of about 75 to 80 Shore C. The surface hardness of the modified "skin" of the outer core layer is about 60 to 80 Shore C, more preferably about 65 to 75 Shore C, and most preferably about 68 to 74 Shore C. A preferred overall gradient is negative to zero, most preferably negative (i.e., about −30 to 0, more preferably about −20 to −3, and most preferably about −15 to −5).

The core formulations used in the invention are preferably based upon high-cis polybutadiene rubber that is cobalt-, nickel-, lithium-, or neodymium-catalyzed, most preferably Co- or Nd-catalyzed, having a Mooney viscosity of about 25 to about 125, more preferably about 30 to about 100, and most preferably about 40 to about 60. Lesser amounts of non-polybutadiene rubber, such as styrene butadiene rubber, trans-polyisoprene, natural rubber, butyl rubber, ethylene propylene rubber, ethylene propylene diene monomer rubber, low-cis polybutadiene rubber, or trans polybutadiene rubber, may also be blended with the polybutadiene rubber. A coagent, such as zinc diacrylate or zinc dimethacrylate, is typically present at a level of about 0 pph to about 60 pph, more preferably about 10 pph to about 55 pph, and most preferably about 15 pph to about 40 pph. A peroxide or peroxide blend is also typically present at about 0.1 pph to about 5.0 pph, more preferably about 0.5 pph to about 3.0 pph. Zinc oxide may also be present at about 2 pph to about 50 pph and the antioxidant is preferably present at about 0 pph to about 5.0 pph, preferably about 0.5 pph to about 3.0 pph. Elemental sulfur may also be present in the amount of about 0.05 to 2 pph, preferably about 0.1 to 0.5 pph.

Other embodiments include any number of core layers and gradient combinations wherein at least one layer of the core has a surface that is "treated" as described herein.

Scrap automotive tire regrind (in fine powder form) is also sufficient for creating the inventive soft outer "skin," as well as other powdered rubbers that are uncrosslinked or partially crosslinked and therefore able to react with the polybutadiene. Fully crosslinked powdered rubber may also still have enough affinity for the polybutadiene substrate to adhere (even react minimally) enough to form a good bond.

The inner and outer core formulations may comprise a diene rubber, a cure initiator, and a coagent. Suitable diene rubbers include, for example, those disclosed in U.S. patent application Ser. No. 11/561,923 ('923 application), incorporated herein by reference. Suitable cure initiators include for example, peroxide or sulfur. The coagent may comprise ZDA, ZDMA, TMPTA, HVA-2 or any of those identified in the '923 application. Optionally, the formulations may also include one or more of a zinc oxide, zinc stearate or stearic acid, antioxidant, or soft to fast agent such as PCTP or ZnPCTP. Either the inner or outer core, more preferably the outer core, may further comprise from about 1 to 100 phr of a stiffening or toughening thermoplastic polymer such as an ionomer, an acid co- or ter-polymer, polyamide, polyester or any as disclosed in U.S. Pat. No. 6,120,390 or 6,284,840, incorporated herein by reference. Preferably, the inner and outer core layers comprise a high cis-neodymium catalyzed polybutadiene such as Neodene 40 or CB-23, or a cobalt or nickel or lithium catalyzed PBR such as BR-1220 or BR-221. A trans PIP, for example balata TP-301, or trans BR may be used to add stiffness to the cores and/or improve cold forming properties, particularly for ease of molding a half-shell for the outer core formation.

Other potential surface-softening or cure-altering agents include, but are not limited to, sulfated fats, sodium salts of alkylated aromatic sulfonic acids, substituted benzoid alkyl sulfonic acids, monoaryl and alkyl ethers of diethylene glycol and dipropylene glycol, ammonium salts of alkyl phosphates, sodium alkyl sulfates and monosodium salt of sulfated methyl oleate and sodium salts of carboxylated eletrolytes. Other suitable materials include dithiocarbamates, such as zinc dimethyl dithiocarbamate, zinc diethyl dithiocarbamate, zinc di-n-butyl dithiocarbamate, zinc diamyl dithiocarbamate, tellurium diethyl dithiocarbamate, selenium dimethyl dithiocarbamate, selenium diethyl dithiocarbamate, lead diamyl dithiocarbamate, bismuth dimethyl dithiocarbamate, cadmium diethyl dithiocarbamate, and mixtures thereof.

The method for making the golf ball of the invention includes a variety of steps and options. Typically, a Banbury-type mixer or the like is used to mix the polybutadiene rubber composition. The rubber composition is extruded as an extrudate and cut to a predetermined shape, such as a cylinder, typically called a "preform". The preform comprising the uncured polybutadiene composition is then prepared for coating with at least one of the surface-softening (inhibiting) materials, liquids, or solvents described above. Other surface-softening and/or cure-altering materials may be added for coating, comprising antioxidants, sulfur-bearing compounds, zinc methacrylate, zinc dimethacrylate, softening acrylate monomers or oligomers, soft powdered thermoplastic resins, phenol-comprising antioxidants, or hydroquinones, most preferably an antioxidant.

In one embodiment, more than one surface-softening material is used, in succession. In this embodiment, a preferred combination includes a first surface-softening material in combination with a cure-altering material such as an antioxidant and a second cure-altering material such as a different antioxidant or a peroxide. A compatiblilizer and/or tie layer may be incorporated as well. Additionally, a two-stage dip or roll (in the cure-altering material) may be used to sequentially also provide a first and second antioxidant or an antioxidant and a peroxide in addition to providing the fatty acid and/or fatty acid salt composition.

Optionally, prior to coating the preform, the uncured preform may be shaped or cold-formed into a rough sphere. The coating may be performed in a variety of manners including, but not limited to, rolling, spraying, dipping, or dusting or otherwise exposing. The coating may be uniform or varied, but is preferably uniform.

The uncured, coated preform may optionally be heated to a predetermined temperature for a predetermined time, the temperature being substantially below the predetermined cure temperature, so that the cure-altering material may diffuse, penetrate, migrate, or otherwise work its way into the preform or, alternatively, any solvent may evaporate or the preform may dry (if the coating was in liquid form). Where two surface-softening materials are employed in a coating, or in the case where a surface-softening material is used in combination with a cure-altering material as the coating material, the predetermined time may also be set in order to allow any reaction that may occur to come to completion.

The uncured coated preform is then cured or molded at a predetermined temperature and time to form a crosslinked golf ball core. As described in detail above, the core has an outer surface having a first hardness and a geometric center having a second hardness greater than the first to define a "negative" hardness gradient. Any one of a number of cover layers may be formed around the "negative" gradient core including, but not limited to, an outer core layer, an inner cover layer, and an outer cover layer.

The cured core is then typically subjected to centerless-grinding so that the core is uniformly spherical and has a surface than is roughened and textured to be better suited for adhesion with subsequent layers. Prior to or after the centerless grinding, the core may be treated with plasma discharge, corona discharge, silanes, or chlorination, for example, to aid in its adhesion properties.

In a preferred embodiment, a thermoset rubber core is soaked in a liquid fatty acid composition including, for example, oleic acid. Following the soaking step, the core is removed from the surface-softening composition and wiped dry in order to remove any excess oleic acid. A cover layer is then molded over the treated core. Preferably, the surface hardness is reduced from about 85 Shore C to about 83 Shore C or less, and more preferably, to about 80 Shore C or less. In one embodiment, a negative gradient may be created if the Shore C surface hardness after treatment is about 60 Shore C or less and the center hardness is about 62 Shore C. The degree of resulting core surface softness is directly related to the duration of core surface exposure to the surface-softening composition so that a particular resulting core surface hardness may be achieved by varying the duration of exposure.

Alternatively, the fatty acid may comprise a heated molten form of magnesium oleate. Additionally, the core may be exposed i.e., dipped or soaked, in a solvent solution of stearic acid and zinc oxide in tetrahydrofuran (THF).

In one embodiment, the untreated thermoset rubber golf ball core has an outer diameter of 1.400-1.640 inches, and more preferably 1.50-1.62 inches, and most preferably 1.55-1.60 inches. Additionally, the thermoset rubber golf ball core has a compression of about 30-120, and more preferably 40-110, and most preferably 60-105. Further, the untreated core has a Shore C surface hardness of about 50-95, or more preferably about 60-93 Shore C, and most preferably in the range of about 75-89 Shore C. The core is dipped in oleic acid at a temperature of about 40-350° F. for a time of about 1 second to about 24 hours. More preferably, the temperature and duration is 50-150° F. for about 1 minute to about 12 hours. Most preferably, the temperature and duration are about 60-110° F. for about 5 minutes, to about 6 hours, respectively. The resulting treated core has a surface hardness of about 1 to 50 Shore C lower than the surface hardness of the untreated core, or more preferably about 5 to 25 Shore C lower, and most preferably about 10 to 20 Shore C lower.

One embodiment includes the steps of extruding a polybutadiene composition to form a cylindrical extrudate; cutting the extrudate to form an uncured polybutadiene preform; uniformly coating the preform with a cure-altering material comprising a first antioxidant; curing the coated preform to form a crosslinked core having an outer surface having a first hardness and a geometric center having a second hardness greater than the first to define a negative hardness gradient; centerless-grinding the cured core to form a uniformly-spherical core having increased surface roughness; forming an inner cover layer about the uniformly-spherical core; and forming an outer cover layer about the inner cover layer to form the golf ball.

In yet another embodiment, a thermoset rubber or at least partially cured diene rubber composition is ground, pulverized or otherwise converted into the form of a particle having a regular or irregular shape and a particle size of from about 1 nm to about 2 mm in diameter (or maximum cross sectional length). The ground thermoset rubber may be formed by grinding a thermoset golf ball core to a sieve size of about 10-40 mesh. Such a ground golf ball core is commonly referred to as golf ball core regrind. The ground thermoset rubber is then treated with a fatty acid or fatty acid salt comprising composition to soften at least the surface of the ground particle. The treated ground thermoset rubber particles are then admixed with an uncured diene rubber composition followed by the steps needed to form a golf ball core, ie extrusion, forming a preform, crosslinking into a spherical core, etc. The addition of the treated ground thermoset rubber to the diene rubber composition is meant to soften and perhaps enhance the feel of the molded core comprising the treated ground rubber, and lower core compression while having little adverse effect on core speed.

Preferably, the core layers (inner core or outer core layer) is made from a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, a suitable antioxidant is included in the composition. An optional soft and fast agent (and sometimes a cis-to-trans catalyst), such as an organosulfur or metal-containing organosulfur compound, can also be included in the core formulation.

Other ingredients that are known to those skilled in the art may be used, and are understood to include, but not be limited to, density-adjusting fillers, process aides, plasticizers, blowing or foaming agents, sulfur accelerators, and/or non-peroxide radical sources.

The base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%.

Examples of desirable polybutadiene rubbers include BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; KINEX® 7245 and KINEX® 7265, commercially available from Goodyear of Akron, Ohio; Shell BR-1220, commercially available from Dow chemical Company, Europrene® NEO-CIS® BR 40 and BR 60, commercially available from Polimeri Europa; and BR 01, BR 730, BR 735, BR 11, and BR 51, commercially available from Japan Synthetic Rubber Co., Ltd; PETROFLEX® BRNd-40; and KARBOCHEM® ND40, ND45, and ND60, commercially available from Karbochem.

The base rubber may also comprise high or medium Mooney viscosity rubber, or blends thereof. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 40, more preferably in the range from about 40 to about 80 and more preferably in the range from about 40 to about 60. Polybutadiene rubber with higher Mooney viscosity may also be used, so long as the viscosity of the polybutadiene does not reach a level where the high viscosity polybutadiene clogs or otherwise adversely interferes with the manufacturing machinery. It is contemplated that polybutadiene with viscosity less than 65 Mooney can be used with the present invention.

In one embodiment of the present invention, golf ball cores made with mid- to high-Mooney viscosity polybutadiene material exhibit increased resiliency (and, therefore, distance) without increasing the hardness of the ball. Such cores are soft, i.e., compression less than about 60 and more specifically in the range of about 50-55. Cores with compression in the range of from about 30 about 50 are also within the range of this preferred embodiment.

Commercial sources of suitable mid- to high-Mooney viscosity polybutadiene include Bayer AG CB23 (Nd-catalyzed), which has a Mooney viscosity of around 50 and is a highly linear polybutadiene, and Shell 1220 (Co-catalyzed). If desired, the polybutadiene can also be mixed with other elastomers known in the art, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

In one preferred embodiment, the base rubber comprises a Nd-catalyzed polybutadiene, a rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) many also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, e.g. with silicone. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Suitable peroxide initiating agents include dicumyl peroxide; 2,5-dimethyl-2,5-di(t-butylperoxy)hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy)valerate; di-t-butyl peroxide; or 2,5-di-(t-butylperoxy)-2,5-dimethyl hexane, lauryl peroxide, t-butyl hydroperoxide, $\alpha$-$\alpha$ bis(t-butylperoxy)diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP™ family of dicumyl peroxides (including DICUP™ R, DICUP™ 40C and DICUP™ 40KE) available from Crompton (Geo Specialty Chemicals). Similar initiating agents are available from AkroChem, Lanxess, Flexsys/Harwick and R.T. Vanderbilt. Another commercially-available and preferred initiating agent is TRIGONOX™ 265-50B from Akzo Nobel, which is a mixture of 1,1-di(t-butylperoxy)-3,3,5-trimethylcyclohexane and di(2-t-butylperoxyisopropyl)benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Sartomer Co. The preferred concentrations of ZDA that can be used are about 10 phr to about 40 phr, more preferably 20 phr to about 35 phr, most preferably 25 phr to about 35 phr. In a particularly preferred embodiment, the reactive co-agent is present in an amount of about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R.T. Vanderbilt. Other polyphenolic antioxidants include VANOX® T, VANOX® L, VANOX® SKT, VANOX® SWP, VANOX® 13 and VANOX® 1290.

The antioxidant is typically present in an amount of about 0.1 phr to about 5 phr, preferably from about 0.1 phr to about 2 phr, more preferably about 0.1 phr to about 1 phr. In a particularly preferred embodiment, the antioxidant is present in an amount of about 0.4 phr. In an alternative embodiment, the antioxidant should be present in an amount to ensure that the hardness gradient of the inventive cores is negative. Preferably, about 0.2 phr to about 1 phr antioxidant is added to the core layer (inner core or outer core layer) formulation, more preferably, about 0.3 to about 0.8 phr, and most preferably 0.4 to about 0.7 phr. Preferably, about 0.25 phr to about 1.5 phr of peroxide as calculated at 100% active can be added to the core formulation, more preferably about 0.5 phr to about 1.2 phr, and most preferably about 0.7 phr to about 1.0 phr. The ZDA amount can be varied to suit the desired compression, spin and feel of the resulting golf ball. The cure regime can have a temperature range between from about 290° F. to about 400° F., more preferably about 325° F. to about 360° F., and the stock is held at that temperature for at least about 10 minutes to about 30 minutes.

The thermoset rubber composition of the present invention may also include an optional soft and fast agent. As used herein, "soft and fast agent" means any compound or a blend thereof that that is capable of making a core 1) be softer (lower compression) at constant COR or 2) have a higher COR at equal compression, or any combination thereof, when compared to a core equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

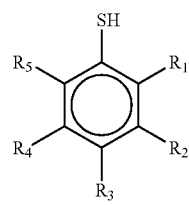

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5, 6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol and; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent. STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

Other suitable soft and fast agents include, but are not limited to, hydroquinones, benzoquinones, quinhydrones, catechols, and resorcinols.

Suitable hydroquinone compounds include compounds represented by the following formula, and hydrates thereof:

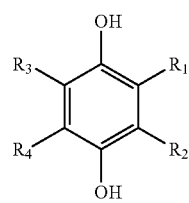

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy;

hydroxy and metal salts thereof; amino; nitro; aryl; aryloxy; arylalkyl; nitroso; acetamido; or vinyl.

Other suitable hydroquinone compounds include, but are not limited to, hydroquionone; tetrachlorohydroquinone; 2-chlorohydroquionone; 2-bromohydroquinone; 2,5-dichlorohydroquinone; 2,5-dibromohydroquinone; tetrabromohydroquinone; 2-methylhydroquinone; 2-t-butylhydroquinone; 2,5-di-t-amylhydroquinone; and 2-(2-chlorophenyl)hydroquinone hydrate.

More suitable hydroquinone compounds include compounds represented by the following formula, and hydrates thereof:

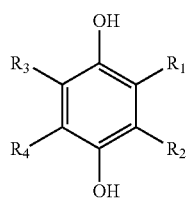

wherein each $R_1$, $R_2$, $R_3$, and $R_4$ are a metal salt of a carboxyl; acetate and esters thereof; hydroxy; a metal salt of a hydroxy; amino; nitro; aryl; aryloxy; arylalkyl; nitroso; acetamido; or vinyl.

Suitable benzoquinone compounds include compounds represented by the following formula, and hydrates thereof:

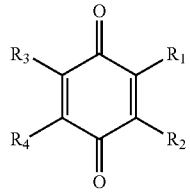

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable benzoquinone compounds include one or more compounds represented by the following formula, and hydrates thereof:

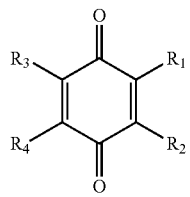

wherein each $R_1$, $R_2$, $R_3$, and $R_4$ are a metal salt of a carboxyl; acetate and esters thereof; hydroxy; a metal salt of a hydroxy; amino; nitro; aryl; aryloxy; arylalkyl; nitroso; acetamido; or vinyl.

Suitable quinhydrones include one or more compounds represented by the following formula, and hydrates thereof:

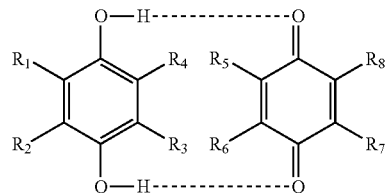

wherein each $R_1$, $R_2$, $R_3$, $R_4$, $R_5$, $R_6$, $R_7$, and $R_8$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable quinhydrones include those having the above formula, wherein each $R_1$, $R_2$, $R_3$, $R_4$, $R_5$, $R_6$, $R_7$, and $R_8$ are a metal salt of a carboxyl; acetate and esters thereof; hydroxy; a metal salt of a hydroxy; amino; nitro; aryl; aryloxy; arylalkyl; nitroso; acetamido; or vinyl. Suitable catechols include one or more compounds represented by the following formula, and hydrates thereof:

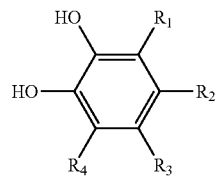

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Suitable resorcinols include one or more compounds represented by the following formula, and hydrates thereof:

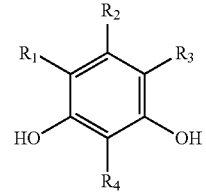

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, trans-regrind core material (recycled core material containing high trans-isomer of polybutadiene), and the like. When trans-regrind is present, the amount of trans-isomer is preferably between about 10% and about 60%. In a preferred embodiment of the invention, the core comprises polybutadiene having a cis-isomer content of greater than about 95% and trans-regrind core material (already vulcanized) as a filler. Any particle size trans-regrind core material is sufficient, but is preferably less than about 125 μm.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Materials such as tungsten, zinc oxide, barium sulfate, silica, calcium carbonate, zinc carbonate, metals, metal oxides and salts, and regrind (recycled core material typically ground to about 30 mesh particle) are also suitable fillers.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetra methylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

A number of cores were formed based on the formulation and cure cycle described in TABLE 1 below and core hardness values are reported in TABLE 2 below:

TABLE 1

| Formulation (phr) | Ex 1 | Ex 2 | Ex 3 | Comp Ex 1 | Comp Ex 2 | Comp Ex 3 |
| --- | --- | --- | --- | --- | --- | --- |
| SR-526+ | 34.0 | 34.0 | 31.2 | 29.0 | 29.0 | 29.0 |
| ZnO | 5 | 5 | 5 | 5 | 5 | 5 |
| BaSO$_4$ | 11.2 | 11.2 | 16.1 | 13.8 | 13.8 | 13.8 |
| Vanox MBPC* | 0.40 | 0.40 | 0.40 | — | 0.50 | — |
| Trigonox-265-50B** | 1.4 | 1.4 | 1.6 | — | — | 0.8 |
| Perkadox BC-FF*** | — | — | — | 1.0 | 1.6 | — |
| polybutadiene | 100 | 100 | 100 | 100 | 100 | 100 |
| ZnPCTP | 2.35 | 2.35 | 2.60 | 2.35 | 2.35 | 2.35 |
| Regrind | — | — | 17 | 17 | — | — |
| antioxidant/initiator ratio | 0.57 | 0.57 | 0.50 | — | 0.31 | — |
| Cure Temp. (° F.) | 305 | 315 | 320 | 350 | 335 | 335 |
| Cure Time (min) | 14 | 11 | 16 | 11 | 11 | 11 |
| Properties | | | | | | |
| diameter (in) | 1.530 | 1.530 | 1.530 | 1.530 | 1.530 | 1.530 |
| compression | 69 | 63 | 70 | 69 | 47 | — |
| COR @125 ft/s | 0.808 | 0.806 | 0.804 | 0.804 | — | — |

*Vanox MBPC: 2,2'-methylene-bis-(4-methyl-6-t-butylphenol) available from R. T. Vanderbilt Company Inc.;
**Trigonox 265-50B: a mixture of 1,1-di(t-butylperoxy)-3,3,5-trimethycyclohexane and di(2-t-butylperoxyisopropyl)benzene 50% active on an inert carrier available from Akzo Nobel;
***Perkadox BC-FF: Dicumyl peroxide (99%-100% active) available from Akzo Nobel; and
+SR-526: ZDA available from Sartomer

TABLE 2

| Distance from | Shore C Hardness | | | | | |
| --- | --- | --- | --- | --- | --- | --- |
| Center | Ex 1 | Ex 2 | Ex 3 | Comp Ex 1 | Comp Ex 2 | Comp Ex 3 |
| Center | 73 | 70 | 71 | 61 | 52 | 61 |
| 2 | 74 | 71 | 72 | 67 | 57 | 62 |
| 4 | 74 | 72 | 73 | 70 | 62 | 65 |
| 6 | 75 | 73 | 73 | 72 | 64 | 67 |
| 8 | 75 | 73 | 73 | 73 | 64 | 69 |
| 10 | 75 | 73 | 74 | 73 | 64 | 71 |
| 12 | 74 | 74 | 73 | 72 | 66 | 72 |
| 14 | 74 | 74 | 72 | 73 | 70 | 73 |
| 16 | 70 | 71 | 70 | 77 | 71 | 73 |
| 18 | 60 | 60 | 63 | 80 | 72 | 73 |
| Surface | 63 | 70 | 66 | 85 | 73 | 74 |
| Surface-Center | −10 | 0 | −5 | 24 | 21 | 13 |

The surface hardness of a core is obtained from the average of a number of measurements taken from opposing hemispheres of a core, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface of a core, care must be taken to insure that the core is centered under the durometer indentor before a surface hardness reading is obtained. A calibrated, digital durometer, capable of reading to 0.1 hardness units is used for all hardness measurements and is set to take hardness readings at 1 second after the maximum reading is obtained. The digital durometer must be attached to, and its foot made parallel to, the base of an automatic stand, such that the weight on the durometer and attack rate conform to ASTM D-2240.

To prepare a core for hardness gradient measurements, the core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut, made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' core surface is ground to a smooth, flat surface, revealing the geometric center of the core, which can be verified by measuring the height of the bottom of the holder to the exposed surface of the core, making sure that exactly half of the original height of the core, as measured above, has been removed to within ±0.004 inches.

Leaving the core in the holder, the center of the core is found with a center square and carefully marked and the hardness is measured at the center mark. Hardness measurements at any distance from the center of the core may be measured by drawing a line radially outward from the center mark, and measuring and marking the distance from the center, typically in 2-mm increments. All hardness measurements performed on the plane passing through the geometric center are performed while the core is still in the holder and without having disturbed its orientation, such that the test surface is constantly parallel to the bottom of the holder. The hardness difference from any predetermined location on the core is calculated as the average surface hardness minus the hardness at the appropriate reference point, e.g., at the center of the core for single, solid core, such that a core surface softer than its center will have a negative hardness gradient.

Referring to TABLES 1-2, in Example 1, the surface is 10 Shore C points lower than the center hardness and 12 Shore C points lower than the hardest point in the core. In Example 3, the surface is 5 Shore C points lower than the center hardness and 8 Shore C points lower than the hardest point in the core. In Example 2, the center and surface hardness values are equal and the softest point in the core is 10 Shore C points lower than the surface.

In the examples of the invention presented in TABLE 1, the cure temperatures are varied from 305° F. to 320° F. and cure times are varied from 11 to 16 minutes. The core compositions of examples 1 and 2 are identical, and only the cure cycle is changed. In example 3 the amount of antioxidant is identical to examples 1 and 2, but other ingredients are varied as well the cure cycle. Additionally, the ratio of antioxidant to initiator varies from 0.50 to 0.57 from example 1 and 2 to example 3.

The ratio of antioxidant to initiator is one factor to control the surface hardness of the cores. The data shown in TABLE 2 shows that hardness gradient is at least, but not limited to, a function of the amount of antioxidant and peroxide, their ratio, and the cure cycle. It should be noted that higher antioxidant also requires higher peroxide initiator to maintain the desired compression.

The core of Comparative Example 1, whose composition is shown in TABLE 1 was cured using a conventional cure cycle, with a cure temperature of 350° F. and a cure time of 11 minutes. The inventive cores were produced using cure cycles of 305° F. for 14 minutes, 315° F. for 11 minutes and 320° F. for 16 minutes. The hardness gradients of these cores were measured and the following observations can be made. For the cores of the Comparative Examples, as expected, a conventional hard surface to soft center gradient can be clearly seen. The gradients for inventive cores follow substantially the same shape as one another.

In some embodiments of invention, the hardness of the core at the surface is at most about the same as or substantially less than the hardness of the core at the center. Furthermore, the center hardness of the core may not be the hardest point in the core, but in these embodiments, it is preferred that it is at least equal to or harder than the surface. Additionally, the lowest hardness anywhere in the core does not have to occur at the surface. In some embodiments, the lowest hardness value occurs within about the outer 6 mm of the core surface. However, the lowest hardness value within the core can occur at any point from the surface, up to, but not including the center, as long as the surface hardness is still equal to, or less than the hardness of the center. It should be noted that in the present invention the formulation is the same throughout the core, or core layer, and no surface treatment is applied to the core to obtain the preferred surface hardness.

Figure 2:
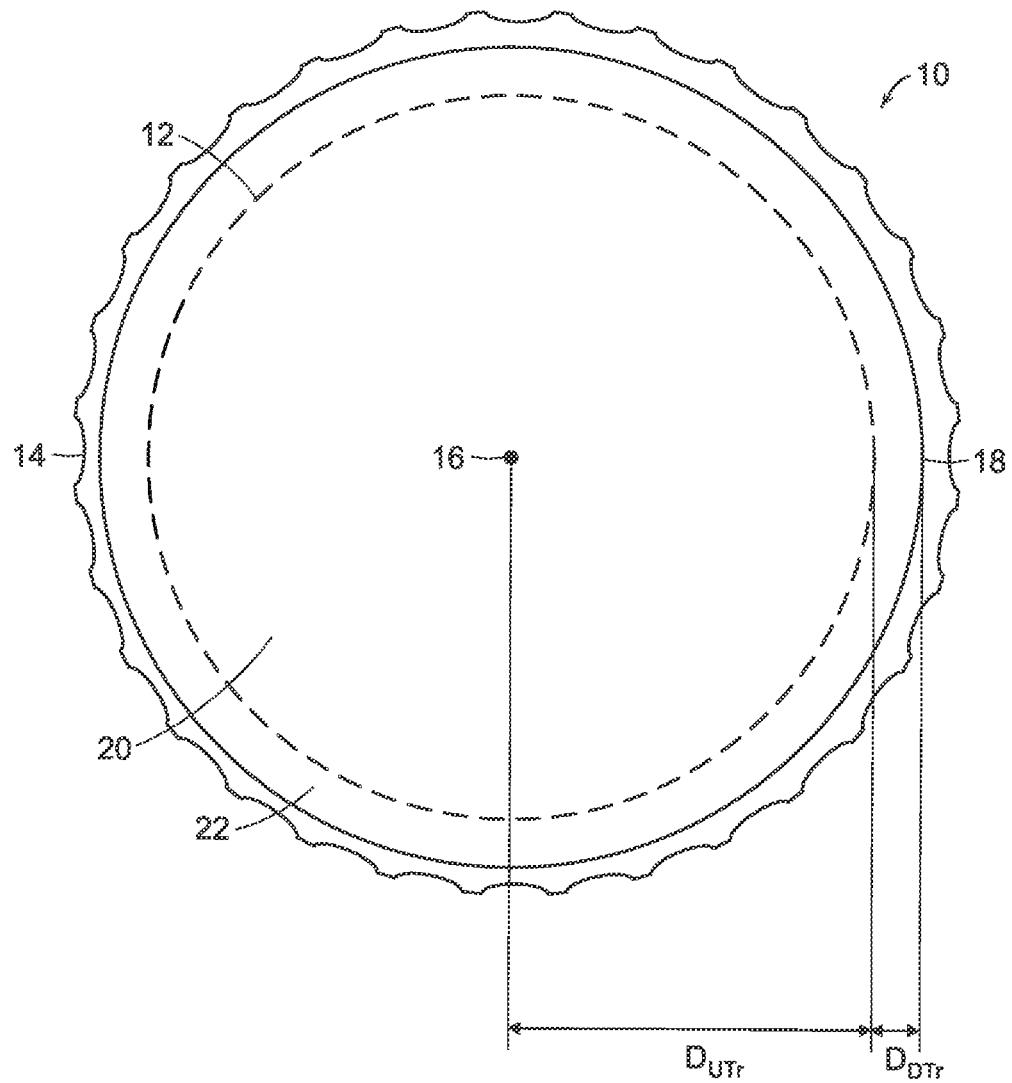
FIG. 2 is a schematic cross section illustrating another embodiment of the golf ball of the present invention.

In FIG. 1, golf ball 2 comprises single layer core 4 and cover 6. The single layer core 4 comprises a geometric center 8 and outer surface 9. Outer surface 9 has been treated with and comprises a fatty acid/fatty acid salt composition. In FIG. 2, golf ball 10 comprises single layer core 12 and cover 14. Single layer core 12 comprises a geometric center 16 and an outer surface 18. Single layer core 12 further comprises an untreated region 20 and treated region 22, the treated region 22 having been treated with and comprising a fatty acid/fatty acid salt composition. Untreated region 20 extends radially from geometric center 16 a distance $D_{UTr}$ and is concentric with the geometric center 16. Treated region 22 is disposed about untreated region 20 and extends inward from outer surface 18 a depth $D_{Tr}$.

Figure 3A:
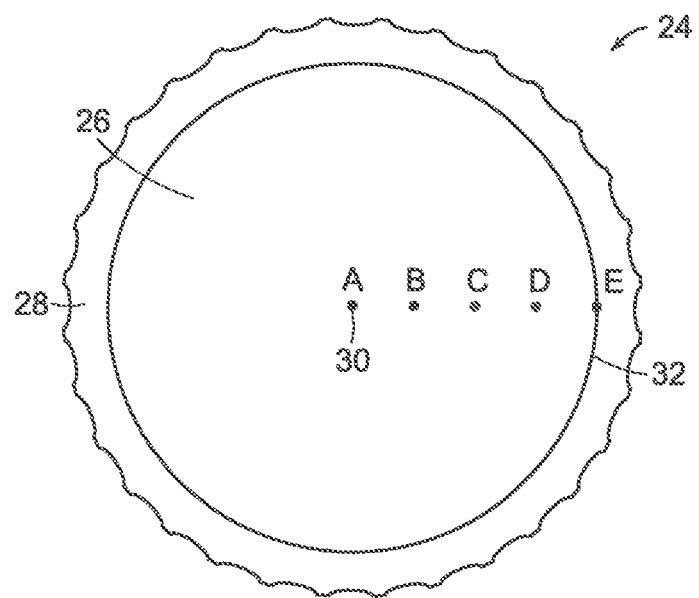
FIGS. 3A and 3B are schematic cross sections illustrating still another embodiment of the golf ball of the present invention.
Figure 3B:
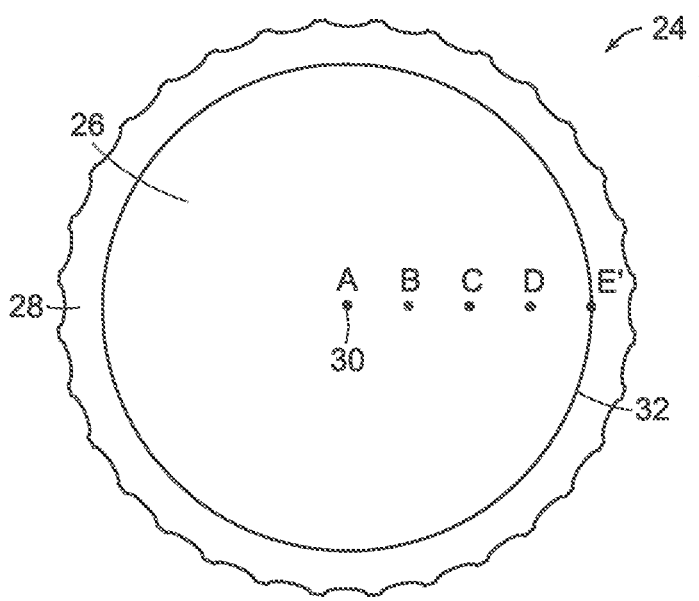

FIGS. 3A and 3B depict a single layer core golf ball of the present invention before and after treatment of the core outer surface with a fatty acid/fatty acid salt composition. In FIG. 3A, golf ball 24 comprises single layer core 26 and cover 28. The single layer core 26 comprises a geometric center 30 and outer surface 32. Single layer core 26 further comprises untreated regions A, B, C, D, and E. Untreated region A is in geometric center 30 and untreated region E is in outer surface 32. In FIG. 3B, single layer core 26 comprises untreated regions A, B, C, and D and treated region E'.

Figure 4A:
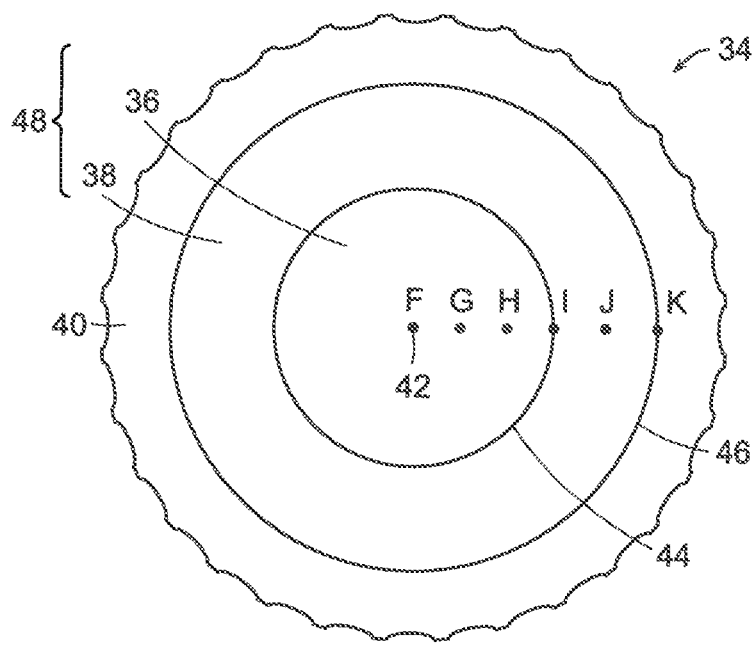
FIGS. 4A and 4B are schematic cross sections illustrating yet another embodiment of the golf ball of the present invention.
Figure 4B:
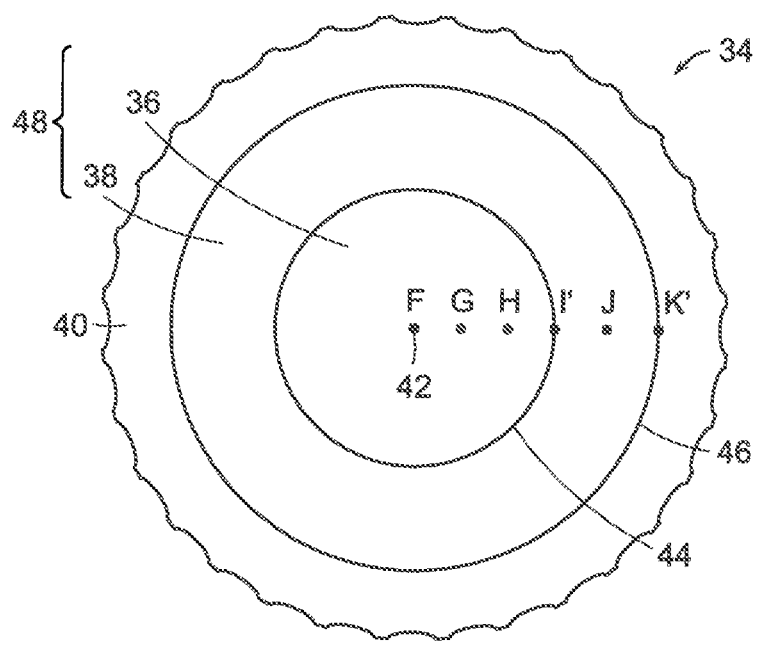

FIGS. 4A and 4B depict a multilayer core golf ball of the present invention before and after treatment of the core outer surface with a fatty acid/fatty acid salt composition. In FIG. 4A, golf ball 34 comprises dual layer core 48 and cover 40. Dual layer core 48 comprises first core layer 36 and second core layer 38. First core layer 36 is disposed about and concentric with geometric center 42. Second core layer 38 is disposed about first core layer 36 and adjacent cover 40. Dual layer core 48 further comprises untreated regions F, G, H, I, J and K. The first core layer 36 comprises untreated regions F-I and the second core layer 38 comprises untreated regions J-K. Further, First outer surface 44 of the first core layer 36 comprises untreated region I and second outer surface 46 of the second core layer 38 comprises untreated region K. FIG. 4B differs from FIG. 4A at least in that the first and second outer surfaces 44 and 46 comprise treated regions I' and K', respectively.

The following prophetic examples, represented in Table 3 below, illustrate several embodiments of the present invention consistent with FIGS. 1-4:

Treated Core V of Table 3 is a dual layer core having first and second outer surfaces ($1^{st}$ O.S. and $2^{nd}$ O.S., respectively), having been treated with and comprising a fatty acid/fatty acid salt composition. Table 3 displays lower hardness gradients from each of distances 0 mm, 5 mm and 10 mm to 1st O.S of treated core V than for untreated core V. Meanwhile, Table 3 reveals a negative hardness gradient of −2 from

TABLE 3

| DISTANCE FROM GEO. CTR | [SHORE C HARDNESS UNTREATED CORE] | | | | | [SHORE C HARDNESS TREATED CORE] | | | | |
|---|---|---|---|---|---|---|---|---|---|---|
| (mm) | I | II | III | IV | V | I | II | III | IV | V |
| 0 | 74 | 65 | 60 | 74 | 58 | 74 | 65 | 60 | 74 | 58 |
| 5 | 75 | 68 | 66 | 74 | 65 | 75 | 68 | 66 | 74 | 65 |
| 10 | 76 | 73 | 72 | 74 | 72 | 76 | 73 | 72 | 74 | 72 |
| $1^{st}$ O.S. | — | — | — | — | 80 | — | — | — | — | 74 |
| 15 | 76 | 78 | 80 | 73 | 84 | 76 | 78 | 80 | 73 | 84 |
| $2^{nd}$ O.S./O.S. | 76 | 80 | 86 | 71 | 88 | 70 | 74 | 80 | 68 | 82 |

Table 3 reveals the hardnesses of 5 cores at certain distances from their respective geometric centers before and after treatment of each core outer surface (referred to in Table 3 as "O.S." [single layer core] and $2^{nd}$ O.S. [dual layer core]) with a fatty acid and/or fatty acid salt composition. For example, Core I is a single layer core wherein the hardness of untreated outer surface O.S. is 76 Shore C and the hardness of treated outer surface O.S. is 70 Shore C. Accordingly, the hardness of the core outer surface is reduced by 6 Shore C. Meanwhile, the core hardness gradient from geometric center ("0 mm") to outer surface O.S. changes from +2 in untreated core I (positive hardness gradient, core outer surface harder) to −4 in treated core I (negative hardness gradient, core outer surface softer). The core hardness gradient from distance 5 mm to outer surface O.S. changes from +1 in the untreated core to −5 in the treated core. The core hardness gradients from distances 10 mm and 15 mm to outer surface O.S. change from 0 (a zero hardness gradient) in the untreated core to −6 in the treated core.

In another embodiment, not shown in Table 3, treated core I of Table 3 is modified such that the hardness of treated outer surface O.S. is 74 Shore C rather than 70 Shore C. Accordingly, the core hardness gradient in treated core I from geometric center (0 mm) to outer surface O.S. lowers from a positive gradient of +2 (in untreated core I) to a zero gradient (hardness of geometric center and treated outer surface substantially similar or the same).

Next, as shown in Table 3, for treated core II, the positive gradients from distances 0 mm, 5 mm and 10 mm to outer surface O.S. are lower than those in untreated core II. Moreover, in treated core II, there is a negative hardness gradient from distance 15 mm to treated outer surface O.S. whereas that gradient is positive in untreated core II.

In treated core III of Table 3, the positive gradients from distances 0 mm, 5 mm and 10 mm to outer surface O.S. are lower than in untreated core III. Additionally, in treated core III, there is a zero hardness gradient (no hardness difference) from distance 15 mm to treated outer surface O.S., whereas in untreated core III, the hardness gradient is positive.

For treated core IV, a core is achieved having an over all greater negative hardness gradient from geometric center (0 mm) to treated outer surface O.S. than in untreated core IV. Additionally, treated core IV displays a greater negative hardness gradient from each of distances 5 mm, 10 mm and 15 mm to treated outer surface O.S.

distance 15 mm to $2^{nd}$ O.S in treated core V whereas the gradient in untreated core V for this distance is +4.

The golf ball of the invention may comprise cover layer comprising a thermoplastic composition. The thermoplastic material may comprise ethylene/acrylic acid copolymers, ethylene/methacrylic acid copolymers, ethylene/methyl acrylate/acrylic acid terpolymers, ethylene/n-butyl acrylate/methacrylic acid terpolymers, ethylene/isobutyl-acrylate/methacrylic acid terpolymers, or blends thereof.

The cover layer may further comprise a thermoplastic polyurethane, a thermoplastic polyurea, a styrene block copolymer, a polyester amide, polyester-ester, polyamides, single-site catalyzed polymers, metallocene-catalyzed polymers, polyesters, poly(ethylene terephthalate), poly(butylene terephthalate), poly(propylene terephthalate), poly(trimethylene terephthalate), poly(ethylene naphthenate), polystyrene polymers, poly(styrene-co-maleic anhydride), acrylonitrile-butadiene-styrene, poly(styrene sulfonate), polyethylene styrene, grafted polypropylenes, grafted polyethylenes, polyvinyl chlorides; grafted polyvinyl chlorides; polyvinyl acetates having less than about 9% of vinyl acetate by weight, polycarbonates, blends of polycarbonate and acrylonitrile-butadiene-styrene, blends of polycarbonate and polyurethane, polyvinyl alcohols, polyvinyl alcohol copolymers, polyethers, polyarylene ethers, polyphenylene oxides; block copolymers of alkenyl aromatics with vinyl aromatics and poly(amic ester)s, polyimides, polyetherketones, polyamideimides, or blends thereof.

The thermoplastic material may comprise ethylene/acrylic acid copolymers, ethylene/methacrylic acid copolymers, ethylene/methyl acrylate/acrylic acid terpolymers, ethylene/n-butyl acrylate/methacrylic acid terpolymers, ethylene/isobutyl-acrylate/methacrylic acid terpolymers, or blends thereof.

The cover may further comprise a thermoplastic polyurethane, a thermoplastic polyurea, a styrene block copolymer, a polyester amide, polyester-ester, polyamides, single-site catalyzed polymers, metallocene-catalyzed polymers, polyesters, poly(ethylene terephthalate), poly(butylene terephthalate), poly(propylene terephthalate), poly(trimethylene terephthalate), poly(ethylene naphthenate), polystyrene polymers, poly(styrene-co-maleic anhydride), acrylonitrile-butadiene-styrene, poly(styrene sulfonate), polyethylene styrene, grafted polypropylenes, grafted polyethylenes, polyvinyl chlorides; grafted polyvinyl chlorides; polyvinyl acetates having less than about 9% of vinyl acetate by weight, polycarbonates, blends of polycarbonate and acrylonitrile-butadiene-styrene, blends of polycarbonate and polyurethane, polyvinyl alcohols, polyvinyl alcohol copolymers, polyethers, polyarylene ethers, polyphenylene oxides; block copolymers of alkenyl aromatics with vinyl aromatics and poly(amic ester)s, polyimides, polyetherketones, polyamideimides, or blends thereof.

The thermoplastic resin may comprise at least one of polyethylene vinyl acetate, polyethylene butyl acrylate, polyethylene methyl acrylate, polyethylene acrylic acid, polyethylene methacrylic acid or an ionomer.

According to this invention, each layer, including the cover, may also or alternatively comprise a thermoset polymer composition comprising at least one crosslinkable polymer. The crosslinkable polymer can be polyolefins, fluoropolymers, and mixtures thereof. Natural or synthetic base rubber can be used, which includes polydienes, polyethylenes (PE), ethylene-propylene copolymers (EP), ethylene-butylene copolymers, polyisoprenes, polybutadienes (PBR), polystyrenebutadienes, polyethylenebutadienes, styrene-propylene-diene rubbers, ethylene-propylene-diene terpolymers (EPDM), fluorinated polymers thereof (e.g., fluorinated EP and fluorinated EPDM), and blends of one or more thereof. The crosslinkable polymer can be solid at ambient temperature. PBR is a preferred crosslinkable polymer. Suitable PBR may have high 1,4-cis content (e.g., at least 60%, such as greater than about 80%, or at least about 90%, or at least about 95%), low 1,4-cis content (e.g., less than about 50%), high 1,4-trans content (e.g., at least about 40%, such as greater than about 70%, or about 75% or 80%, or greater than about 90%, or about 95%), low 1,4-trans content (e.g., less than about 40%), high 1,2-vinyl content (e.g., at least about 40%, such as about 50% or 60%, or greater than about 70%), or low 1,2-vinyl content (e.g., less than about 30%, such as about 5%, 10%, 12%, 15%, or 20%). PBR can have various combinations of cis-, trans-, and vinyl structures, such as having a trans-structure content greater than cis-structure content and/or 1,2-vinyl structure content, having a cis-structure content greater than trans-structure content and/or 1,2-vinyl structure content, or having a 1,2-vinyl structure content greater than cis-structure content or trans-structure content. The various polybutadienes may be utilized alone or in blends of two or more thereof to formulate different compositions in forming golf ball components (cores, covers, and portions or layers within or in between) of any desirable physical and chemical properties and performance characteristics.

The base rubber, e.g. PBR, may also be mixed with other elastomers, such as diene and saturated rubbers, known in the art, including natural rubbers, polyisoprene rubbers, styrene-butadiene rubbers, synthetic natural rubbers, diene rubbers, saturated rubbers, polyurethane rubbers, polyurea rubbers, metallocene-catalyzed polymers, plastomers, and multi-olefin polymers (homopolymers, copolymers, and terpolymers) in order to modify the properties of the core. With a major portion (such as greater than 50% by weight, or greater than about 80%) of the base rubber being a polybutadiene or a blend of two, three, four or more polybutadienes, these other miscible elastomers can be present in amounts of less than 50% by weight of the total base rubber, such as in minor quantities of less than about 30%, less than about 15%, or less than about 5%. In one example, the polymeric composition comprises less than about 20% balata, such as 18% or less, or 10% or less, and can be substantially free of balata (i.e., less than about 2%).

The diene rubber is preferably cured with peroxide by blending a product of blending the diene rubber with an initiating agent, followed by curing in a mold for a set time at an elevated temperature and pressure. Suitable initiating agents include dicumyl peroxide; 2,5-dimethyl-2,5-di(t-butylperoxy) hexane; 2,5-dimethyl-2,5-di(t-butylperoxy)hexyne-3; 2,5-dimethyl-2,5-di(benzoylperoxy)hexane; 2,2'-bis(t-butylperoxy)-di-iso-propylbenzene; 1,1-bis(t-butylperoxy)-3,3,-5-trimethylcyclohexane; n-butyl 4,4-bis(t-butylperoxy)valerate; t-butyl perbenzoate; benzoyl peroxide; n-butyl 4,4'-bis(butylperoxy)valerate; di-t-butyl peroxide; or 2,5-di-(t-butylperoxy)-2,5 dimethyl hexane, lauryl peroxide, t-butyl hydroperoxide, a-a bis(t-butylperoxy)diisopropylbenzene, di(2-t-butylperoxyisopropyl)benzene peroxide, 3,3,5-trimethyl cyclohexane, di-t-amyl peroxide, di-t-butyl peroxide, t-butyl cumyl peroxide. Preferably, the polymer composition includes from about 0.01 to about 3.0 parts per hundred (phr) initiating agent to produce the peroxide-cured diene rubber of the present invention.

The polymeric composition may also include a cis-to-trans catalyst. Preferably, the composition of the present invention contains from about 0.05 to about 3.0 phr cis-to-trans catalyst. Suitable cis-to-trans catalysts include an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the cis-to-trans catalysts described herein. For example, the cis-to-trans catalyst may be a blend of an organosulfur component and an inorganic sulfide component.

The at least one fatty acid and/or fatty acid salt composition may comprise oleic acid, palmitic acid, stearic acid, behenic acid, pelargonic acid, linoleic acid, linolenic acid, arachidonic acid, caproic acid, caprylic acid, capric acid, lauric acid, erucic acid, myristic acid, benzoic acid, phenylacetic acid, or naphthalenoic acid.

The at least one fatty acid and/or fatty acid salt composition may comprise a cation selected from the group comprising barium, lithium, sodium, zinc, bismuth, chromium, cobolt, copper, potassium, strontium, titanium, tungsten, magnesium, cesium, iron, nickel, silver, aluminum, tin and calcium.

The at least one fatty acid and/or fatty acid salt composition may further comprise at least one of an antioxidant, a sulfur-bearing compound, zinc methacrylate, zinc dimethacrylate, a softening acrylate monomer or oligomer, a thermoplastic resin, or an hydroquinone. The thermoplastic resin may comprise, for example, at least one of polyethylene vinyl acetate, polyethylene butyl acrylate, polyethylene methyl acrylate, polyethylene acrylic acid, polyethylene methacrylic acid or an ionomer.

The cover layer outer surface may comprise the at least one fatty acid and/or fatty acid salt composition according to any method or process known in the art. Such methods or processes for treating the cover outer surface include but are not limited to treating, rolling, dipping, soaking, spraying, dusting, wiping and exposing. The cover outer surface may be treated with the fatty acid and/or fatty acid salt composition for a duration of from about 0.5 minutes to about 24 hours at a temperature of from about 60° F. to about 350° F. The outer surface may be further exposed to a neutralizing solution for a duration of from about 0.5 minutes to about 24 hours at a temperature of from about 60° F. to about 350° F.

Other processes for treating the cover outer surface with at least one fatty acid and/or fatty acid salt composition may include those discussed elsewhere herein.

In one embodiment, the hardness gradient between the cover layer treated outer surface and the untreated inner surface (first and second hardness) is about 3 Shore C or greater. In another embodiment, the hardness gradient is about 2

Shore D or greater. In a further embodiment, the hardness gradient is about 5 Shore D or greater. In yet another embodiment, the hardness gradient is about 10 Shore D or greater. In still another embodiment, the hardness gradient is about 15 Shore D or greater.

Figure 5A:
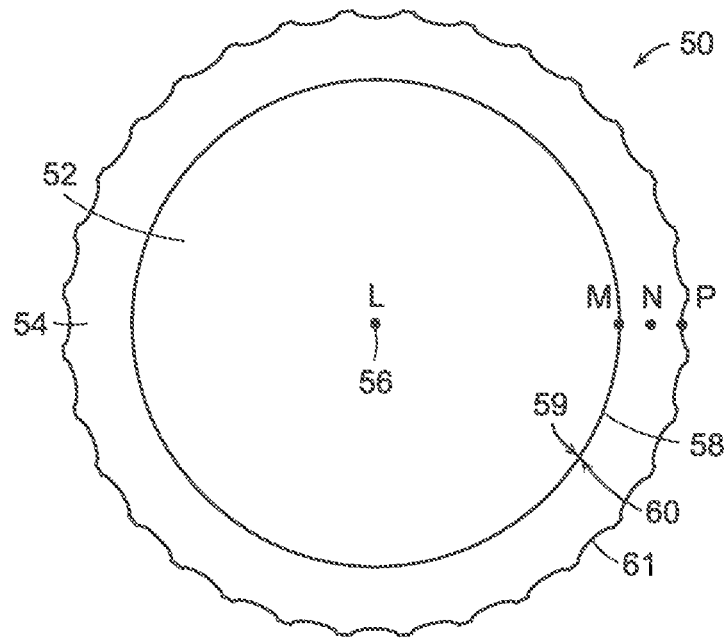
FIGS. 5A and 5B are schematic cross sections illustrating a further embodiment of the golf ball of the present invention.
Figure 5B:
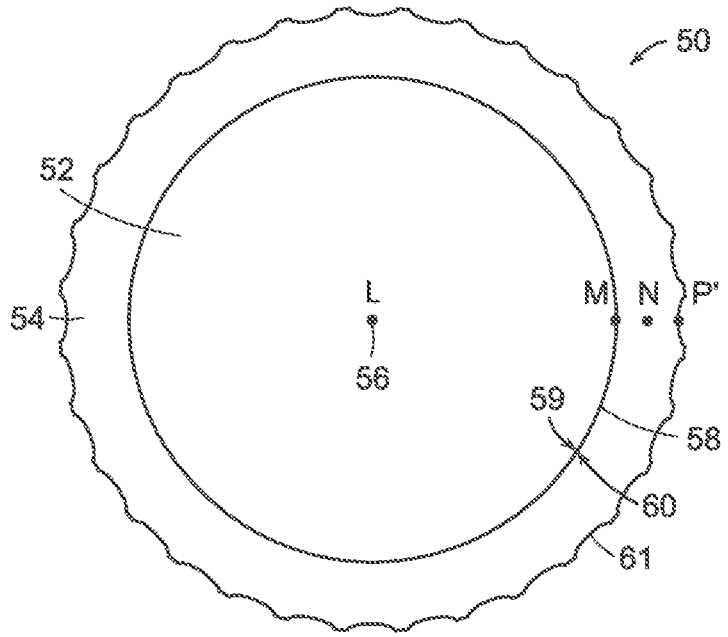

FIGS. 5A and 5B depict a single layer core and single layer cover golf ball before and after treatment of the cover outer surface with a fatty acid and/or fatty acid salt composition. In FIG. 5A, golf ball 50 comprises single layer core 52 and cover 54. Single layer core 52 comprises geometric center 56 and core outer surface 59. Cover 54 comprises cover inner surface 60 and cover outer surface 61. Interface 58 depicts the mating surface between core outer surface 59 and cover inner surface 59. Cover 54 further comprises untreated cover regions M, N and P. Untreated cover region M is disposed in cover inner surface 59, untreated region P is disposed in cover outer surface 61, and untreated cover region N is disposed between cover inner surface 59 and cover outer surface 61. In FIG. 5A, the hardnesses of cover regions M, N and P are substantially similar.

In FIG. 5B, golf ball 50 is different from golf ball 50 of FIG. 5A in that cover outer surface 61 is treated with and comprises a fatty acid and/or fatty acid salt composition in cover region P'. The hardness of cover region P' is different than the hardnesses of cover regions M and N.

Figure 6A:
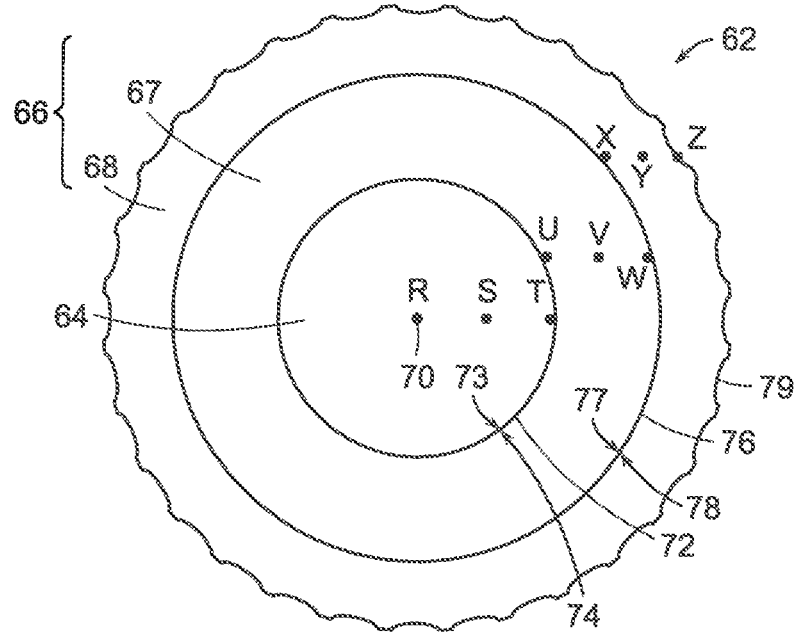
FIGS. 6A and 6B are schematic cross sections illustrating a different embodiment of the golf ball of the present invention.
Figure 6B:
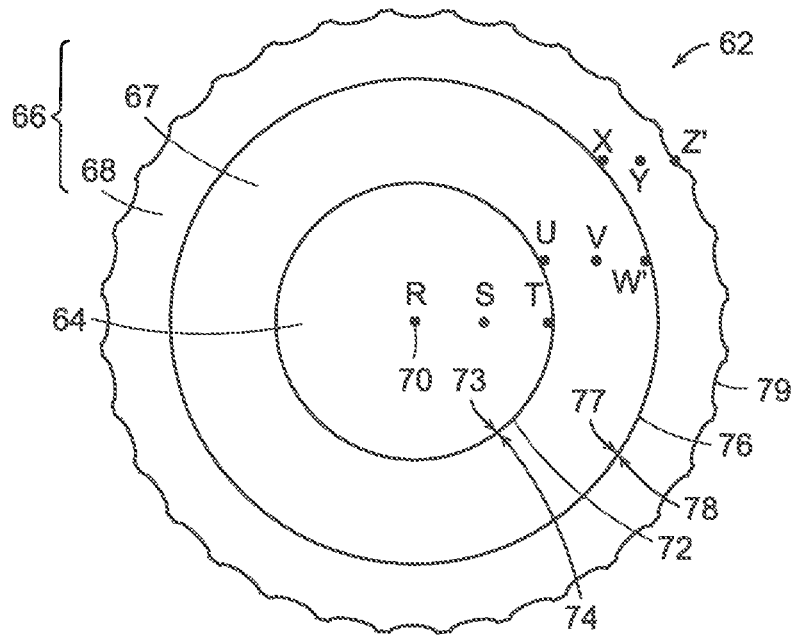

FIGS. 6A and 6B depict a single layer core and dual layer cover golf ball before and after treatment of the cover outer surface with a fatty acid and/or fatty acid salt composition. In FIG. 6A, golf ball 62 comprises single layer core 64 and cover 66 comprising cover layers 67 and 68. Single layer core 64 comprises geometric center 70 and core outer surface 73. Cover layer 67 comprises cover inner surface 74 and cover outer surface 77. Interface 72 depicts the mating surface between core outer surface 73 and cover inner surface 74. Cover layer 67 further comprises untreated cover regions U, V and W. Untreated cover region U is disposed in cover inner surface 74, untreated cover region W is disposed in cover outer surface 77, and untreated cover region V is disposed between cover inner surface 74 and cover outer surface 77. In FIG. 6A, the hardnesses of cover regions U, V and W are substantially similar. Cover layer 68 comprises cover inner surface 78 and cover outer surface 79. Interface 76 depicts the mating surface between cover outer surface 77 and cover inner surface 78. Cover layer 68 further comprises untreated cover regions X, Y and Z. Untreated cover region X is disposed in cover inner surface 78, untreated cover region Z is disposed in cover outer surface 79, and untreated cover region Y is disposed between cover inner surface 78 and cover outer surface 79. In FIG. 6A, the hardnesses of cover regions X, Y and Z are substantially similar.

In FIG. 6B, golf ball 62 is different from golf ball 62 of FIG. 6A in that cover outer surfaces 78 and 79 are treated with and comprise a fatty acid and/or fatty acid salt composition in cover regions W' and Z', respectively. The hardness of treated cover region W' is different than the hardnesses of untreated cover regions U and V. The hardness of treated cover region Z' is different than the hardnesses of untreated cover regions X and Y.

Figure 7A:
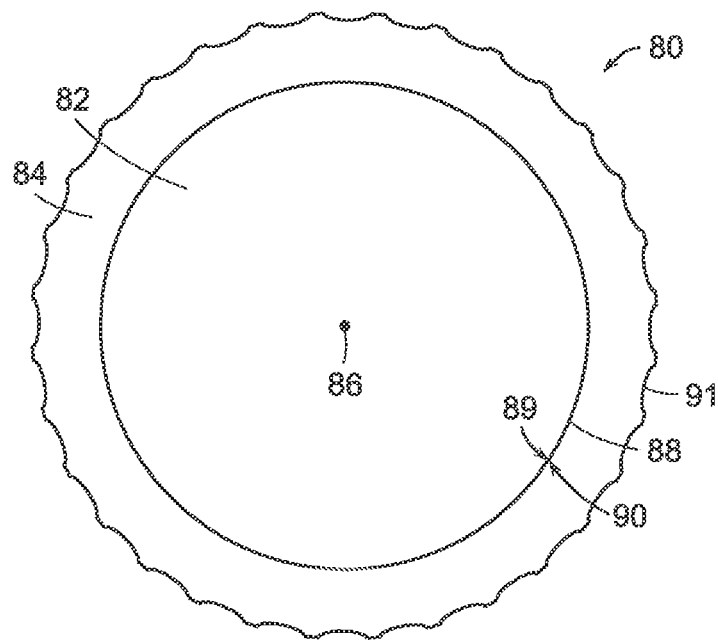
FIGS. 7A and 7B are schematic cross sections illustrating yet another embodiment of the golf ball of the present invention.
Figure 7B:
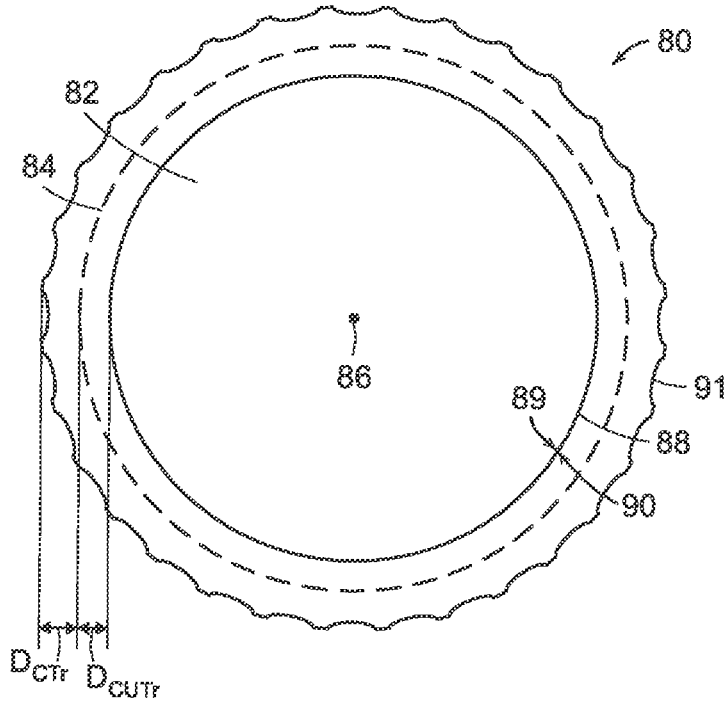

FIGS. 7A and 7B depict a single layer core and single layer cover golf ball before and after treatment of the cover outer surface with a fatty acid and/or fatty acid salt composition. In FIG. 7A, untreated golf ball 80 comprises single layer core 82 and cover 84. Single layer core 82 comprises geometric center 86 and core outer surface 89. Cover 84 comprises cover inner surface 90 and cover outer surface 91. Interface 88 depicts the mating surface between core outer surface 89 and cover inner surface 90. In FIG. 7A, the hardnesses of geometric center 86, core outer surface 89, cover inner surface 90 and cover outer surface 91 are substantially similar.

In FIG. 7B, golf ball 80 is different from golf ball 80 of FIG. 7A in that Cover 84 is treated with and comprises a fatty acid and/or fatty acid salt composition. Cover 84 comprises a treated cover region having penetration depth $D_{CTr}$ from cover outer surface 91. Meanwhile, an untreated cover region within cover 84 having depth $D_{CUTr}$ is disposed between cover inner surface 90 and the treated cover region. The hardness of the treated cover region $D_{CTr}$ is different than the hardnesses of untreated cover region $D_{CUTr}$, core geometric center 86, and core outer surface 89.

Figure 8:
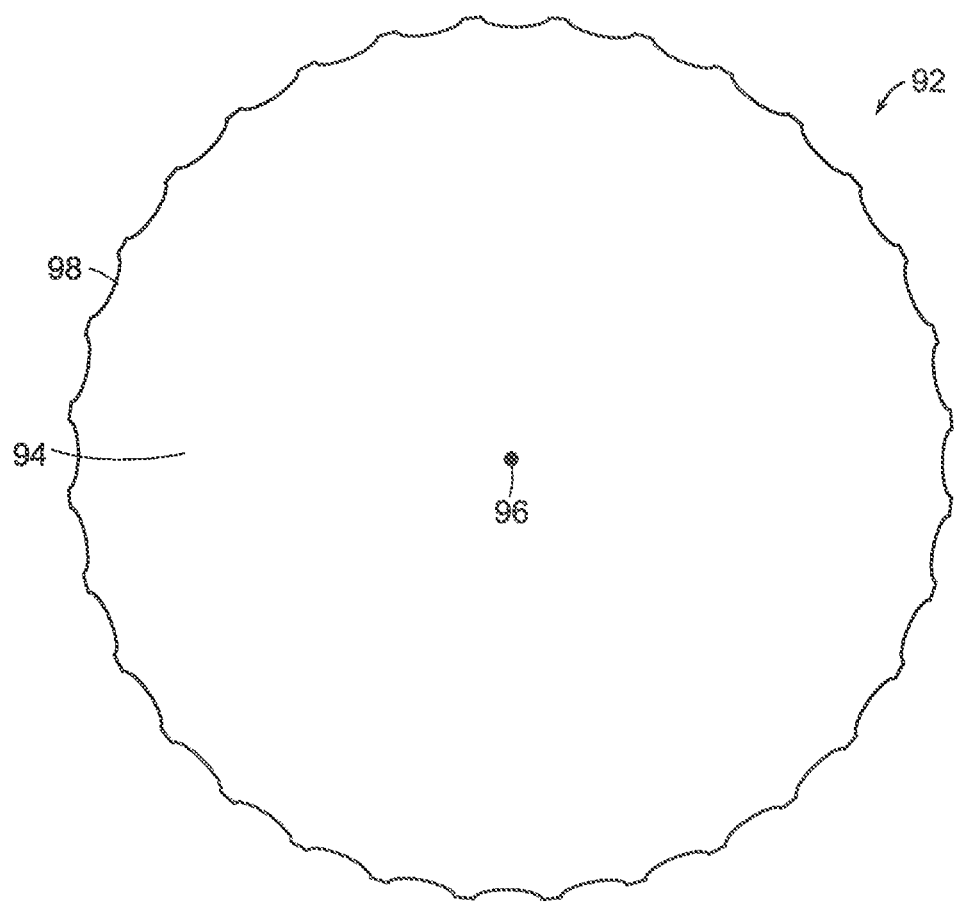
FIG. 8 is a schematic cross section illustrating another embodiment of the golf ball of the present invention.

FIG. 8 depicts a single piece golf ball 92 comprising core 94 with geometric center 96 and cover surface 98. In this embodiment, cover surface 98, prior to treatment with the fatty acid/fatty acid salt composition, has a hardness substantially similar to the hardness of geometric center 96. Treated cover surface 98 has a hardness that is different than the hardness of geometric center 96 of core 94.

The inventive golf balls of FIGS. 1-8 are intended as non-limiting examples of several embodiments of the present invention.

The following prophetic examples, represented in Table 4 below, also illustrate several non-limiting embodiments of the present invention consistent with FIGS. 5-8:

TABLE 4

| DISTANCE FROM GEO. CTR | [SHORE C HARDNESS UNTREATED COVER] | | | | | [SHORE C HARDNESS TREATED COVER] | | | | |
|---|---|---|---|---|---|---|---|---|---|---|
| (mm) | I | II | III | IV | V | I | II | III | IV | V |
| 0 | 60 | 74 | 58 | 60 | 75 | 60 | 74 | 58 | 60 | 75 |
| 5 | 66 | 75 | 65 | 65 | 75 | 66 | 75 | 65 | 65 | 75 |
| 10 | 72 | 76 | 72 | 71 | 75 | 72 | 76 | 72 | 71 | 75 |
| 15 | 80 | 76 | 84 | 82 | 75 | 80 | 76 | 84 | 82 | 75 |
| Core O.S. | 86 | 76 | 88 | — | 76 | 86 | 76 | 88 | — | 76 |
| I.C.L. | — | 88 | 91 | — | — | — | 88 | 91 | — | — |
| I.C.O.S. | — | 88 | 91 | — | — | — | 86 | 91 | — | — |
| C.L./O.C.L. | 92 | 95 | 82 | — | 76 | 92 | 95 | 82 | — | 76 |
| C.L.O.S./ O.C.O.S./ U.B.O.S. | 92 | 95 | 82 | 83 | 76 | 88 | 93 | 78 | 77 | 72 |

Table 4 presents five golf balls I-V displaying cover outer surface hardnesses before and after treatment with a fatty acid and/or fatty acid salt composition. Each treated cover outer surface comprises the fatty acid and/or fatty acid salt composition. Each of golf balls I-V have a diameter of 1.68 in. or 42.7 mm. The core and cover may each comprise either thermoplastic material or thermoset rubber or a combination thereof.

Golf ball I of Table 4 comprises a single layer core and single layer cover ("C.L."). The core has a diameter of 1.58 in. (40.1 mm). The cover has a thickness of 0.050 in. (1.3 mm). The cover outer surface of ball I is identified in Table IV as C.L.O.S. (cover layer outer surface). Prior to treating the C.L.O.S. with the fatty acid and/or fatty acid salt composition, the C.L and C.L.O.S. hardnesses are each 92 Shore C, translating to a zero hardness gradient between the cover layer outer surface and the balance of the cover layer. Following treatment, the hardness gradient between the C.L. and the C.L.O.S is −4 Shore C (92 Shore C versus 88 Shore C). Accordingly, the C.L.O.S. post treatment and comprising the fatty acid and/or fatty acid salt composition is 4 Shore C softer than the C.L.

Meanwhile, the hardness gradients between the treated and fatty acid and/or fatty acid salt composition comprising C.L.O.S, and each of the core hardnesses are also different than in untreated golf ball I. For example, the hardness gradient between Core O.S. (core outer surface) and C.L.O.S. in untreated golf ball I is +6 Shore C, whereas in treated golf ball I that gradient is +2 Shore C, that is, a reduction in that hardness gradient of 4 Shore C. In the same fashion, the hardness gradients between C.L.O.S, and the core at 0 mm (geometric center), 5 mm, 10 mm and 15 mm are also reduced.

Golf ball II comprises a single layer core and dual layer cover ("I.C.L." and "C.L.") wherein both cover layers may be treated with and comprise a fatty acid and/or fatty acid composition. The core has a diameter of 1.55 in. (39.4 mm), the inner cover layer thickness is 0.035 in. (0.9 mm), and the outer cover layer thickness is 0.030 in. (0.75 mm). The cover outer surfaces of the two cover layers of ball II is identified in Table 4 as I.C.O.S. (inner cover outer surface) and C.L.O.S. (cover layer outer surface). Prior treating the I.C.O.S. with the fatty acid and/or fatty acid salt composition, the I.C.L. and the I.C.O.S. hardnesses are each 88 Shore C, translating to a zero hardness gradient between the inner cover layer outer surface and the balance of the inner cover layer. Following treatment, the hardness gradient between the I.C.L. and the I.C.O.S is −2 Shore C (88 Shore C versus 86 Shore C). Accordingly, the I.C.O.S. post treatment and comprising the fatty acid and/or fatty acid salt composition is 2 Shore C softer than the I.C.L.

Meanwhile, the hardness gradients between the treated and fatty acid and/or fatty acid salt composition comprising I.C.O.S, and each of the core hardnesses are also different than in untreated golf ball II. For example, the hardness gradient between Core O.S, and C.L.O.S. in untreated golf ball II is +12 Shore C, whereas in treated golf ball II that gradient is +10 Shore C, that is, a reduction in that hardness gradient of 2 Shore C. In the same fashion, the hardness gradients between I.C.O.S, and the core at 0 mm (geometric center), 5 mm, 10 mm and 15 mm are also reduced.

Prior to treating the C.L.O.S. of golf ball II with the fatty acid and/or fatty acid salt composition, the C.L and C.L.O.S. hardnesses are each 95 Shore C, translating to a zero hardness gradient between the cover layer outer surface and the balance of the cover layer. Following treatment, the hardness gradient between the C.L. and the C.L.O.S is −2 Shore C (95 Shore C versus 93 Shore C). Accordingly, the C.L.O.S. post treatment and comprising the fatty acid and/or fatty acid salt composition is 2 Shore C softer than the C.L.

Meanwhile, in golf ball II, the hardness gradients between the treated and fatty acid and/or fatty acid salt composition comprising C.L.O.S. and each of the core hardnesses are also different. For example, the hardness gradient between Core O.S, and C.L.O.S. in untreated golf ball II is +19 Shore C, whereas in treated golf ball II that gradient is +17 Shore C, that is, a reduction in that hardness gradient of 2 Shore C. In the same fashion, the hardness gradients between C.L.O.S, and the core at 0 mm (geometric center), 5 mm, 10 mm and 15 mm are also reduced.

Golf ball III comprises a single layer core and dual layer cover ("I.C.L." and "C.L.") wherein only the outermost cover layer may be treated with and comprise the fatty acid and/or fatty acid composition. The core has a diameter of 1.55 in. (39.4 mm), the inner cover layer thickness is 0.035 in. (0.9 mm), and the outer cover layer thickness is 0.030 in. (0.75 mm). Prior to treating the C.L.O.S. with the fatty acid and/or fatty acid salt composition, the C.L and C.L.O.S. hardnesses are each 82 Shore C, translating to a zero hardness gradient between the cover layer outer surface and the balance of the cover layer. Following treatment, the hardness gradient between the C.L. and the C.L.O.S is −4 Shore C (82 Shore C versus 78 Shore C). Accordingly, the C.L.O.S. post treatment and comprising the fatty acid and/or fatty acid salt composition is 4 Shore C softer than the C.L.

Meanwhile, the hardness gradients between the treated and fatty acid and/or fatty acid salt composition comprising C.L.O.S, and each of the core hardnesses are also different than in untreated golf ball III. For example, the hardness gradient between Core O.S, and C.L.O.S. in untreated golf ball I is −6 Shore C, whereas in treated golf ball III that gradient is −10 Shore C, that is, an increase in that hardness gradient of 4 Shore C. In the same fashion, the hardness gradients between C.L.O.S, and the core at 0 mm (geometric center), 5 mm, 10 mm and 15 mm are also increased.

Golf ball IV is a unitary ball wherein the core and cover are one piece. Here, the one piece core and cover have a diameter of 1.68 in. or 40.1 mm. Prior to treating the unitary ball outer surface (U.B.O.S.) with the fatty acid and/or fatty acid salt composition, the hardness gradients between the core at 0 mm, 5 mm, 10 mm and 15 mm and the U.B.O.S. are +23 Shore C, +18 Shore C, +12 Shore C and +1 Shore C, respectively. Following treatment, the hardness gradient between the core at 0 mm, 5 mm, 10 mm and 15 mm and the U.B.O.S. are +17 Shore C, +12 Shore C, +6 Shore C and −5 Shore C. Accordingly, treating golf ball IV with the fatty acid and/or fatty acid salt composition modified ball IV at least in that the positive hardness gradient of +1 from core at 15 mm to U.B.O.S. in untreated ball IV became a negative hardness gradient in treated golf ball IV.

Golf ball V of Table 4 comprises a single layer thermoplastic core and single layer thermoset cover ("C.L."). The core has a diameter of 1.58 in. (40.1 mm). The cover has a thickness of 0.050 in. (1.3 mm). The cover outer surface of ball V is identified as C.L.O.S. (cover layer outer surface). Prior to treating the C.L.O.S. with the fatty acid and/or fatty acid salt composition, the C.L. and C.L.O.S. hardnesses are each 76 Shore C, translating to a zero hardness gradient between the cover layer outer surface and the balance of the cover layer. Following treatment, the hardness gradient between the C.L. and the C.L.O.S. is −4 Shore C (76 Shore C versus 72 Shore C). Accordingly, the C.L.O.S., post treatment and comprising the fatty acid and/or fatty acid salt composition, is 4 Shore C softer than the C.L.

Meanwhile, the hardness gradients between the treated and fatty acid and/or fatty acid salt composition comprising C.L.O.S, and each of the core hardnesses are also different than in untreated golf ball I. For example, the hardness gradient between Core O.S. (core outer surface) and C.L.O.S. in untreated golf ball I is 0 Shore C, whereas in treated golf ball I that gradient is −4 Shore C, that is, a negative harness gradient of −4 Shore C thereby resulting. In the same fashion, the hardness gradients between C.L.O.S, and the core at 0 mm (geometric center), 5 mm, 10 mm and 15 mm are also reduced from +1 to −3 Shore C. Accordingly, in golf ball V, treating the golf ball so that the C.L.O.S. comprises the fatty acid and/or fatty acid salt composition changes the overall golf ball hardness gradient, geometric center to core outer surface from +1 to −3.

Figure 9:
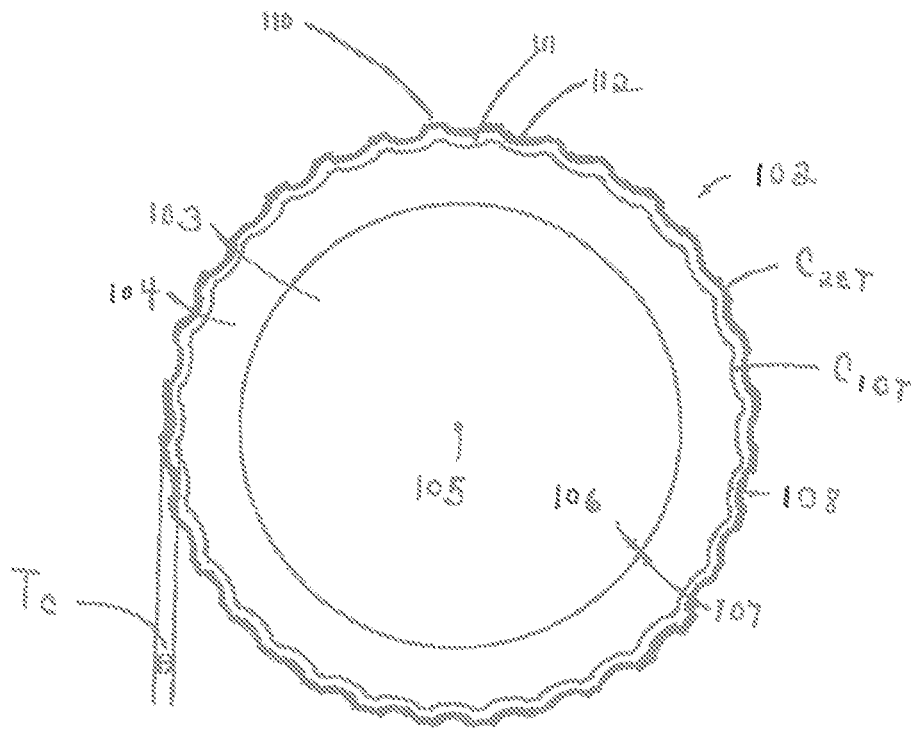
FIG. 9 is a schematic cross section illustrating one embodiment of the golf ball of the present invention made by the method of the invention.
Figure 10:
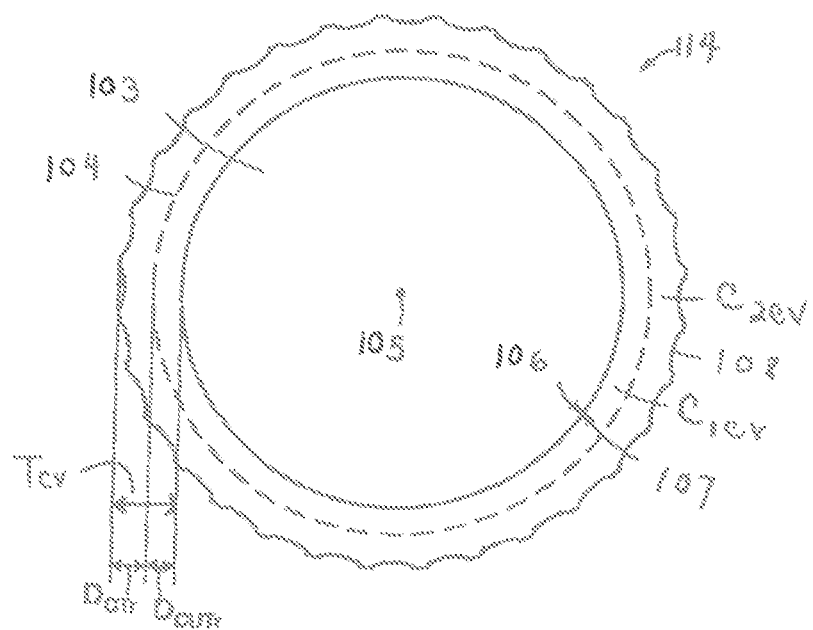
FIG. 10 is a schematic cross section illustrating one embodiment of the golf ball of the present invention made by the method of the invention.
Figure 11:
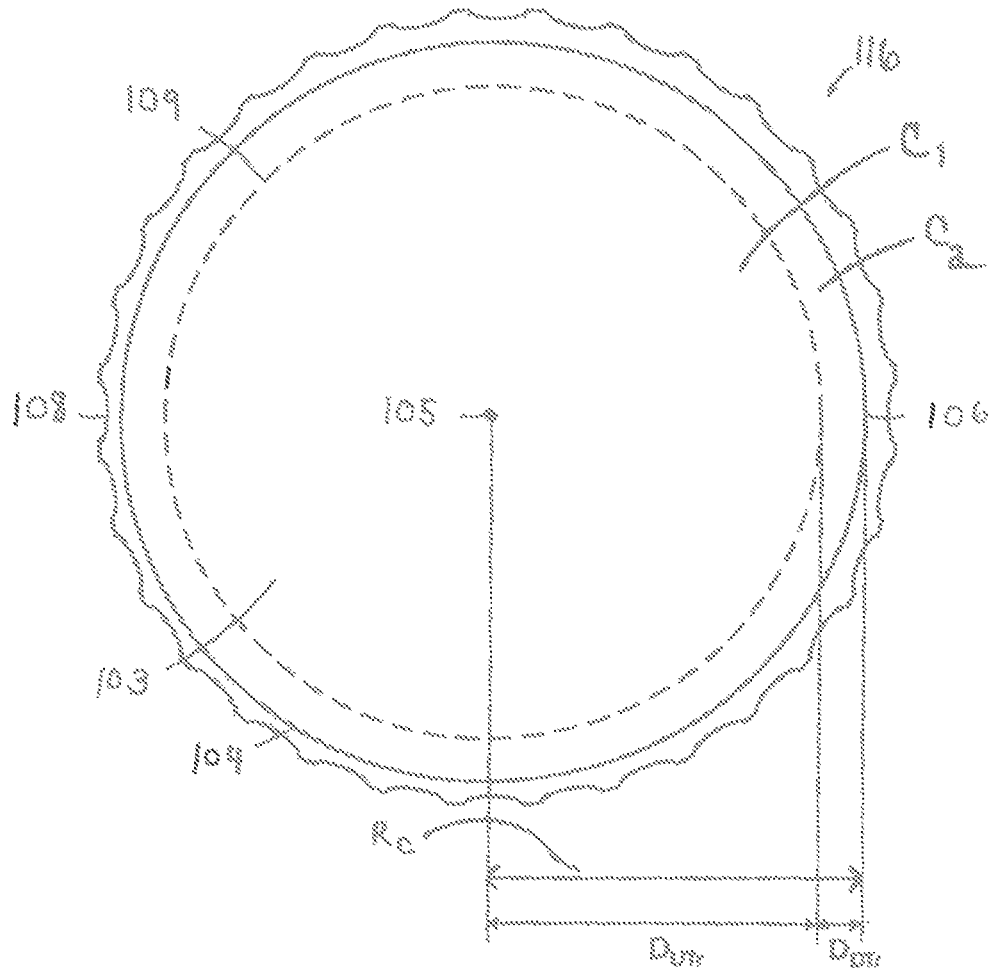
FIG. 11 is a schematic cross section illustrating one embodiment of the golf ball of the present invention made by the method of the invention.

FIGS. 9-11 depict golf balls of the invention having at least one surface that is treated with and comprises a surface penetrating color composition. In FIG. 9, the golf ball coating is treated with and comprises a surface penetrating color composition. Specifically, golf ball 102 comprises core 103, surrounded by cover 104, which is surrounded by coating 110. Core 103 comprises geometric center 105 and outer surface 106. Cover 104 comprises inner surface 107 and cover outer surface 108. Coating 110 has a thickness Tct and comprises a homogenous composition throughout having color $C_{1CT}$. Coating 110 further comprises treated coating region 111 and untreated coating region 112. Treated coating region 111 is treated with and comprises a surface penetrating color composition having color $C_{2CT}$ that is different than $C_{1CT}$. Untreated coating region 112 is not treated with and does not comprise the surface penetrating color composition and has the color $C_{1CT}$ (which may be any color within the spectrum of visible light or alternatively may be clear colorless, as long as it is different than $C_{2CT}$.

Golf ball 102 does not have the durability issues that may result in prior golf balls wherein the colorant is merely adhesively mated with the cover substrate since the surface penetrating color composition having $C_{2CT}$ is actually embedded within the treated substrate coating. Overall color appearance $C_{AO}$ of golf ball 102 may be contributed to by any or all of core 103, cover 104, the treated coating region and untreated coating region. For example, in one embodiment, where $C_{2CT}$ is opaque and embedded in the coating, only treated coating region's color $C_{2CT}$ contributes to the golf ball's $C_{AO}$. However, where treated coating region $C_{2CT}$ is either clear colorless, clear colored or translucent and the untreated coating region color $C_{1CT}$ is opaque, then both the untreated coating region color $C_{1CT}$ and treated coating region color $C_{2CT}$ contribute to $C_{AO}$. Additionally, where each of the untreated coating region color $C_{1CT}$ and treated coating region color $C_{2CT}$ are one of clear colorless, clear colored or translucent, then embodiments are possible in which the core color and/or cover color may also contribute the $C_{AO}$.

In FIG. 10, golf ball 114 has a cover that is treated with and comprises a surface penetrating color composition. In particular, golf ball 114 comprises core 103, surrounded by cover 104. Core 103 comprises geometric center 105 and outer surface 106. Cover 104 comprises inner surface 107 and cover outer surface 108. Cover 104 further has a thickness Tcv and comprises a homogenous composition throughout having color $C_{1CT}$. Cover 104 also comprises treated cover region $D_{CTr}$ and untreated coating region $D_{CUTr}$. Treated cover region $D_{CTr}$ is treated with and comprises a surface penetrating color composition having a color $C_{2CT}$ that is different than $C_{1CT}$. Meanwhile, untreated cover region $D_{CUTr}$ is not treated with and does not comprise the surface penetrating color composition and has the color $C_{1CT}$. As in golf ball 102, the core may contribute to golf ball 114's $C_{AO}$ where each of the treated cover region and untreated cover region is one of clear colorless, clear colored or translucent.

In FIG. 11, golf ball 116 has a single core that is treated with and comprises a surface penetrating color composition. Specifically, golf ball 116 comprises core 103, surrounded by cover 104. Core 103 comprises geometric center 5 and outer surface 106. Cover 104 comprises inner surface 107 and cover outer surface 108. Core 103 further has a radius Rc and comprises a homogenous composition throughout having color $C_{1CT}$. Core 103 also comprises treated core region $D_{DTr}$ and untreated coating region $D_{UTr}$. Treated core region $D_{DCTr}$ is treated with and comprises a surface penetrating color composition having a color $C_{2CT}$ that is different than $C_{1CT}$. Meanwhile, untreated core region $D_{CUTr}$ is not treated with and does not comprise the surface penetrating color composition and has the color $C_{1CT}$. Where the surface penetrating color composition color $C_{2CT}$ is one of clear colorless, clear colored or translucent, then both $C_{2CT}$ and $C_{1CT}$ contribute to golf ball 116's $C_{AO}$.

The following prophetic examples, represented in Table 5 below, illustrate several non-limiting embodiments of the present invention consistent with FIGS. 9-11:

TABLE 5

| Golf Ball Element | G. Ball I | G. Ball II | G. Ball III |
|---|---|---|---|
| Core/Center/ U.B. | Center<br>N/A Off-white*<br>(25.4 mm diameter) | Core White<br>(40.1 mm diameter) | Red<br>(42.672 mm diameter) |
| Core 1st O.S. | N/A | TR**<br>(2 mm)<br>Yellow<br>Translucent | — |
| Outer Core Layer | White<br>(39.37 mm diameter) | — | — |
| Core 2nd O.S. | TR<br>(depth/thickness of treated region 1 mm)<br>Blue | — | — |
| O.C.L./C.L. | Clear colorless<br>(42.7 mm diameter) | Clear Colorless<br>(42.7 mm diameter) | — |
| O.C.L.O.S./ C.L.O.S./ U.B.O.S. | TR<br>(depth/thickness of treated region 0.5 mm)<br>Red<br>Clear Colored | TR<br>(.1 mm)<br>Blue<br>Translucent | — |
| CT | — | Clear Colorless<br>(42.776 mm diameter) | Clear Colorless<br>(42.748 mm diameter) |
| CT.O.S. | — | — | TR<br>(0.0381 mm)<br>Yellow<br>Clear Colored |
| $C_{AO}$ | Red-Violet | Yellow-Green | Red-Orange |

*No colorant added, color is due to raw materials and appears "off-white" and does not contribute to the overall color appearance $C_{AO}$.
**Herein, the term "TR" denotes a treated region extending inward from the treated surface the specified depth (mm).

Golf balls I-III of TABLE 5 represent several possible golf ball constructions according to the invention. Golf ball I is a dual core golf ball having a center, an outer core layer disposed about the center, and a cover disposed about the outer core layer. In golf ball I, the center does not contribute to the overall color appearance $C_{AO}$, the outer core layer is initially entirely white, and cover is colorless. Each component may comprise either a thermoplastic material or a thermoset rubber or a combination thereof. The center has an outer diameter of 25.4 mm. The outer diameter of the outer core layer is 39.37 mm. Meanwhile, the outer diameter of the cover is 42.7 mm. Additionally, the outer surfaces of the outer core layer and cover have been treated with fatty acid/fatty acid salt colorant compositions such that the outer core layer has an outer core layer treated region extending inward from the outer core layer outer surface a depth of 1 mm, and the cover has a cover treated region extending inward from the cover outer surface a depth of 0.5 mm. The core outer layer treated region is embedded with a blue fatty acid/fatty acid salt colorant composition, and the cover treated region is embedded with a red clear colored fatty acid/fatty acid salt colorant composition. Each respective treated region of the core outer layer and the cover contributes to the golf ball's overall golf ball color appearance $C_{AO}$ of red-violet.

Golf ball II is a single core golf ball. The single core is surrounded by a cover, and a coating is disposed about the cover. In golf ball II, the core has an outer diameter of 40.1 mm, the cover has an outer diameter of 42.7 mm, and the coating has an outer diameter of 42.776 mm. The single core and cover comprise a thermoplastic material or thermoset rubber or a combination thereof, and the coating comprises a urethane-based formula. The single core is white and the cover and coating are each clear colorless, except that the outer surfaces of the single core and cover are each treated with a fatty acid/fatty acid salt colorant composition. In this regard, the core has a single core treated region extending inward from the single core outer surface a depth of 2 mm, and the cover has a cover treated region extending inward from the cover outer surface a depth of 0.1 mm. The single core treated region is embedded with a yellow translucent fatty acid/fatty acid salt colorant composition. In turn, the cover treated region is embedded with a blue translucent fatty acid/fatty acid salt colorant composition. Each respective treated region of the single core and the cover contribute to the golf ball's overall golf ball color appearance $C_{AO}$ of yellow-green.

Golf ball III comprises a core surround by a coating. The core has an outer diameter of 42.672 mm and comprises a thermoplastic material or thermoset rubber or a combination thereof. The coating has an outer diameter of 42.748 mm and comprises a urethane-based formula. The core comprises a red color master batch and is therefore red from geometric center to outer surface. The coating is treated with a fatty acid/fatty acid salt colorant composition such that the coating has a coating treated region extending inward from the coating outer surface a depth of 0.0381 mm. The coating treated region is embedded with a yellow clear colored fatty acid/fatty acid salt colorant composition. The red core and yellow coating treated region contribute to the golf ball's overall golf ball color appearance $C_{AO}$ of red-orange.

Each of the golf balls above demonstrate/illustrate that in the method and golf ball of the invention, a surface penetrating colorant composition is provided and deposited/embedded within in a portion—treated region—of a golf ball components/element rather than being incorporated in the entire thickness or depth of the component/element or being painted on the component's surface. This eliminates the need for costly color master batches in the golf ball manufacturing process for some applications and meanwhile a color gradient within a single golf ball component/element may be created, as discussed herein. And improved durability results for golf balls incorporating a treated region within an outermost layer or coating such as in golf balls I and III when that outermost surface is struck with a club, since the colorant is embedded in the outermost layer rather than being adhesively mated therewith or painted thereon.

While golf balls I-III incorporate a fatty acid/fatty acid salt colorant composition as the surface penetrating color composition, it is also envisioned that the surface penetrating color composition may also comprise and extend to other compositions which are capable of penetrating a golf ball component/element surface during at least one stage/step/point in the golf ball manufacturing process and depositing a colorant within the substrate as well.

While the inventive golf ball may be formed from a variety of differing and conventional cover materials (both intermediate layer(s) and outer cover layer), preferred cover materials include, but are not limited to:
(1) Polyurethanes, such as those prepared from polyols or polyamines and diisocyanates or polyisocyanates and/or their prepolymers, and those disclosed in U.S. Pat. Nos. 5,334,673 and 6,506,851;
(2) Polyureas, such as those disclosed in U.S. Pat. Nos. 5,484,870 and 6,835,794; and
(3) Polyurethane-urea hybrids, blends or copolymers comprising urethane or urea segments.

Suitable polyurethane compositions comprise a reaction product of at least one polyisocyanate and at least one curing agent. The curing agent can include, for example, one or more polyamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Patent Application Publication No. 2005/0176523, which is incorporated by reference in its entirety.

Any polyisocyanate available to one of ordinary skill in the art is suitable for use according to the invention. Exemplary polyisocyanates include, but are not limited to, 4,4'-diphenylmethane diisocyanate (MDI); polymeric MDI; carbodiimide-modified liquid MDI; 4,4'-dicyclohexylmethane diisocyanate ($H_{12}$MDI); p-phenylene diisocyanate (PPDI); m-phenylene diisocyanate (MPDI); toluene diisocyanate (TDI); 3,3'-dimethyl-4,4'-biphenylene diisocyanate; isophoronediisocyanate; 1,6-hexamethylene diisocyanate (HDI); naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1, 4-diisocyanate; cyclohexyl diisocyanate; dodecane-1,12-diisocyanate; cyclobutane-1,3-diisocyanate; cyclohexane-1,3-diisocyanate; cyclohexane-1,4-diisocyanate; 1-isocyanato-3, 3,5-trimethyl-5-isocyanatomethylcyclohexane; methyl cyclohexylene diisocyanate; triisocyanate of HDI; triisocyanate of 2,4,4-trimethyl-1,6-hexane diisocyanate; tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer isocyanate groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 8.0% NCO, more preferably no greater than about 7.8%, and most preferably no greater than about 7.5% NCO with a level of NCO of about 7.2 or 7.0, or 6.5% NCO commonly used.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate)glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the invention. Suitable polycarbonates include, but are not limited to, polyphthalate carbonate and poly(hexamethylene carbonate)glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl) ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes are used to form one or more of the cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, that a catalyst may be employed to promote the reaction between the curing agent and the isocyanate and polyol, or the curing agent and the prepolymer.

Saturated diisocyanates which can be used include, without limitation, ethylene diisocyanate; propylene-1,2-diisocyanate; tetramethylene-1,4-diisocyanate; 1,6-hexamethylene-diisocyanate (HDI); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of HDI; triisocyanate of 2,2,4-trimethyl-1,6-hexane diisocyanate. The most preferred saturated diisocyanates are 4,4'-dicyclohexylmethane diisocyanate and isophorone diisocyanate.

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bispropylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof.

Thermosetting polyurethanes or polyureas are suitable for the outer cover layers of the golf balls of the present invention.

Additionally, polyurethane can be replaced with or blended with a polyurea material. Polyureas are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as JEFFAMINE® D2000, is preferred.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate; 3,3'-dimethyl-4,4'-biphenylene diisocyanate; toluene diisocyanate; polymeric MDI; carbodiimide-modified liquid 4,4'-diphenylmethane diisocyanate; para-phenylene diisocyanate; meta-phenylene diisocyanate; triphenyl methane-4,4'- and triphenyl methane-4,4'-triisocyanate; naphthylene-1,5-diisocyanate; 2,4'-, 4,4'-, and 2,2-biphenyl diisocyanate; polyphenyl polymethylene polyisocyanate; mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate; triisocyanate of HDI; triisocyanate of 2,2,4-trimethyl-1,6-hexane diisocyanate; 4,4'-dicyclohexylmethane diisocyanate; 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl) dicyclohexane; isophorone diisocyanate; triisocyanate of HDI; triisocyanate of 2,2,4-trimethyl-1,6-hexane diisocyanate; 4,4'-dicyclohexylmethane diisocyanate; 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine;

1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis(2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

Cover layers of the inventive golf ball may also be formed from ionomeric polymers, preferably highly-neutralized ionomers (HNP). In a preferred embodiment, at least one intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either fully or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl, acrylate, ethylene/(meth)acrylic acid/ethyl acrylate, and ethylene/(meth)acrylic acid/methyl acrylate copolymers.

Ionomers are typically neutralized with a metal cation, such as Li, Na, Mg, K, Ca, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be more conventional ionomers, i.e., partially-neutralized with metal cations. The acid moiety in the acid copolymer is neutralized about 1 to about 90%, preferably at least about 20 to about 75%, and more preferably at least about 40 to about 70%, to form an ionomer, by a cation such as lithium, sodium, potassium, magnesium, calcium, barium, lead, tin, zinc, aluminum, or a mixture thereof.

In one embodiment, the inventive single-layer core is enclosed with two cover layers, where the inner cover layer has a thickness of about 0.01 inches to about 0.06 inches, more preferably about 0.015 inches to about 0.040 inches, and most preferably about 0.02 inches to about 0.035 inches, and the inner cover layer is formed from a partially- or fully-neutralized ionomer having a Shore D hardness of greater than about 55, more preferably greater than about 60, and most preferably greater than about 65. In this embodiment, the outer cover layer should have a thickness of about 0.015 inches to about 0.055 inches, more preferably about 0.02 inches to about 0.04 inches, and most preferably about 0.025 inches to about 0.035 inches, and has a hardness of about Shore D 60 or less, more preferably 55 or less, and most preferably about 52 or less. The inner cover layer should be harder than the outer cover layer. In this embodiment the outer cover layer comprises a partially- or fully-neutralized ionomer, a polyurethane, polyurea, or blend thereof. A most preferred outer cover layer is a castable or reaction injection molded polyurethane, polyurea or copolymer or hybrid thereof having a Shore D hardness of about 40 to about 50. A most preferred inner cover layer material is a partially-neutralized ionomer comprising a zinc, sodium or lithium neutralized ionomer such as SURLYN® 8940, 8945, 9910, 7930, 7940, or blend thereof having a Shore D hardness of about 63 to about 68.

In another multi-layer cover, single core embodiment, the outer cover and inner cover layer materials and thickness are the same but, the hardness range is reversed, that is, the outer cover layer is harder than the inner cover layer.

In an alternative embodiment, the golf ball is a one-piece golf ball having a dimpled surface and having a surface hardness equal to or less than the center hardness (i.e., a negative hardness gradient). The one-piece ball preferably has a diameter of about 1.680 inches to about 1.690 inches, a weight of about 1.620 oz, an Atti compression of from about 40 to 120, and a COR of about 0.750-0.825.

In a two-piece ball embodiment, the single-layer core having a negative hardness gradient is enclosed with a single layer of cover material having a Shore D hardness of from about 20 to about 80, more preferably about 40 to about 75 and most preferably about 45 to about 70, and comprises a thermoplastic or thermosetting polyurethane, polyurea, polyamide, polyester, polyester elastomer, polyether-amide or polyester-amide, partially or fully neutralized ionomer, polyolefin such as polyethylene, polypropylene, polyethylene copolymers such as ethylene-butyl acrylate or ethylene-methyl acrylate, poly(ethylene methacrylic acid) co- and ter-polymers, metallocene-catalyzed polyolefins and polar-group functionalized polyolefins and blends thereof. A preferred cover material in the two-piece embodiment is an ionomer (either conventional or HNP) having a hardness of about 50 to about 70 Shore D. Another preferred cover material in the two-piece embodiment is a thermoplastic or thermosetting polyurethane or polyurea. A preferred ionomer is a high acid ionomer comprising a copolymer of ethylene and methacrylic or acrylic acid and having an acid content of at least 16 to about 25 weight percent. In this case the reduced spin contributed by the relatively rigid high acid ionomer may be offset to some extent by the spin-increasing negative gradient core. The core may have a diameter of about 1.0 inch to about 1.64 inches, preferably about 1.30 inches to about 1.620, and more preferably about 1.40 inches to about 1.60 inches.

Another preferred cover material comprises a castable or reaction injection moldable polyurethane, polyurea, or copolymer or hybrid of polyurethane/polyurea. Preferably, this cover is thermosetting but may be a thermoplastic, having a Shore D hardness of about 20 to about 70, more preferably about 30 to about 65 and most preferably about 35 to about 60. A moisture vapor barrier layer, such as disclosed in U.S. Pat. Nos. 6,632,147; 6,932,720; 7,004,854; and 7,182,702, all of which are incorporated by reference herein in their entirety, are optionally employed between the cover layer and the core.

While any of the embodiments herein may have any known dimple number and pattern, a preferred number of dimples is 252 to 456, and more preferably is 330 to 392. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL). Most preferably the dimple number is 330, 332, or 392 and comprises 5 to 7 dimples sizes and the parting line is a SWPL.

In any of these embodiments the single-layer core may be replaced with a 2 or more layer core wherein at least one core layer has a negative hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method of making a golf ball comprising the steps of:
providing a core comprising a homogenous composition throughout having a color $C_1$, the core further having an outer surface and a geometric center;
treating the outer surface with a surface penetrating color composition having a color $C_2$ that is different than $C_1$ and embedding the surface penetrating color composition in the outer surface;
forming a treated core having a treated outer surface comprising color $C_2$ and an untreated core region extending radially from the geometric center toward the treated outer surface and having the color $C_1$; and
forming a cover about the treated core.

2. The method of making a golf ball of claim 1, wherein the surface penetrating color composition comprises a fatty acid and/or fatty acid salt colorant composition.

3. The method of making a golf ball of claim 1, wherein the core comprises a thermoset composition.

4. The method of making a golf ball of claim 1, wherein the core comprises a thermoplastic composition.

5. The method of making a golf ball of claim 1, wherein the core comprises an ionomer composition.

6. The method of making a golf ball of claim 1, wherein the outer surface that is treated with and comprises the surface penetrating color composition comprises a treated outer core region having a substantially uniform depth inward from the outer surface.

7. The method of making a golf ball of claim 6, wherein the ratio of the depth of the treated outer core region to the radius of an untreated region extending from the geometric center to the treated outer core region is from about 1:1 to about 1:2000.

8. The method of making a golf ball of claim 1, wherein the outer surface that is treated with and comprises the surface penetrating color composition comprises a treated outer core region having a non-uniform depth inward from the treated outer surface.

9. The method of making a golf ball of claim 1, wherein the surface penetrating color composition is opaque.

10. The method of making a golf ball of claim 1, wherein the surface penetrating color composition is translucent and the homogenous composition is one of clear colorless, clear colored, opaque, and translucent.

11. The method of making a golf ball of claim 1, wherein the surface penetrating color composition is clear colored and the homogenous composition is one of clear colorless, clear colored, opaque, and translucent.

12. A method of making a golf ball of the invention comprises the steps of:
providing a core comprising a homogenous composition throughout having a color $C_1$, the core further having an outer surface and a geometric center and a radius $R_c$;
treating the outer surface with a surface penetrating color composition having a color $C_2$ and forming a treated outer core region and an untreated core region;
wherein the treated outer core region extends from the core outer surface toward the geometric center a penetration depth $D_{DTr}$ and has the color $C_2$;
wherein the untreated core region extends radially from the geometric center toward the treated outer core region and having a depth $(D_{UTr})=(R_c)-(D_{DTr})$, and wherein the untreated region does not comprise the surface penetrating color composition and has the color $C_1$; and forming a cover about the core.

13. The method of making a golf ball of claim 12, wherein the surface penetrating color composition comprises a fatty acid and/or fatty acid salt colorant composition.

14. The method of making a golf ball of claim 13, wherein $D_{DTr}$ is substantially uniform.

15. The method of making a golf ball of claim 14, wherein the ratio $D_{DTr}:D_{UTr}$ is from about 1:1000 to about 1:2000.

16. A method of making a golf ball comprising the steps of:
providing a core;
providing a cover about the core, the cover being formed from a homogenous composition throughout having a color $C_1 cv$;
wherein the cover has an inner surface adjacent the core, a cover outer surface surrounding the inner surface and a thickness $T_{CV}$;
treating the cover outer surface with a surface penetrating color composition having a color $C_2 cv$ that is different than $C_1 cv$ and forming a treated cover comprising a treated outer cover region and an untreated cover region;
wherein the treated outer cover region extends from the cover outer surface inward toward the cover inner surface a penetration depth $D_{cVosTr}$ and wherein the treated outer surface is embedded with the surface penetrating color composition and has the color $C_2 cv$; and
wherein the untreated cover region extends from the cover inner surface toward the treated outer cover region and has a depth $(D_{CVisUTr})$ $(Tcv)-(D_{CVosTr})$, does not comprise the surface penetrating color composition, and has the color $C_1 cv$.

17. The method of making a golf ball of claim 16, wherein the surface penetrating color composition comprises a fatty acid and/or fatty acid salt colorant composition.

18. The method of making a golf ball of claim 17, wherein $D_{CVosTr}$ is substantially uniform.

19. The method of making a golf ball of claim 18, wherein the ratio $D_{CVosTr}:D_{CVisUTr}$ is from about 1:1 to about 1:2000.

20. A method of making a golf ball comprising the steps of:
providing a core;
forming a cover layer about the core, said cover layer having an inner surface that is adjacent the core and an outer surface surrounding the inner surface;
providing a coating having a thickness Tc about the outer surface, the coating formed from a homogenous composition throughout having a color $C_{1CT}$;
exposing an outer surface of the coating to a surface penetrating color composition having a color $C_{2CT}$ that is different than $C_{1CT}$; and
forming a treated coating region by embedding the surface penetrating color composition into the outer surface of the coating a depth D inward toward the cover outer surface;
wherein D<Tc such that the treated coating region has the color $C_{2CT}$; and
wherein an untreated region of the coating has the color $C_{1CT}$ and a thickness $T_{CUT}$, wherein $T_{CUT}=Tc-D$.

21. The method of making a golf ball of claim 20, wherein the surface penetrating color composition comprises a fatty acid and/or fatty acid salt colorant composition.

22. The method of making a golf ball of claim 21, wherein D is substantially uniform.

23. The method of making a golf ball of claim 22, wherein the ratio $D:T_{CUT}$ is from about 1:1 to about 1:2000.

* * * * *